(12) United States Patent
Knudsen

(10) Patent No.: US 11,386,244 B2
(45) Date of Patent: Jul. 12, 2022

(54) CONSTRUCTION OF FENCE PANELS AND FENCE PANEL COMPONENTS

(71) Applicant: N. Eric Knudsen, Maple Valley, WA (US)

(72) Inventor: N. Eric Knudsen, Maple Valley, WA (US)

(*) Notice: Subject to any disclaimer, the term of this patent is extended or adjusted under 35 U.S.C. 154(b) by 94 days.

(21) Appl. No.: 16/932,490

(22) Filed: Jul. 17, 2020

(65) Prior Publication Data

US 2021/0019454 A1  Jan. 21, 2021

Related U.S. Application Data

(60) Provisional application No. 63/052,853, filed on Jul. 16, 2020, provisional application No. 62/875,874, filed on Jul. 18, 2019.

(51) Int. Cl.
*G06G 7/48* (2006.01)
*G06F 30/12* (2020.01)
*G06F 30/13* (2020.01)
*E04H 17/16* (2006.01)

(52) U.S. Cl.
CPC .............. *G06F 30/12* (2020.01); *G06F 30/13* (2020.01); *E04H 17/16* (2013.01)

(58) Field of Classification Search
CPC ......... E04H 17/16; E04H 17/26; G06F 30/12; G06F 30/13
See application file for complete search history.

(56) References Cited

U.S. PATENT DOCUMENTS

| | | | |
|---|---|---|---|
| 6,492,993 B1 * | 12/2002 | Livesey | G06T 17/00 |
| | | | 345/588 |
| 7,830,373 B1 * | 11/2010 | Gao | G06T 17/20 |
| | | | 345/419 |
| 7,861,434 B2 | 1/2011 | Knudsen | |
| 8,011,149 B2 | 9/2011 | Knudsen | |
| 8,820,007 B2 | 9/2014 | Knudsen | |
| 8,966,837 B2 | 3/2015 | Knudsen | |
| 9,070,216 B2 * | 6/2015 | Golparvar-Fard | |
| | | | G06Q 10/06311 |
| 9,506,270 B2 | 11/2016 | Knudsen | |
| 9,932,753 B1 | 4/2018 | Knudsen | |
| 9,945,149 B2 | 4/2018 | Knudsen | |
| 10,501,960 B2 | 12/2019 | Knudsen | |
| 10,706,185 B2 * | 7/2020 | Tang | G06F 30/13 |
| 2015/0363950 A1 * | 12/2015 | Gilbert | G06T 11/20 |
| | | | 345/632 |
| 2017/0260771 A1 | 9/2017 | Knudsen | |
| 2017/0350157 A1 | 12/2017 | Knudsen | |

* cited by examiner

*Primary Examiner* — Rehana Perveen
*Assistant Examiner* — Nithya J. Moll
(74) *Attorney, Agent, or Firm* — Seed Intellectual Property Law Group LLP

(57) ABSTRACT

Interactive systems and methods are provided for designing and constructing fences or other structures supported by posts, including methods which enable users to design custom fence panels and be presented with dynamic visual representations of such custom fence panels.

7 Claims, 44 Drawing Sheets

CONSTRUCTION OF FENCE PANELS AND FENCE PANEL COMPONENTS

BACKGROUND

Technical Field

The present disclosure relates to fence panels, and more particularly, to the design and construction of fence panels, fence panel components and fences constructed therefrom.

Description of the Related Art

Fences are ubiquitous in modern society, used in a vast range of applications, to mark and accent boundaries, provide security, and control movement of people and animals. Thousands of miles of new and replacement fences are installed every year in the U.S., and utilize vast amounts of construction-related natural resources.

FIG. 1 shows a landscape with a fence 100 extending along portions thereof. The fence 100 shown in FIG. 1 comprises two major segments, or runs, 102. A run is a section or portion of a fence that extends between natural dividing points such as corners, gates, buildings, etc. Except where a fence is attached to a building, each run 102 generally has a main post 104a at each end and line posts 104 spaced between the main posts. Each pair of adjacent posts 104 has a fence panel 106 coupled between them. Each panel 106 comprises horizontal elements, or rails, 108, and vertical elements, or fence boards, 110. Although each of the fence panels 106 are shown as straight sections with horizontal rails 108, it is appreciated that rails 108 may be installed at oblique angles relative to the posts 104 to adapt, for example, to various land topographies or obstacles.

Typically, fence construction and installation involves a number of steps. In some cases, a site survey is done to determine the precise location of the fence and to prevent the all-too-common (and potentially very expensive) occurrence of installing a fence a few inches or feet beyond the actual property line. A contractor visits the site to estimate the materials and labor required to build and install the fence. In addition to simply measuring linear feet required, elements such as topography and obstructions must be reviewed and accounted for. If the fence location has not been marked by the owner or surveyor, the contractor may mark the location during the initial visit, or during a later visit. Installation is scheduled, and materials are ordered and delivered to the site.

Depending on the scope of the project, the locations and spacing of the fence posts may be determined and laid out in advance, by a landscape architect, for example, or left to the installation crew to determine on site. In either case, the spacing of the posts is limited by the material available, and typically is selected to make best use of that material. For example, 96 inch lumber is commonly used to frame wooden fences, so the maximum distance between posts cannot exceed 96 inches. On the other hand, if the contractor uses 96 inch lumber, it would be wasteful to set the posts 60 inches apart, which would result in about three feet of waste from every framing rail. However, because of other considerations, some waste is unavoidable. It is generally preferable to evenly space the posts of a given run of fence, to provide an attractive and unified appearance. Inasmuch as such a run will rarely be evenly divisible by eight feet, each post will be something less than eight feet apart. Additionally, if the terrain includes changes in elevation which the bottom and/or top rail must follow, the length of the angled framing rails between two posts that are at different heights may be much greater than the lateral distance between the posts, which reduces the maximum permissible horizontal distance between any of the posts of that run. Furthermore, it can be difficult, or at least time consuming, to precisely position a post to within a fraction of an inch, so a margin of an inch or two is generally provided. Thus, the posts may be spaced anywhere from a couple of inches to a couple of feet less than the maximum allowable distance. Finally, when building fences from natural materials such a wood, it is not uncommon for individual pieces to be unsuitable, because of, for example, a knot in a position that unacceptably weakens a part, or an excessively warped board, etc. For all of these reasons, some material waste is expected and allowed for in the original estimate when calculating the materials for the frame rails, and, for similar reasons, when calculating materials for fence boards and posts.

Once the materials and crew are at the site, and with post locations marked, the post holes are dug, and the posts are installed. Each post hole may be partially backfilled with gravel to improve drainage, and the post is then stood in the hole and held in place by several stakes driven into the ground around the post and braces of scrap lumber nailed to the stakes and the sides of the post. A concrete footing is poured into the hole around the post and allowed to set, and the stakes are later removed. With all the posts in place and the footings set sufficiently to remove the braces, frame rails are cut to fit, and attached to the posts, extending between adjacent posts along the bottom and top of the fence. Fence boards are then cut to length and attached to the frame rails. Parallel and consistently spaced fence boards along the entire fence run is important, because differences in spacing will become very obvious to an observer when there is daylight behind the fence. Because of variations in the spacing of the posts, it is often necessary to rip fence boards lengthwise to maintain the correct spacing in some of the panels of a fence run. Additionally, the lengths of the fence boards may vary considerably. For example, the ground line between posts can have obstructions or changes in elevation that the installer adjusts for in the length of the fence boards in order to maintain a straight line at the top of the fence while still maintaining proper spacing or ground clearance at the bottom. Additionally, many fences include decorative features along the top, such as arches or waves, in which case the builder may extend the fence boards above the desired finish line, and cut the fence boards to follow the desired shape, after installation. The posts are also cut down to the final length after installation, and post caps or finials are often attached to the tops. After the fence is installed, it is usually painted or stained to protect the wood and extend its useful life.

If properly executed using good quality material, a fence that is built and installed as described above can be very attractive, and can last for many years. However, it will be noted that there is a significant amount of waste that is produced. Not only does such waste result in higher material costs, it increases shipping costs because it must be transported to the site and later removed, it increases landfill use and fees, and wastes otherwise valuable resources.

In view of the expense, labor, and waste associated with installing a fence that is custom-built on site, another method of building and installing fences has been introduced. Pre-manufactured fence panels are becoming more available, and increasingly can be found in a wide variety of materials, including wood, vinyl, composite, aluminum, steel, concrete, etc., and in a wide variety of designs.

Pre-manufactured panels or kits are typically sold from retail lumber and hardware outlets. The panels and kits are provided in standard sizes and are ready for installation. One common panel size, of the many available, is six feet tall by eight feet long. The installer digs the post holes at intervals of eight feet plus the width of a fence post, and places the first post, with stakes and braces to hold it plumb while the concrete sets, as described above. However, the installer also attaches the first fence panel to the post, and may attach the second post to the first panel at the same time, installing both posts together. The installer then progresses post-by-post, attaching a panel between each pair of posts before pouring the footing around the second of the pair, bracing each post and shimming up each panel to ensure that the post is held plumb and the fence level until the post footings are sufficiently hardened, which may be several days because of the mass of the fence being supported. This process ensures that the spacing between the posts is correct for the eight-foot panels. At the end of a fence run, if the last post is less than eight feet from the previous one, the installer cuts a fence panel to fit in the remaining space. Alternatively, the installer may install all of the posts first, but this requires significant care to ensure that the distance between the posts is exactly correct. Otherwise, it may be necessary to trim the panel to fit, or shim the post to fill a gap.

In contrast to site built fencing, pre-manufactured fence panels can be produced efficiently, inexpensively, and at a consistent, predictable quality. Because they are produced in a manufacturing facility, waste can be significantly reduced, and the waste that is produced is more likely to be recycled either internally to produce other products or externally rather than sent to a landfill. Material handling methods and automated machines for material optimization allow utilization of all lengths of raw materials. The factory can obtain lumber that has not been cut to standard lengths, but is the full length of the log, or stem, from which it was milled. Scrap that won't work on one fence panel or design can be diverted and used for another. Flaws and defective lumber can be detected automatically, and can often be cut out, allowing the remaining material to be salvaged. This optimization and defective-material/scrap management process is much more environmentally friendly than site-built fence processes, especially as it relates to reducing the production, and increasing the productive recycling, of waste lumber. As tree trunks don't come in perfect length increments, the factory can bring in material in lengths determined by the actual tree trunks and optimize those random lengths via computer to best utilize the material, and minimize waste. The panels can be primed or finished in spray booths or dip tanks in large volumes, using better quality control, wasting less material, and reducing or eliminating the environmental impact that arises from on-site finishing.

Overall, fences built using pre-manufactured fence panels can be made more efficiently, less expensively, and to higher and more consistent quality standards, with less waste and less environmental impact, than fences custom-built on site.

Further, post sleeve positioning apparatuses and methods have been developed to facilitate the efficient positioning and construction of post sleeves, fence posts, and fences. Prior post sleeve installation devices have included a standing structure, a structure coupled to the standing structure and configured to support a post sleeve below the standing structure, and a mechanism configured to enable selective translation of the support structure in three axes and rotation around a vertical axis. Locks have been provided to lock the post sleeve at a selected position and orientation relative to the standing structure. A beam extending from one installation device to another has been used to measure or control the relative spacing, orientation, and elevation of associated post sleeves, and related data has been collected for off-site manufacture of custom fence panels. Additionally, a repository has been provided, to which the data is transmitted for retention, and from which the data can be retrieved for manufacture of replacement fence panels. Examples are described in U.S. Pat. No. 7,861,434, the entire content of which is hereby incorporated herein by reference in its entirety.

BRIEF SUMMARY

A method may be summarized as comprising: presenting a visual representation of a fence run including a plurality of fence panels; providing a user interface for receiving user input of fence run characteristics and/or modifying the fence run characteristics; and dynamically updating the visual representation of the fence run based at least in part on changes made to the fence run characteristics by the user, wherein dynamically updating the visual representation of the fence run includes overlaying a set of lines over the visual representation of the fence run, wherein a first one of the lines is indicative of a target fence height specified by the user.

A second one of the lines may be indicative of a designed fence height, a third one of the lines may be indicative of a minimum fence height, and a fourth one of the lines may be indicative of a maximum fence height. The method may further comprise providing a user interface for allowing the user to modify the fence run characteristics based on the visual representation including the overlaid set of lines.

A computing device may be summarized as comprising: a memory configured to store computer instructions; and at least one processor configured to execute the computer instructions to: generate a visual representation of a plurality of fence posts in a fence run, the plurality of fence posts including at least a first fence post and a second fence post, the visual representation providing a first minimum height for the first fence post, a first distance from a reference location to the first fence post, a second minimum height for the second fence post, and a second distance from the reference location to the second fence post; display the visual representation to a user; display a graphical user interface to the user for receiving information associated with the first fence post and the second fence post; and receive, from the user via the graphical user interface, at least a first input that signifies that the first minimum height and the first distance have been marked at a location at which the first fence post is to be installed and at least a second input that signifies that the second minimum height and the second distance have been marked at a location at which the second fence post is to be installed.

The at least one processor may be further configured to execute the computer instructions to: modify the visual representation of the plurality of fence posts in the fence run based on the input received from the user; and display the modified visual representation of the plurality of fence posts in the fence run to the user.

A computing device may be summarized as comprising: a memory configured to store computer instructions; and at least one processor configured to execute the computer instructions to: generate a visual representation of a plurality of fence posts in a fence run, the plurality of fence posts including at least a first fence post and a second fence post; display the visual representation to a user; display a graphical user interface to the user for receiving information associated with at least the first fence post; receive, from the user via the graphical user interface, a first input specifying a measured height from a reference elevation to a target bottom of fence panels adjacent to the first fence post; and receive, from the user via the graphical user interface, a second input specifying a measured height from the reference elevation to a top of the first fence post.

The at least one processor may be further configured to execute the computer instructions to: modify the visual representation of the plurality of fence posts based on the inputs received from the user; and display the modified visual representation of the plurality of fence posts to the user. The at least one processor may be further configured to execute the computer instructions to: display a graphical user interface to the user for receiving information associated with at least the second fence post; receive, from the user via the graphical user interface, a third input specifying a measured height from the reference elevation to a target bottom of fence panels adjacent to the second fence post; and receive, from the user via the graphical user interface, a fourth input specifying a measured height from the reference elevation to a top of the second fence post.

The processor may be further configured to execute the computer instructions to receive, from the user, a fifth input specifying a measured horizontal distance between a corner of the first fence post and a corner of the second fence post. The processor may be further configured to execute the computer instructions to present a prompt to the user to install a horizontal element that extends from the first fence post to the second fence post, wherein the horizontal element defines the reference elevation. The reference elevation may be a first reference elevation and the processor may be further configured to execute the computer instructions to: receive, from the user via the graphical user interface, a measurement of a vertical height between the first reference elevation and a second reference elevation; receive, from the user via the graphical user interface, a fifth input specifying a measured height from the second reference elevation to a target bottom of fence panels adjacent to a third fence post; and receive, from the user via the graphical user interface, a sixth input specifying a measured height from the second reference elevation to a top of the third fence post.

A computing device may be summarized as comprising: a memory configured to store computer instructions; and at least one processor configured to execute the computer instructions to: generate a visual representation of a fence post in a fence run, the visual representation providing a designed height of the fence post and a difference between the designed height of the fence post and a measured height of the fence post; display the visual representation to a user; display a graphical user interface to the user for receiving information associated with the fence post; and receive, from the user via the graphical user interface, at least a first input that signifies that the difference between the designed height of the fence post and the measured height of the fence post has been marked on the fence post.

The at least one processor may be further configured to execute the computer instructions to: modify the visual representation of the fence post in the fence run based on the input received from the user; and display the modified visual representation of the fence post in the fence run to the user. The processor may be further configured to execute the computer instructions to: generate the visual representation of the fence post in the fence run, the visual representation providing a difference between a designed height of an edge of a fence component designed to be coupled to the fence post and the measured height of the fence post; and receive, from the user via the graphical user interface, at least a second input that signifies that the difference between the designed height of the edge of the fence component and the measured height of the fence post has been marked on the fence post.

The edge of the fence component may be a top edge of a fence rail designed to be coupled to the fence post. The fence rail may be a first fence rail and the processor may be further configured to execute the computer instructions to: generate the visual representation of the fence post in the fence run, the visual representation providing a difference between a designed height of a top edge of a second fence rail designed to be coupled to the fence post and the measured height of the fence post; and receive, from the user via the graphical user interface, at least a third input that signifies that the difference between the designed height of the top edge of the second fence rail and the measured height of the fence post has been marked on the fence post.

BRIEF DESCRIPTION OF THE SEVERAL VIEWS OF THE DRAWINGS

FIG. 16L shows an image of a graphical user interface that allows a consumer to select, customize, and order a fence panel online.

FIG. 16M shows another image of the graphical user interface of FIG. 16L that allows a consumer to select, customize, and order a fence panel online.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations. Additionally, the various implementations may be methods, systems, media, or devices. Accordingly, the various implementations may be entirely hardware implementations, entirely software implementations, or implementations combining software and hardware aspects. Unless the context requires otherwise, reference throughout the specification to "software" or "software system" refer to the functionality performed by or operations of computing devices, whether performed entirely by software, entirely by hardware, or a combination thereof.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

Techniques for fabricating fence panels are provided which enable dynamic adjustment of the gaps between fence boards of a fence panel and/or the widths of the fence boards within the fence panel to ensure that end fence boards satisfy both a minimum acceptable fence board width criteria and a maximum acceptable fence board width criteria.

Figure 1:
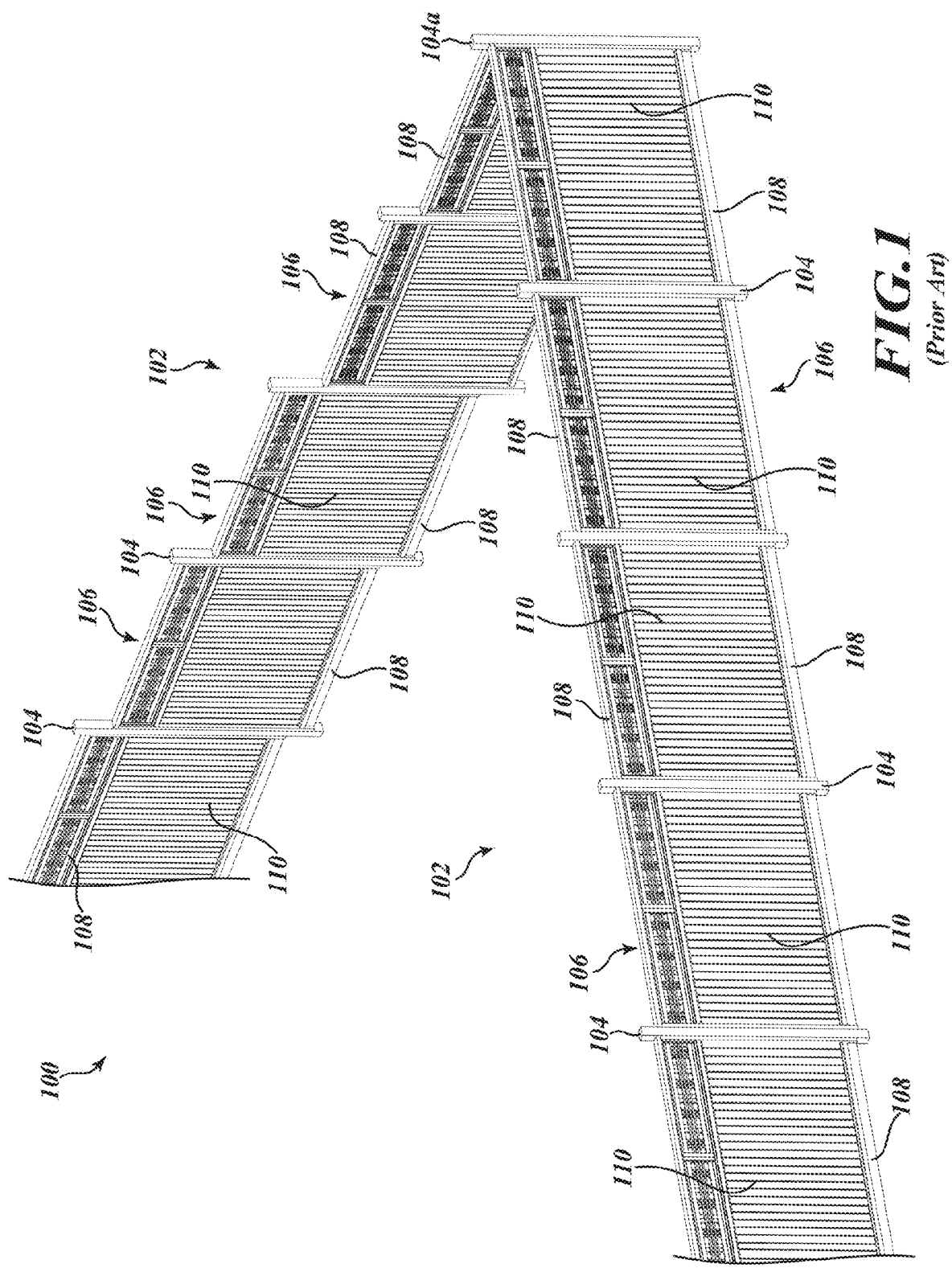
FIG. 1 shows a landscape with a fence.
Figure 2:
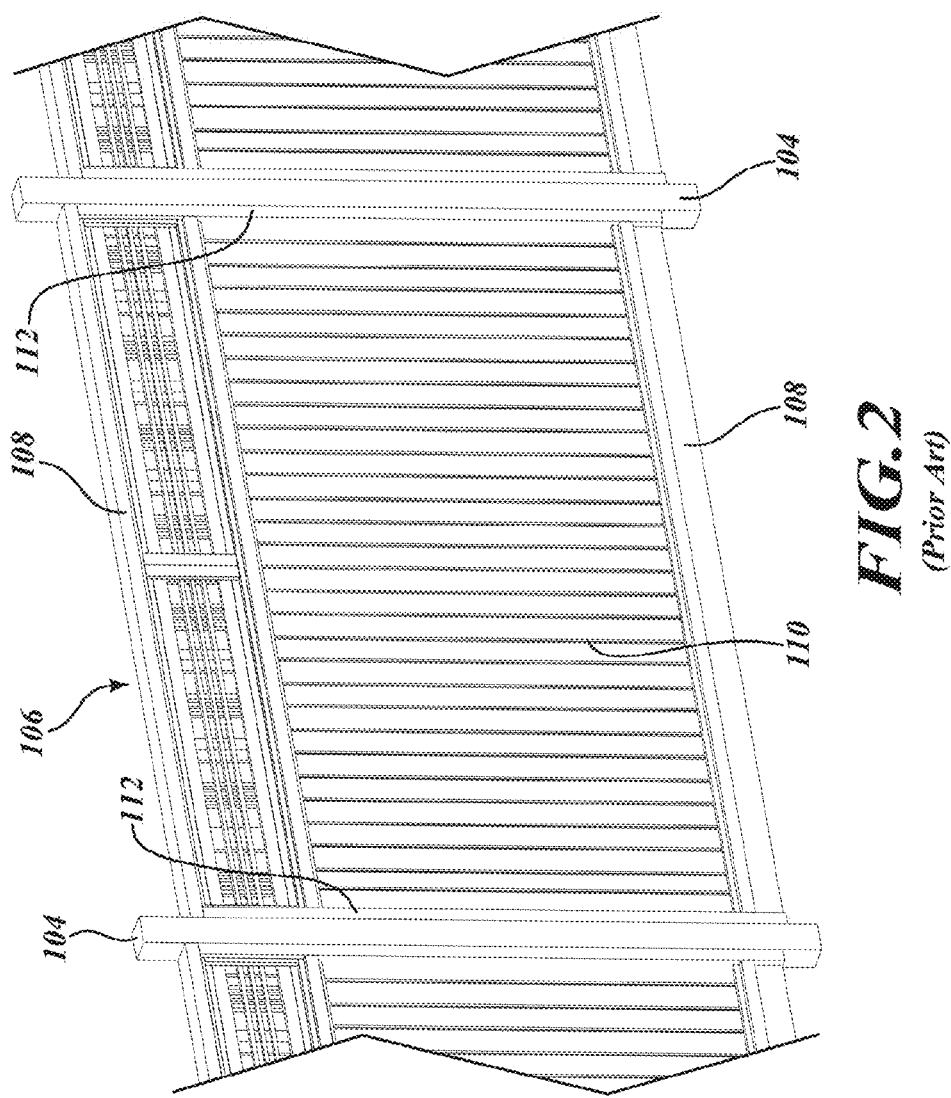
FIG. 2 shows a larger view of a portion of the landscape and fence of FIG. 1 at a larger scale.

FIG. 2 illustrates an individual fence panel 106, supported between two adjacent fence posts 104, including its fence rails 108 and its fence boards 110. As illustrated in FIG. 2, the fence boards 110 of a fence panel 106 are typically oriented vertically, regardless of the orientation of the corresponding fence rails 108. As also illustrated in FIG. 2, the fence boards 110 are generally spaced equally, evenly, or uniformly along a width of the fence panel 106 in a horizontal direction extending from a first one of the fence posts 104 to a second one of the fence posts 104, or in an abutting relationship.

In designing and fabricating a plurality of fence panels, one issue to be resolved is that of the dimensions of the fence boards 110 and any gaps between adjacent fence boards 110. In particular, for at least the reasons discussed above, each individual fence panel 106 may have a different overall width, and a plurality of identical fence boards 110 spaced apart using identical gap widths therefore may not always fit evenly into the width of a given fence panel 106. Thus, the width of fence boards 110 and/or the width of gaps between adjacent fence boards 110 within a fence panel 106 may be varied so that the fence boards 110 fit evenly into the width of the fence board area of the fence panel 106.

As used herein, the term "width of the fence board area" refers to a lateral width dimension of the area of a fence panel 106 to be filled by the fence boards 110 and gaps between the fence boards 110. Depending on the type of panel construction, this may be the width of the fence panel or a component thereof in a horizontal direction extending from a first fence post 104 supporting the fence panel 106 to a second fence post 104 supporting the fence panel 106, or it may be the width of spacing in a horizontal direction between vertical frame members 112 of the fence panel 106. "Fence board area" refers to the area of a fence panel 106 to be filled by the fence boards 110 and gaps between the fence boards 110, whether or not additional gaps are provided between end fence boards and such fence posts 104 or such vertical frame members 112 of the fence panel 106—that is, such gaps between the end fence boards and the fence posts 106 or the vertical frame members 112, if included in the fence panel 106, are not considered a part of the "fence board area," as that term is used herein. Nevertheless, such gaps between the end fence boards and the fence posts 106 can be varied in ways similar to but different than those described herein for the gaps between the fence boards. In particular, the widths of such gaps between the end fence boards and the fence posts 106 can be held more constant along the entire length of a fence run than the gaps between the fence boards. In some instances, no gaps may be provided between the end fence boards and the fence posts 106.

The operation of certain aspects of the disclosure will now be described with respect to FIGS. 3 and 4. In at least one of various implementations, methods 300 and 400 described in conjunction with FIGS. 3 and 4, respectively, may be implemented by or executed on one or more computing devices, such as a smart phone, tablet computer, laptop computer, desktop computer, server computer, virtual computing environments (e.g., a virtual server utilizing cloud computing resources), or other computing systems, or some combination thereof. Various implementations of methods 300 or 400 may be executed on a single computing device or a plurality of computing devices may be employed collectively to perform the functionality of methods 300 or 400.

Figure 3:
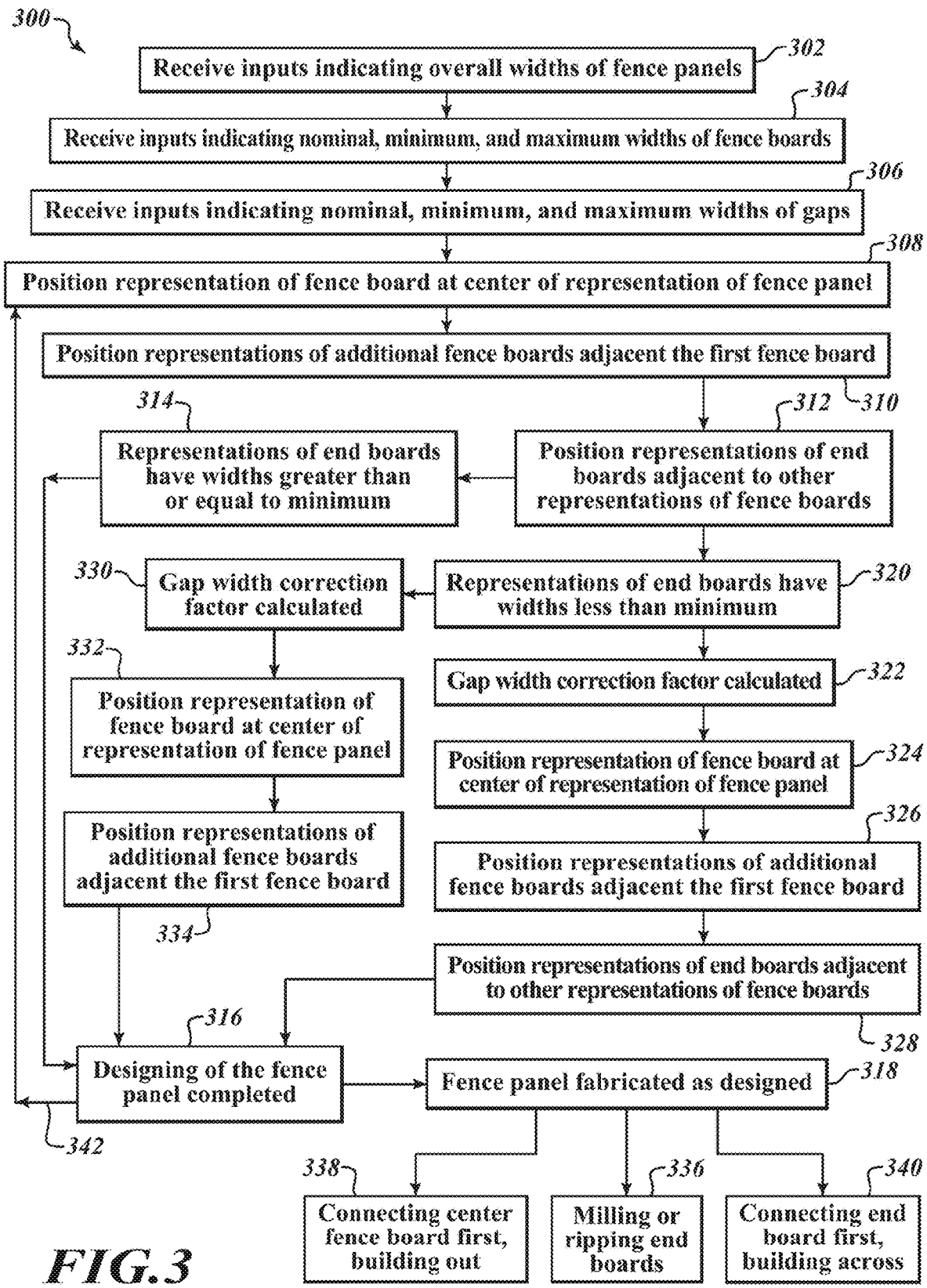
FIG. 3 shows a flow chart diagram of a method of designing and fabricating a fence panel, according to one implementation.
Figure 4:
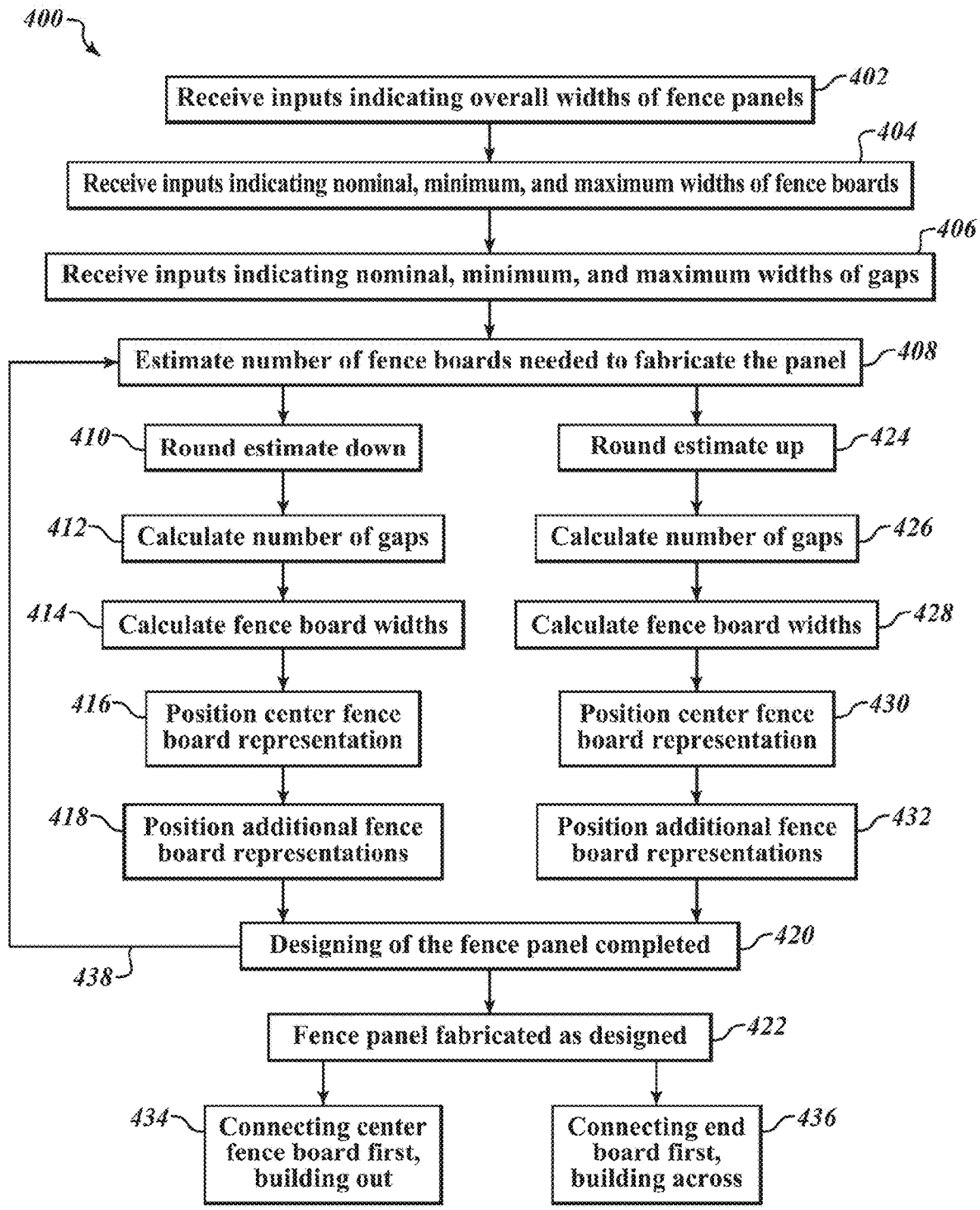
FIG. 4 shows another flow chart diagram of a method of designing and fabricating a fence panel, according to another implementation.

As illustrated in FIGS. 3 and 4, methods 300 and 400 of designing and fabricating fence panels include receiving inputs into a software system from an operator or other source of data indicating overall or total widths of the fence panels to be fabricated, at 302 and 402, and/or total widths of the respective fence board areas thereof (which in some types of panel construction may be the same). In some implementations, the methods can include receiving inputs indicating the locations of fence post sleeves and/or fence posts to which the fence panels are to be coupled, from which the software system can calculate the overall or total widths of the fence panels to be fabricated and/or total widths of respective fence board areas thereof, such as based on styles of the fence panels and/or by subtracting widths of the vertical frame members 112 from the total widths of the fence panels, when provided.

The methods also include receiving inputs indicating a default, standard, or nominal width of fence boards to be used to fabricate the fence panels, and minimum and maximum acceptable widths of fence boards to be used to fabricate the fence panels, at 304 and 404. In some implementations, the minimum and/or maximum acceptable width of fence boards may be an absolute value, such as 1.5", while in other implementations, the minimum and/or maximum acceptable width of fence boards may be a percentage, such as 35%, of the nominal width of the fence boards.

The methods also include receiving inputs indicating a default, standard, or nominal width of gaps between fence boards within the fence panels, and minimum and maximum acceptable widths of such gaps, at 306 and 406. The nominal width of the gaps may vary depending on the style of the fence panels to be fabricated, such as from ⅛" to ½". As a result, the minimum and maximum acceptable widths of such gaps may similarly vary depending on the style of the fence panels.

Optionally, the method can include allowing an operator to input either manually collected and/or digitally calculated stored data indicating a horizontal distance to be covered by a fence panel or fence board area thereof, a vertical elevation change to be covered by a fence panel or fence board area thereof, angles of rotation of the fence rails 108 with respect to the fence posts 104, and/or centerline angle between adjacent fence posts 104 in a run. In some implementations, the method can include allowing an operator to install fence post sleeves and/or fence posts that are tagged with or otherwise assigned unique identifiers, and then allowing the operator to input such distance and/or angle information for a fence panel that is to be installed between each pair of adjacent fence post sleeves and/or fence posts. In some implementations, the method can include any related techniques described in U.S. Pat. No. 7,861,434, issued Jan. 4, 2011, which is hereby incorporated herein by reference in its entirety.

In a first implementation of the method of designing and fabricating fence panels 300, as illustrated in FIG. 3, the method 300 further includes designing a first fence board area having a first overall width by positioning a representation of a first fence board having the nominal width at a center position of a representation of the fence board area, at 308, and positioning representations of additional fence boards having the nominal width adjacent to first and second sides of the first fence board, with the various representations of the fence boards spaced apart from one another by the nominal gap width, at 310. In some implementations, the center position is an exact center of the representation of the fence board area, while in other implementations, the center position is a generally centered region of the fence board area. Once representations of additional fence boards can no longer be positioned adjacent to the others and still be completely within the representation of the fence board area, representations of portions of fence boards, which can be referred to as "end boards," are positioned adjacent to the other representations of fence boards, at 312.

The representations of the end boards are provided with the largest possible width while remaining spaced apart from the representations of the adjacent fence boards by the nominal gap width and while remaining completely within the representation of the fence board area. If the representations of the end boards have widths that are greater than or equal to a minimum acceptable fence board width, such as those described above or as determined by a visual inspection, at 314, then the designing of the fence panel can be completed, at 316, and the fence panel can then be fabricated in accordance with the design, at 318. If the representations of the end boards have widths that are less than the minimum acceptable fence board width, at 320, however, then the first fence panel can be redesigned using a gap width other than the nominal gap width.

As a first example, a gap width correction factor is calculated at 322 as the difference between the widths of the representations of the end boards and the minimum acceptable fence board width, multiplied by two, and divided by the number of gaps present in the design. A second design is begun by positioning a representation of a first fence board having the nominal width at a center of a representation of the fence board area, at 324, and positioning representations of additional fence boards having the nominal width adjacent to first and second sides of the first fence board, with the various representations of the fence boards spaced apart from one another by a difference between the nominal gap width and the correction factor, at 326. Once representations of additional fence boards can no longer be positioned adjacent to the others and still be completely within the representation of the fence board area, representations of portions of fence boards, which can be referred to as "end boards," are positioned adjacent to the other representations of fence boards, at 328.

The representations of the end boards are provided with the largest possible width while remaining spaced apart from the representations of the adjacent fence boards by the difference between the nominal gap width and the correction factor, and while remaining completely within the representation of the fence board area. If the representations of the end boards have widths that are greater than or equal to the minimum acceptable fence board width (mathematically, it is expected that they will be equal), then the designing of the fence panel can be completed, at 316, and the fence panel can then be fabricated in accordance with the design, at 318.

As a second example, a gap width correction factor is calculated as the sum of the widths of the representations of the end boards and the nominal gap width, multiplied by two, and divided by the number of gaps present in the design minus two, at 330. A second design is begun by positioning a representation of a first fence board having the nominal width at a center of a representation of the fence board area, at 332, and positioning representations of additional fence boards having the nominal width adjacent to first and second sides of the first fence board, with the various representations of the fence boards spaced apart from one another by a sum of the nominal gap width and the correction factor, at 334. Mathematically, it is expected that the representations of the fence boards will completely fill the representation of the fence board area. The designing of the fence panel can be completed, at 316, and the fence panel can then be fabricated in accordance with the design, at 318.

The fabrication of the fence panel can be completed according to any one of various known methods and using any one of various known systems. In particular, the fabrication of end boards that have a smaller width than other fence boards can be fabricated by milling the end boards to size or by ripping fence boards lengthwise to obtain the desired width, at 336. In some cases, fabricating a fence panel 106 includes connecting a center fence board 110 to the fence rails 108 first, and building out, at 338, while in other cases fabricating a fence panel 106 includes connecting a first end fence board 110 to the fence rails 108 first, and building toward the second end fence board 110, at 340. The method further includes designing a second fence panel having a second overall width different than the overall width of the first fence panel by performing the same actions discussed above for the first fence panel, as indicated at 342.

Such actions can be repeated for as many fence panels as there are to be designed and fabricated.

In a second implementation of the method of designing and fabricating a fence panel 400, as illustrated in FIG. 4, the method 400 further includes dividing the overall width of a first fence panel area of a first fence panel to be fabricated by the sum of the nominal width of the fence boards and the nominal width of the gaps to obtain an estimate of the number of fence boards needed to fabricate the first fence panel, at 408.

In a first variation of this implementation, the result of the calculation of the estimate of the number of fence boards needed to fabricate the first fence panel is rounded down to the nearest whole number to obtain the number of whole fence boards to be used to fabricate the first fence panel, at 410. The number of gaps to be used to fabricate the first fence panel is then calculated as the number of fence boards to be used to fabricate the first fence panel minus one, at 412. The width of the fence boards to be used to fabricate the first fence panel is then calculated as the overall width of the first fence board area, minus the number of gaps to be used times the nominal gap width, divided by the number of whole fence boards to be used, at 414.

If the width of the fence boards to be used is less than or equal to a maximum acceptable fence board width, such as those described above or as determined by a visual inspection, then the method further includes designing the first fence panel by positioning a representation of a first fence board having the calculated width at a center of a representation of the fence board area, at 416, and positioning representations of additional fence boards having the calculated width adjacent to first and second sides of the first fence board, with the various representations of the fence boards spaced apart from one another by the nominal gap width, at 418. Mathematically, it is expected that the representations of the fence boards will completely fill the representation of the fence board area. The designing of the fence panel can be completed, at 420, and the fence panel can then be fabricated in accordance with the design, at 422.

In a second variation of this implementation, the result of the calculation of the estimate of the number of fence boards needed to fabricate the first fence panel is rounded up to the nearest whole number to obtain the number of whole fence boards to be used to fabricate the first fence panel, at 424. The number of gaps to be used to fabricate the first fence panel is then calculated as the number of fence boards to be used to fabricate the first fence panel minus one, at 426. The width of the fence boards to be used to fabricate the first fence panel is then calculated as the overall width of the first fence board area, minus the number of gaps to be used times the nominal gap width, divided by the number of whole fence boards to be used, at 428.

If the width of the fence boards to be used is greater than or equal to a minimum acceptable fence board width, such as those described above or as determined by a visual inspection, then the method further includes designing the first fence panel by positioning a representation of a first fence board having the calculated width at a center of a representation of the fence board area, at 430, and positioning representations of additional fence boards having the calculated width adjacent to first and second sides of the first fence board, with the various representations of the fence boards spaced apart from one another by the nominal gap width, at 432. Mathematically, it is expected that the representations of the fence boards will completely fill the representation of the fence board area. The designing of the fence panel can be completed, at 420, and the fence panel can then be fabricated in accordance with the design, at 422.

This second implementation allows fence panels to be fabricated with all fence boards having the same width, which can improve the strength and aesthetics of the fence panel, and its end boards in particular, over implementations in which the end boards have a smaller width than other fence boards. Such advantages can in turn improve overall yield and efficiency of the fabrication of the fence panels, further improving environmental benefits or reducing environmental costs. The fabrication of the fence panel can be completed according to any one of various known methods and using any one of various known systems. In some cases, fabricating a fence panel 106 includes connecting a center fence board 110 to the fence rails 108 first, and building out, at 434, while in other cases fabricating a fence panel 106 includes connecting a first end fence board 110 to the fence rails 108 first, and building toward the second end fence board 110, at 436. The method further includes designing a second fence panel having a fence board area having a second overall width different than the overall width of the fence board area of the first fence panel by performing the same actions discussed above for the first fence panel, as indicated at 438. Such actions can be repeated for as many fence panels as there are to be designed and fabricated.

The implementations described above include designing and fabricating fence panels 106 having fence boards 110 with gaps between them. In some alternative implementations, however, the systems and methods described herein can be applied to fence panels 106 having fence boards 110 that interlock with one another using tongue-in-groove connections. In such implementations, the fence board widths described above can be applied to fence boards excluding their tongue/groove portions, while the gap widths described above can be applied to the tongue/groove portions of the fence boards.

The software system used to perform actions described herein and design the fence panels as described above can also be configured to model and provide representations or visualizations of the fence panel designs such that the components of the fence panel designs can be selected by a user to display their position, their dimensions, and/or their cost, and to allow the user to place an order for the fence panel or components thereof.

The software used to perform actions described herein and design the fence panels as described above can be run on any suitable computer hardware system, including a computer system having various input and output devices, a memory system, one or more processors (e.g., a central processing unit), one or more network connections, a display device, etc., with mobile phones and tablets being examples of suitable computer hardware. Thus, one or more computers execute computer instructions to perform implementations described herein. Moreover, the various implementations described herein may include the presentation of one or more graphical user interfaces to a user via a display device. In some embodiments, the user may utilize one computing device to access a second, remote computing device, such as via a website or other remote connection, that is performing the implementations described herein.

The computer hardware and software systems described herein can also be used to control various other hardware systems and machinery to fabricate the fence panels described herein once they have been designed, such as those described in U.S. Pat. No. 9,945,149, the entire content of which is hereby incorporated herein by reference in its entirety. Thus, the computer hardware and software systems, in accordance with the present disclosure, may improve fence panel design and fabrication technology by, among other things, speeding up the process of designing and fabricating fence panels of varying dimensions.

Further, although implementations have been described in the context of positioning representations of fence panel components, such as through a graphical user interface of a computing device, it is appreciated that embodiments of the present invention may be implemented without visual representations. Further still, although implementations have been described in the context of positioning a center fence board at a center of a fence board region of a fence panel, it is appreciated that embodiments of the present invention may be implemented by positioning a gap between adjacent fence boards at the center of the fence board region, and a center fence board positioned on either side of the gap.

Further still, although implementations have been described in the context of fence panels having fence boards having the same width, it is appreciated that embodiments of the present invention may be implemented by providing variable fence board widths, as well as variable flute or half-flute widths, such as to have a gradient in fence board widths from end-to-end or from center-outward within the fence panel. For example, a fence panel may be provided that has a relatively narrow center fence board and fence boards that have progressively greater widths as their distance from the center board increases. As another example, a fence panel may be provided that has a relatively wide center fence board and fence boards that have progressively smaller widths as their distance from the center board increases. As another example, a fence panel may be provided that has a relatively wide fence board at a first end of the fence panel, and fence boards that have progressively smaller widths as their distance from the first end of the fence panel increases.

Interactive systems and methods are provided for designing and constructing fences or other structures supported by posts, including methods which enable users to design custom fence panels and be presented with dynamic visual representations of such custom fence panels and related bill of material information.

FIGS. 5 through 16 illustrate images of a graphical user interface, according to an example embodiment, which allows an operator to input measurements and other data regarding a plot of land on which a fence is to be built, including actual or planned location(s) of fence runs and/or actual or planned locations of fence post sleeves and/or fence posts to which respective fence panels are to be coupled. Such fence post sleeves and fence posts can include any of the features described in U.S. Pat. Nos. 8,011,149, 8,966,837, and/or 8,820,007, which are hereby incorporated herein by reference in their entireties. Data representative of such measurements and other data, or of any measurements and/or data described herein, may be stored parametrically, such that fence runs, fence panels, and fence panel components may be specified parametrically. The graphical user interface illustrated in FIGS. 5 through 16 is generated and powered by software running on a smartphone, but comparable graphical user interfaces can be generated and powered by comparable software running on any suitable computer hardware system, such as software running on a tablet, an iPad or a Windows-based or Mac desktop or laptop computer.

Figure 5:
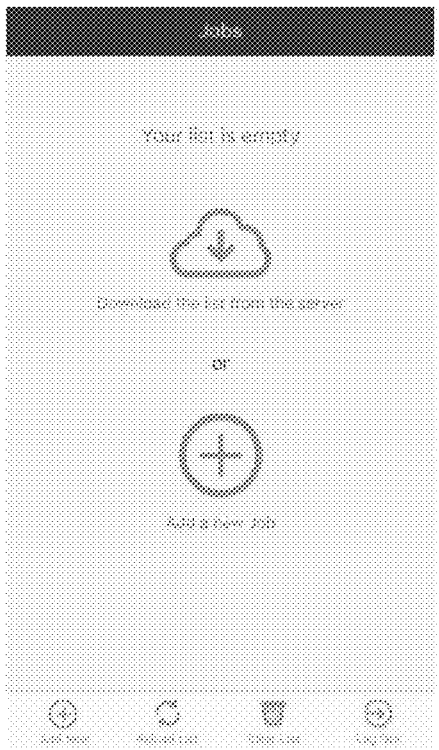
FIG. 5 shows an image of a graphical user interface that allows an operator to input measurements and other data regarding a plot of land on which a fence is to be built, according to one implementation.
Figure 6:
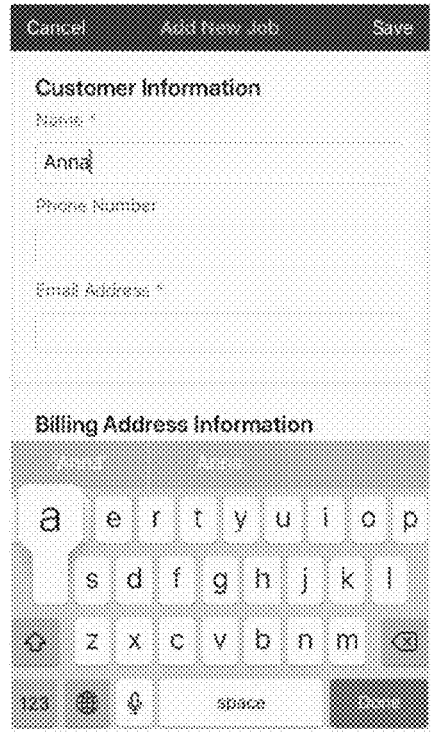
FIG. 6 shows another image of the graphical user interface that allows an operator to input measurements and other data regarding a plot of land on which a fence is to be built, according to one implementation.
Figure 7:
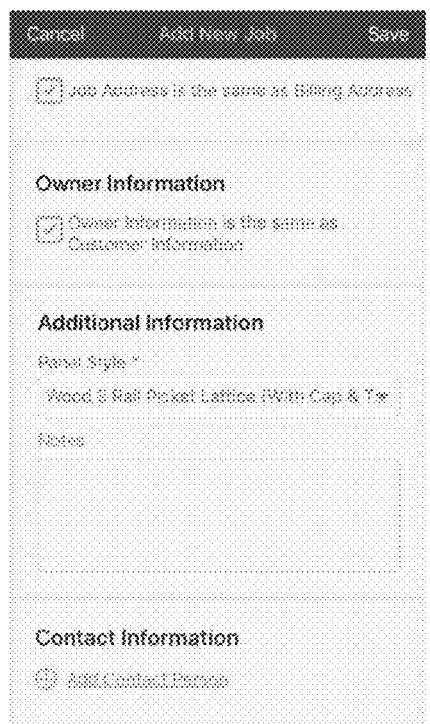
FIG. 7 shows another image of the graphical user interface that allows an operator to input measurements and other data regarding a plot of land on which a fence is to be built, according to one implementation.

FIG. 5 illustrates the graphical user interface seen by an operator upon logging into the software. Upon logging in, as seen in FIG. 5, the operator is presented with options to either download an existing list of Jobs from a remote server, or create a new Job. FIGS. 6 and 7 illustrate the graphical user interface seen by the operator upon selecting the option in FIG. 5 to create a new Job. As seen in FIGS. 6 and 7, the operator is prompted or provided the option to enter Customer Information, including a customer name and contact information as well as the identity of a fence panel style associated with the customer. At the top-right corner of the user interface shown in FIGS. 6 and 7, the operator is provided the option to save the information for the customer.

Figure 8:
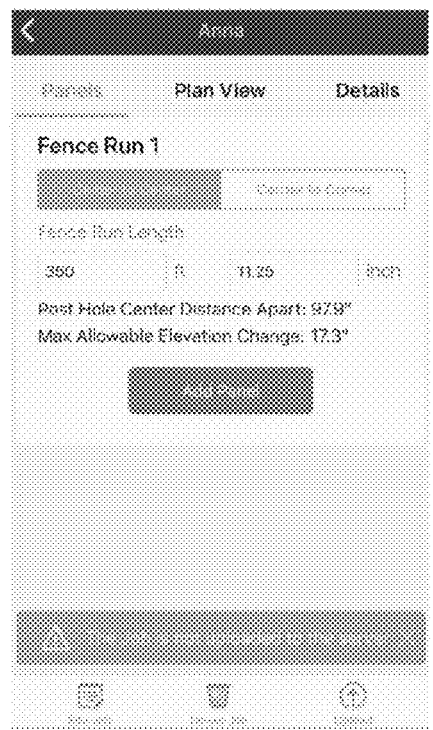
FIG. 8 shows another image of the graphical user interface that allows an operator to input measurements and other data regarding a plot of land on which a fence is to be built, according to one implementation.

FIG. 8 illustrates the graphical user interface seen by the operator upon selecting the option in FIGS. 6 and 7 to save the customer information. As seen in FIG. 8, the operator is provided the option to enter a length of a first fence run for which measurements or other information is to be input (which, as is the case for the lengths of any other fence runs described herein, may be specified either as a post center to post center distance or as a post corner to post corner distance). In response to the operator inputting a length of the first fence run, such as 350 feet and 11.25 inches, the software can calculate and present in the graphical user interface an average horizontal distance, such as 97.9 inches, between fence post holes, fence post sleeves, or fence posts that would result in the first fence run having complete fence panels, without truncated fence panels at an end of the first fence run, and that would allow the first fence run to be built exclusively with fence panels of equal length. The software can also calculate and present in the graphical user interface a maximum allowable elevation change between two fence post holes, fence post sleeves, or fence posts spaced apart by the average distance. The maximum elevation change may be based at least in part on the average horizontal distance between fence post holes, fence post sleeves, or fence posts, and common lumber lengths for the fence components.

In some implementations, the software can calculate and present to the operator in the graphical user interface a representation of rough locations of fence post holes, fence post sleeves, or fence posts spaced apart from one another by the calculated average horizontal distance. In such implementations, the operator can take elevation measurements at such rough locations and provide the measurements to the software. The software can analyze the measurements, update the calculations based on the elevation measurement information, and present to the operator in the graphical user interface a representation of updated locations of fence posts holes, fence post sleeves, or fence posts spaced apart from one another by approximately the calculated average horizontal distance. The updated locations can be calculated or determined by the software to avoid positioning fence post holes, fence post sleeves, or fence posts at locations having problematic elevations. As also seen in FIG. 8, the operator is provided the option within the graphical user interface to input information regarding a first fence panel to be installed within the first fence run.

Figure 9:
FIG. 9 shows another image of the graphical user interface that allows an operator to input measurements and other data regarding a plot of land on which a fence is to be built, according to one implementation.

FIG. 9 illustrates the graphical user interface seen by the operator upon selecting the option in FIG. 8 to input information regarding the first fence panel. As seen in FIG. 9, the operator is provided the option to enter two unique identifiers, e.g., df1235 and g23g5j, each of which uniquely identifies a respective fence post hole, fence post sleeve, or fence post to which the first fence panel will be coupled. The fence panel can be assigned a unique identifier that is a combination of the unique identifiers for the two fence post holes, fence post sleeves, or fence posts to which the fence panel will be coupled. The software generating and powering the graphical user interface can be communicatively coupled, such as through a cellular, Wi-Fi, Bluetooth, or other wireless or wired connection, to a measuring device having one or more of the features described in U.S. Pat. No. 7,861,434 or in U.S. patent application publication no. 2017/0260771, the entire contents of which are hereby incorporated herein by reference in their entireties. The operator or another operator can operate the measuring device to provide measurements between and regarding the relative locations and/or orientations of the two fence post holes, fence post sleeves, or fence posts associated with the unique identifiers already entered into the graphical user interface.

Such measurements can include a length of a portion, such as a beam, of the measuring device while taking the measurements (e.g., 84 inches), an angle at which the portion of the measuring device rises above horizontal (e.g., zero degrees), an overall distance between the two fence post holes, fence post sleeves, or fence posts (e.g., 91 inches), an elevation change between the two fence post holes, fence post sleeves, or fence posts (e.g., zero inches), an angle at which a first joint of the measuring device is rotated (e.g., zero degrees), an angle at which a second joint of the measuring device is rotated (e.g., zero degrees), and latitude and/or longitude information for one or both of the fence post holes, fence post sleeves, or fence posts. Such measurements can allow the computation of relative distances and relative headings between the two fence post holes, fence post sleeves, or fence posts. In some implementations, such measurements and computations can also allow a display of rough estimates of the locations, relative distances, and relative headings on a map, in a visualization resembling Google Earth, such as with land survey data overlaid thereon, for example. As also seen in FIG. 9, the operator is provided the option within the graphical user interface to save the measurements regarding the two fence post holes, fence post sleeves, or fence posts associated with the unique identifiers already entered into the graphical user interface.

Figure 10:
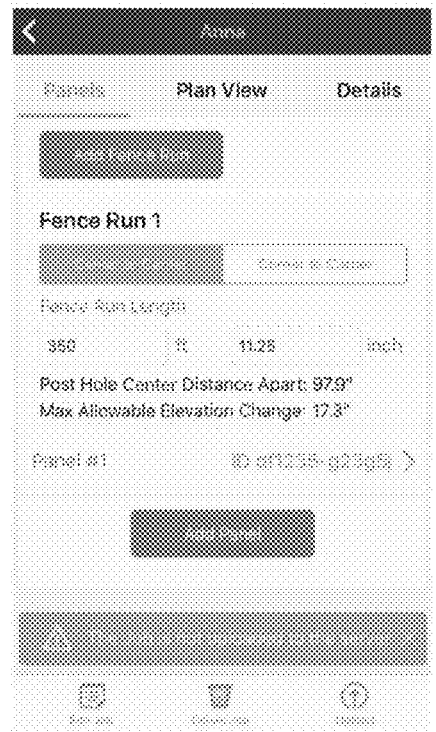
FIG. 10 shows another image of the graphical user interface that allows an operator to input measurements and other data regarding a plot of land on which a fence is to be built, according to one implementation.

FIG. 10 illustrates the graphical user interface seen by the operator upon selecting the option in FIG. 9 to save the panel information. As seen in FIG. 10, the graphical user interface provides information reflecting the information the operator has input regarding the first fence run and the first fence panel, which is identified using a combination of the unique identifiers uniquely identifying the respective fence post holes, fence post sleeves, or fence posts to which the first fence panel will be coupled. In some implementations, the software calculates and presents in the graphical user interface an average horizontal distance between fence post holes, fence post sleeves, or fence posts that would result in a remaining portion of the first fence run (other than its first fence panel) having complete fence panels, without truncated fence panels at an end of the first fence run, and that would allow the remaining portion of the first fence run to be built exclusively with fence panels of equal length. As also seen in FIG. 10, the operator is provided the option within the graphical user interface to input information regarding a second fence panel to be installed within the first fence run.

Figure 11:
FIG. 11 shows another image of the graphical user interface that allows an operator to input measurements and other data regarding a plot of land on which a fence is to be built, according to one implementation.

FIG. 11 illustrates the graphical user interface seen by the operator upon selecting the option in FIG. 10 to input information regarding the second fence panel. As seen in FIG. 11, the operator is provided the option to enter two unique identifiers, e.g., g23g5j and gh34gb, each of which uniquely identifies a respective fence post hole, fence post sleeve, or fence post to which the second fence panel will be coupled. In the illustrated example, one of the unique identifiers associated with the first fence panel is also associated with the second fence panel, indicating that the first and second fence panels will be coupled to the same fence post hole, fence post sleeve, or fence post. In some implementations, a second one of the unique identifiers entered by the operator for the first fence panel is auto-populated in the graphical user interface as the first one of the unique identifiers associated with the second fence panel. The operator or another operator can operate the measuring device to provide measurements between and regarding the relative locations and/or orientations of the two fence post holes, fence post sleeves, or fence posts associated with the unique identifiers already entered into the graphical user interface.

Such measurements can include a length of a portion, such as a beam, of the measuring device while taking the measurements (e.g., 80 inches), an angle at which the portion of the measuring device rises above horizontal (e.g., zero degrees), an overall distance between the two fence post holes, fence post sleeves, or fence posts (e.g., 87 inches), an elevation change between the two fence post holes, fence post sleeves, or fence posts (e.g., zero inches), an angle at which a first joint of the measuring device is rotated (e.g., zero degrees), an angle at which a second joint of the measuring device is rotated (e.g., zero degrees), and latitude and/or longitude information for one or both of the fence post holes, fence post sleeves, or fence posts. As also seen in FIG. 11, the operator is provided the option within the graphical user interface to save the measurements regarding the two fence post holes, fence post sleeves, or fence posts associated with the unique identifiers already entered into the graphical user interface.

Figure 12:
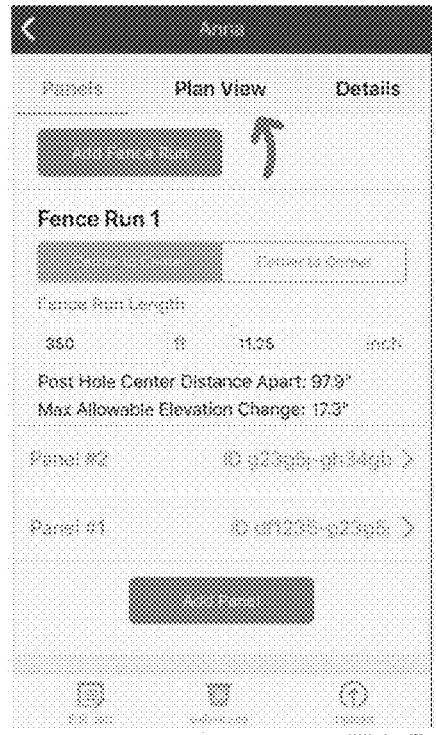
FIG. 12 shows another image of the graphical user interface that allows an operator to input measurements and other data regarding a plot of land on which a fence is to be built, according to one implementation.

FIG. 12 illustrates the graphical user interface seen by the operator upon selecting the option in FIG. 11 to save the panel information. As seen in FIG. 12, the graphical user interface provides information reflecting the information the operator has input regarding the first fence run and the first and second fence panels, with the first and second fence panels identified using a combination of their respective unique identifiers uniquely identifying the respective fence post holes, fence post sleeves, or fence posts to which the respective fence panel will be coupled. In some implementations, the software calculates and presents in the graphical user interface an average horizontal distance between fence post holes, fence post sleeves, or fence posts that would result in a remaining portion of the first fence run (other than its first and second fence panels) having complete fence panels, without truncated fence panels at an end of the first fence run, and that would allow the remaining portion of the first fence run to be built exclusively with fence panels of equal length.

In some implementations, as a user continues to input information regarding the fence post holes, fence post sleeves, or fence posts to which fence panels of the fence run will be coupled, the software can continue to update its calculations of the average horizontal distance between fence post holes, fence post sleeves, or fence posts in a remaining portion of the fence run. The software can also compare such calculated average horizontal distances to length or other dimensional limitations of the fence panel style associated with the customer entered by the operator as discussed above with respect to FIGS. 6 and 7, such as a maximum allowable length of a fence panel rail. If such a comparison reveals that the calculated average horizontal distance approximates or matches such a limitation, then the software can alert the operator to this issue within the graphical user interface so that the operator can adjust the placement of remaining fence post holes, fence post sleeves, or fence posts in order to ensure that the limitations will be met by the end of the fence run.

If such a comparison reveals that the calculated average horizontal distance exceeds such a limitation, then the software can re-design the fence to include an additional fence panel and calculate and present in the graphical user interface an average horizontal distance between fence post holes, fence post sleeves, or fence posts that would result in a remaining portion of the first fence run (other than its first and second fence panels, and including the additional fence panel) having complete fence panels, without truncated fence panels at an end of the first fence run, and that would allow the remaining portion of the first fence run to be built exclusively with fence panels of equal length. As also seen in FIG. 12, the operator is provided the option within the graphical user interface to view a plan view of a fence based on the information the operator has input so far.

Figure 13:
FIG. 13 shows another image of the graphical user interface that allows an operator to input measurements and other data regarding a plot of land on which a fence is to be built, according to one implementation.

FIG. 13 illustrates the graphical user interface seen by the operator upon selecting the option in FIG. 12 to view a plan view of the fence based on the information the operator has input so far. As seen in FIG. 13, the graphical user interface provides a visual representation or a visualization of a fence having a single fence run having two individual fence panels. In some implementations, a straight line can be overlaid on the visualization of the single fence run to allow the operator to more easily detect anomalies within the visualization of the fence run. As also seen in FIG. 13, the operator is provided the option within the graphical user interface to return to the graphical user interface as it is illustrated in FIG. 12. As illustrated in FIG. 12, the operator is provided the option within the graphical user interface to add a second fence run.

Figure 14:
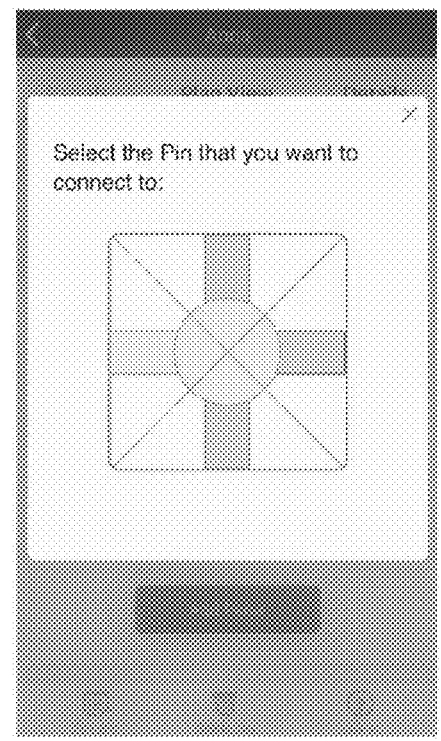
FIG. 14 shows another image of the graphical user interface that allows an operator to input measurements and other data regarding a plot of land on which a fence is to be built, according to one implementation.

FIG. 14 illustrates the graphical user interface seen by the operator upon selecting the option in FIG. 12 to add a second fence run. As seen in FIG. 14, the operator is prompted or provided the option to input information regarding a corner of the fence where the first fence run meets the second fence run. For example, the user can indicate that the fence turns left from the first fence run to the second fence run when viewed from above, or that the fence turns right from the first fence run to the second fence run when viewed from above, or that the fence continues straight from the first fence run to the second fence run when viewed from above. Such information can be communicated to and/or used by the measurement device when taking subsequent measurements corresponding to those described above, and/or can be used within the software to convert measurements taken by the measurement device into useful information or in visualizing the fence.

Figure 15:
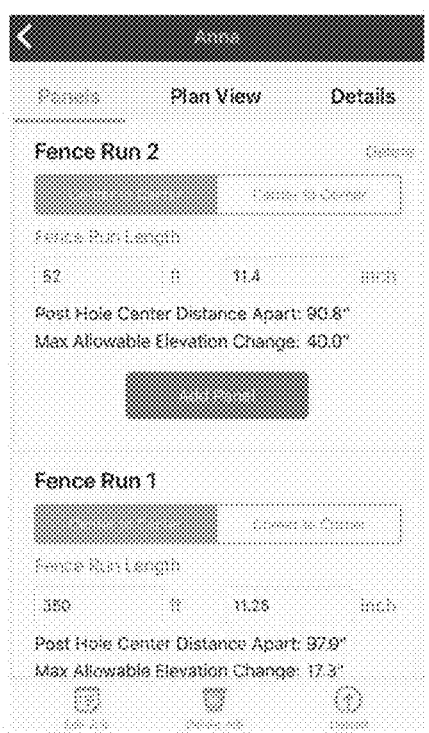
FIG. 15 shows another image of the graphical user interface that allows an operator to input measurements and other data regarding a plot of land on which a fence is to be built, according to one implementation.

FIG. 15 illustrates the graphical user interface seen by the operator after inputting the information regarding the corner of the fence where the first fence run meets the second fence run. As seen in FIG. 15, the operator is provided the option to enter a length of the second fence run for which measurements or other information is to be input. In response to the operator inputting a length of the second fence run, such as 52 feet and 11.4 inches, the software can calculate and present in the graphical user interface an average horizontal distance, such as 90.8 inches, between fence post holes, fence post sleeves, or fence posts that would result in the second fence run having complete fence panels, without truncated fence panels at an end of the second fence run, and that would allow the second fence run to be built exclusively with fence panels of equal length. This can be done by dividing the total length of the fence run, e.g., 635.4 inches, by the sum of the nominal length of a standard rail component, e.g., 96 inches, and nominal post width (e.g., 4 inches), to identify the number of rails that will be needed by rounding up the quotient to the next integer (e.g., 6.4 is rounded to 7), and then dividing the total fence run, e.g., 635.4 inches, by that integer, e.g., 7, to arrive at the average horizontal distance e.g., 90.8 inches.

The software can also calculate and present in the graphical user interface a maximum allowable elevation change between two fence post holes, fence post sleeves, or fence posts spaced apart by the average distance. This may be calculated, for example, by determining the elevation change corresponding to a pitch at which a rail aligned at said pitch would reach but not exceed the nominal length of the rail component. As also seen in FIG. 15, the operator is provided the option within the graphical user interface to input information regarding a first fence panel to be installed within the second fence run. Upon selecting the option in FIG. 15 to add a first fence panel within the second fence run, the operator can be shown the graphical user interface in a configuration similar to that illustrated in FIGS. 9 and 11, and the operator or another operator can input information for the first fence panel of the second fence run in a manner similar to that described above, such as by using a measuring device in the manner described above.

Figure 16:
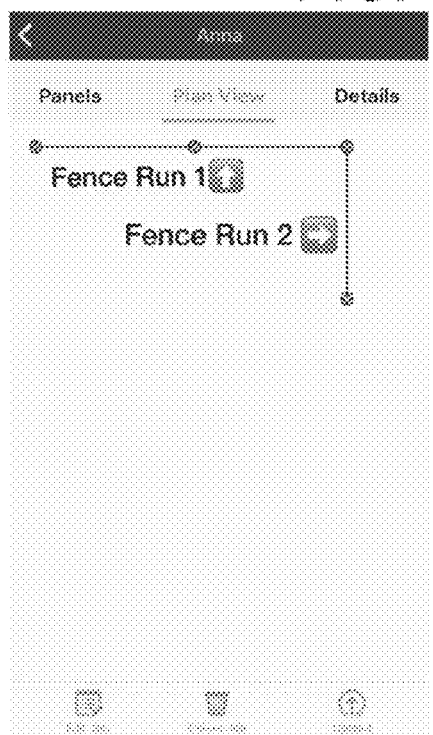
FIG. 16 shows another image of the graphical user interface that allows an operator to input measurements and other data regarding a plot of land on which a fence is to be built, according to one implementation.

FIG. 16 illustrates the graphical user interface seen by the operator after inputting the information regarding the first fence panel of the second fence run and selecting an option, as described above, to view a plan view of a fence based on the information the operator has input so far. As seen in FIG. 16, the graphical user interface provides a visualization of a fence having a two fence runs, the first fence run having two individual fence panels and the second fence run having a single fence panel. As also illustrated in FIG. 16, the operator is offered to option to upload the information input so far, such as to a remote database accessible over the internet. Once the operator has completed inputting information, the operator can select this option to upload the information to such a database, where the information can be collected, stored, organized, analyzed, and labeled or categorized as a "Job." Upon logging into the software in the future, the operator will be presented with the option to download an existing list of Jobs from a remove server, which can include the information input as described above. If the operator opts to do so, the operator can modify or add information to the previously entered information.

FIGS. 16A through 16F illustrate images of a graphical user interface that allows an operator to input estimated information for one or more fence runs of a fence. The graphical user interface illustrated in FIGS. 16A through 16F is generated and powered by software running within a browser on a Windows-based computer, but comparable graphical user interfaces can be generated and powered by comparable software running on any suitable computer hardware system, such as locally and natively on the computer hardware system or within a browser running on the computer hardware system, such as on an Android-based smartphone or tablet, an iPhone or iPad, or a Windows-based or Mac desktop or laptop computer.

Figure 16A:
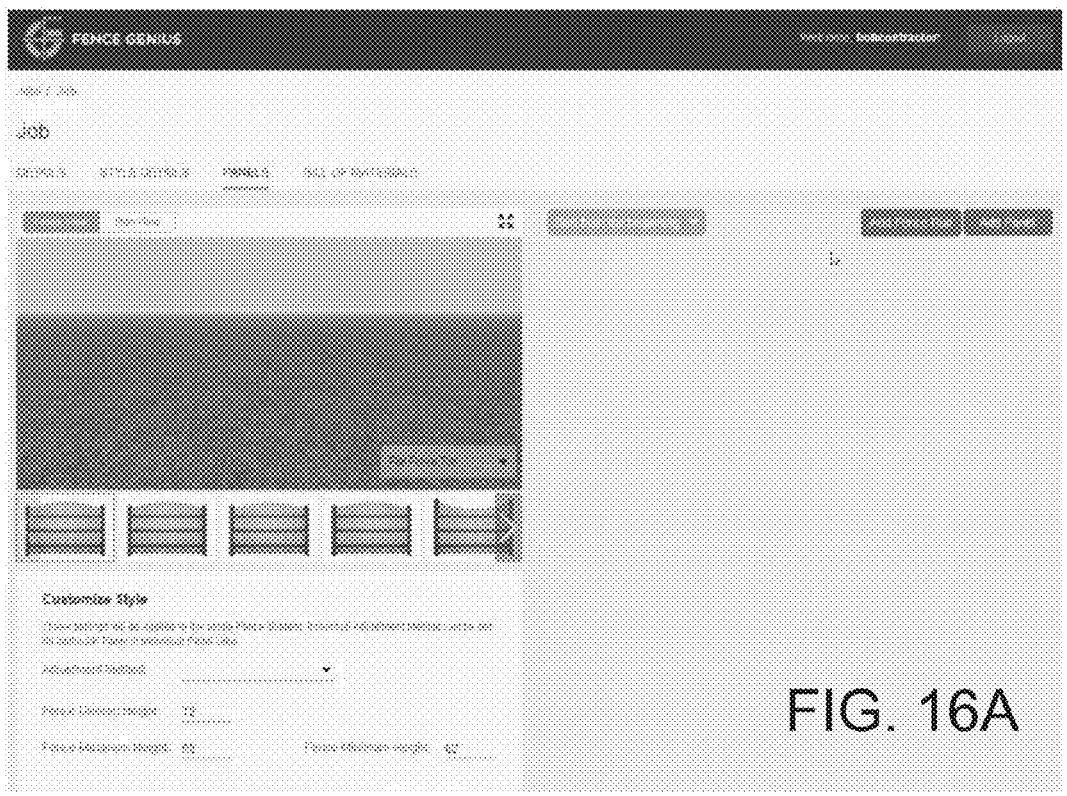
FIG. 16A shows an image of another graphical user interface that allows an operator to input rough measurements or estimates for use in generating a visualization of fence components, according to one implementation.
Figure 16B:
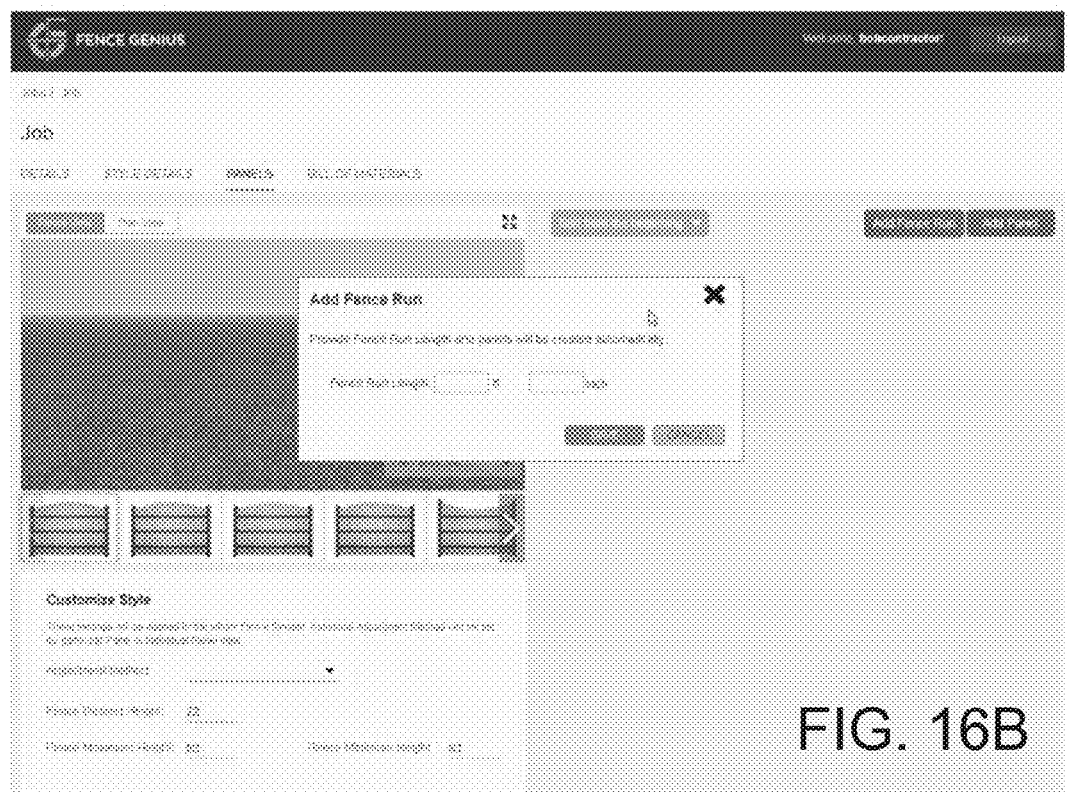
FIG. 16B shows another image of the graphical user interface that allows an operator to input rough measurements or estimates for use in generating a visualization of fence components, according to one implementation.
Figure 16C:
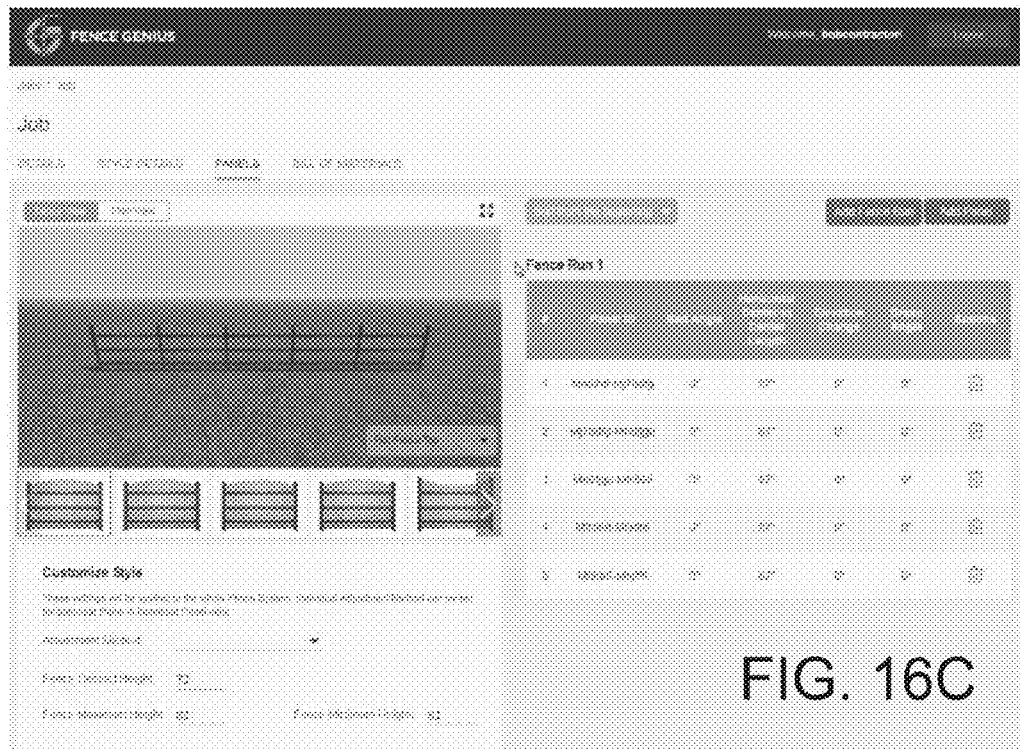
FIG. 16C shows another image of the graphical user interface that allows an operator to input rough measurements or estimates for use in generating a visualization of fence components, according to one implementation.

FIG. 16A illustrates the graphical user interface seen by an operator upon logging into the software. Upon logging in, as seen in FIG. 16A, the operator is presented with an option to add a fence run. FIG. 16B illustrates the graphical user interface seen by the operator upon selecting the option to add a fence run. As illustrated in FIG. 16B, the operator is presented with the option to input an estimated length of a first fence run. FIG. 16C illustrates the graphical user interface seen by the operator upon inputting an estimated length of the first fence run, which can be, for example, 30 feet and 11.5 inches. As illustrated in FIG. 16C, the software can determine an estimated number of fence panels, determine estimated dimensions for each of those fence panels, and display a visualization of those panels, as well as present information regarding each of the fence panels to the side of the visualization. FIG. 16C also illustrates that the operator is presented with an option to add a second fence run.

Figure 16D:
FIG. 16D shows another image of the graphical user interface that allows an operator to input rough measurements or estimates for use in generating a visualization of fence components, according to one implementation.
Figure 16E:
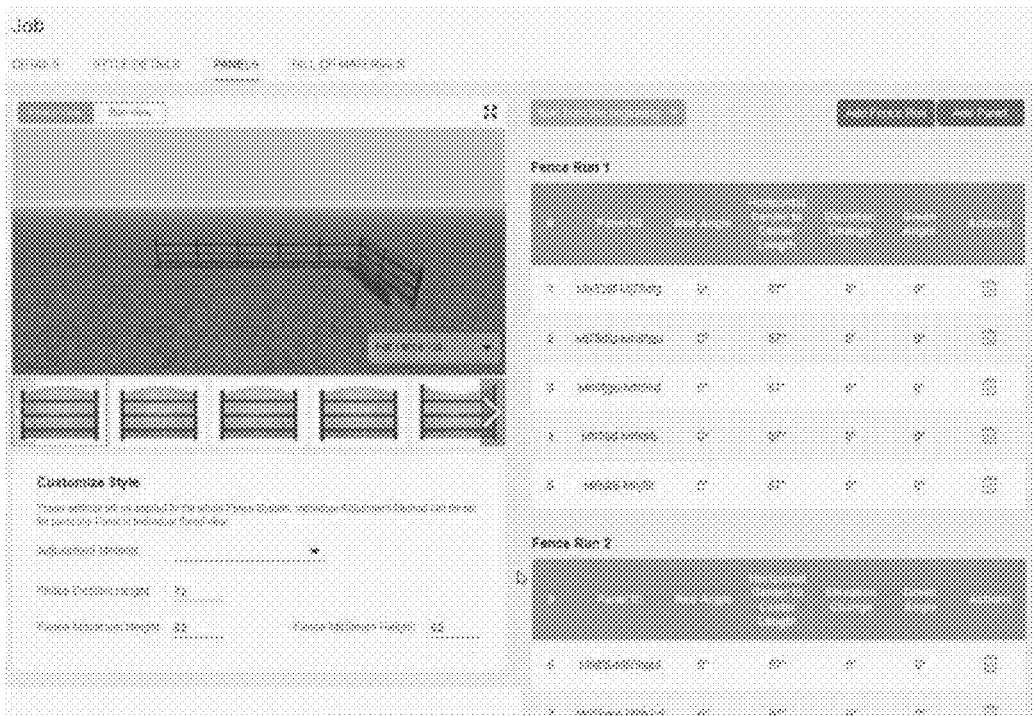
FIG. 16E shows another image of the graphical user interface that allows an operator to input rough measurements or estimates for use in generating a visualization of fence components, according to one implementation.
Figure 16F:
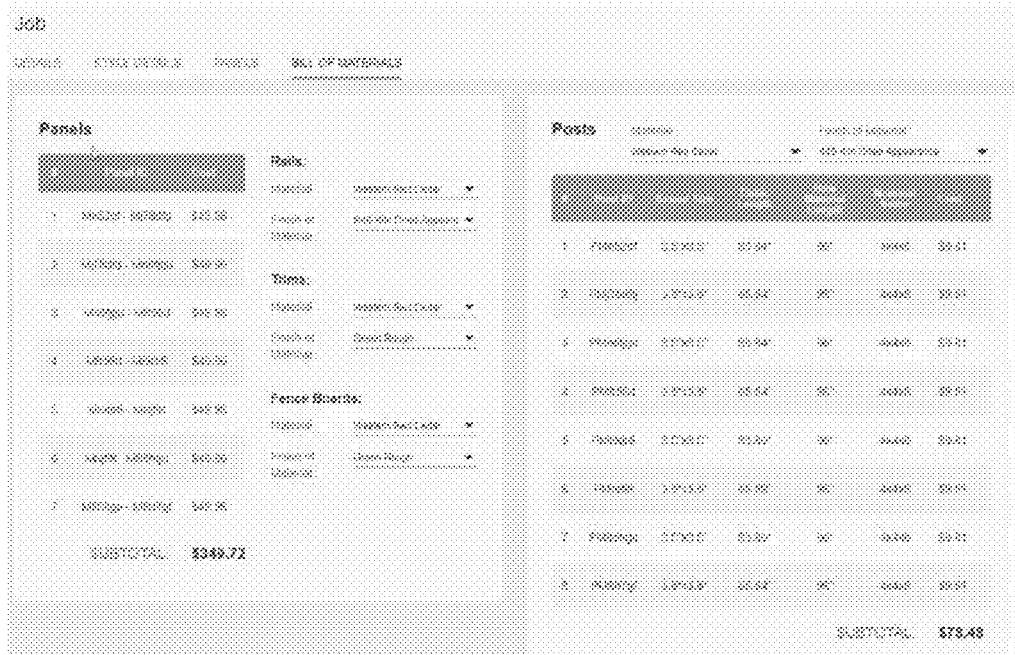
FIG. 16F shows another image of the graphical user interface that allows an operator to input rough measurements or estimates for use in generating a visualization of fence components, according to one implementation.

FIG. 16D illustrates the graphical user interface seen by the operator upon selecting the option in FIG. 16C to add a second fence run. As illustrated in FIG. 16D, the operator is presented with the option to input information regarding a corner of the fence where the first fence run meets the second fence run, as well as an estimated length of the second fence run. FIG. 16E illustrates the graphical user interface seen by the operator upon inputting an estimated length of the second fence run, which can be, for example, 14 feet and 6 inches. As illustrated in FIG. 16E, the software can determine an estimated number of fence panels within the second fence run, determine estimated dimensions for each of those fence panels, and display a visualization of those panels adjacent and coupled to the fence panels of the first fence run, as well as present information regarding each of the fence panels to the side of the visualization. FIG. 16E also illustrates that the operator is presented with an option to view a bill of materials for the first and second fence runs. FIG. 16F illustrates the graphical user interface and the bill of materials seen be the operator upon selecting the option in FIG. 16E to view the bill of materials.

In some implementations, an operator can measure lines or areas to be fenced rather roughly, and based on those rough measurements, provide estimated lengths of fence runs to a software system as described with respect to FIGS. 16A through 16F. The software system can then provide the information described with respect to FIGS. 16A through 16F, including rough cost estimates of the fence, its fence runs, their fence panels, and their constituent components, as well as the visualization of the fence and its fence runs. The operator can then use this additional information to assist in marking estimated locations for fence posts, fence post sleeves, or fence post holes on the ground, and to assist in measuring the elevation changes between such locations. In some implementations, such measurements can be taken by measuring the elevation change from a single one of the locations to each of the other locations, such as with a laser level measuring device. In other implementations, such measurements can be taken by measuring the elevation change from a first location to a second location, from the second location to a third, from the third to a fourth, repeatedly until the elevation of each location has been measured, such as with an 8' level and a tape measure.

The software system can then update and/or refine the estimated locations of the fence posts, fence post sleeves, or fence post holes based on this additional information. The software system can also check that a fence made with fence panels of a desired or specified style can be installed on posts at the estimated locations, based on the constraints imposed by the estimated locations, the elevation information, and the style(s) of the fence panels. In some implementations, once such checks have been performed, the customer can place an order and a contractor or other technician can take actual measurements as described herein with respect to FIGS. 5-16. In other implementations, once such checks have been performed, the customer can place an order and a contractor or other technician can build the fence on-site based on the estimates and rough measurements.

FIGS. 16G through 16K illustrate images of a graphical user interface that allows an operator such as an individual customer or end consumer to manually measure and input measurements for one or more fence panels. The graphical user interface illustrated in FIGS. 16G through 16K is generated and powered by software running within a browser on a Windows-based computer, but comparable graphical user interfaces can be generated and powered by comparable software running on any suitable computer hardware system, such as locally and natively on the computer hardware system or within a browser running on the computer hardware system, such as on an Android-based smartphone or tablet, an iPhone or iPad, or a Windows-based or Mac desktop or laptop computer.

Figure 16G:
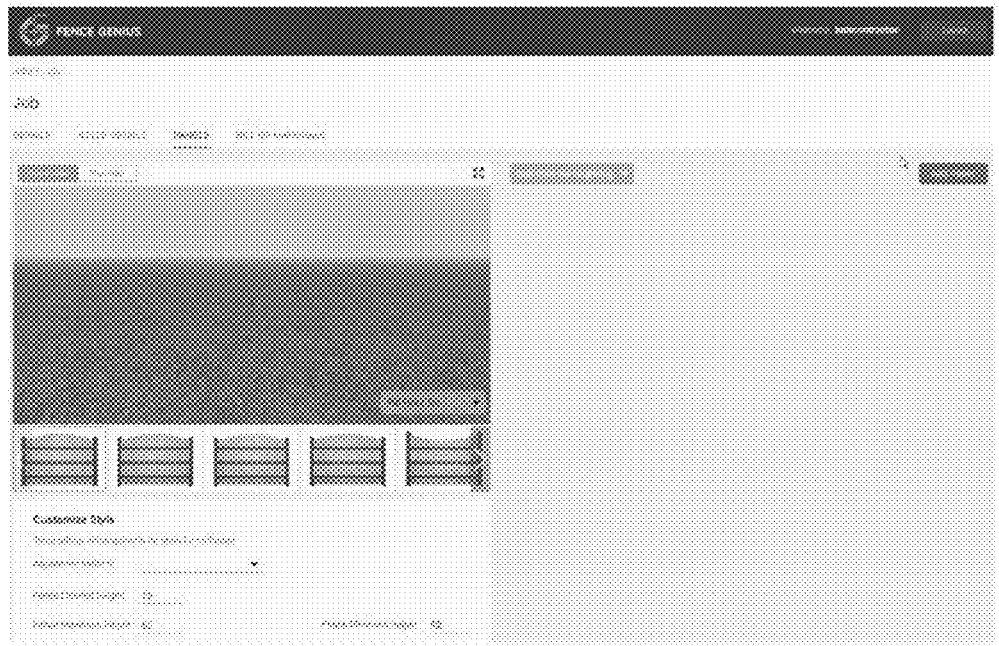
FIG. 16G shows an image of another graphical user interface that allows an operator to input manual measurements and other data regarding one or more fence panels, according to one implementation.
Figure 16H:
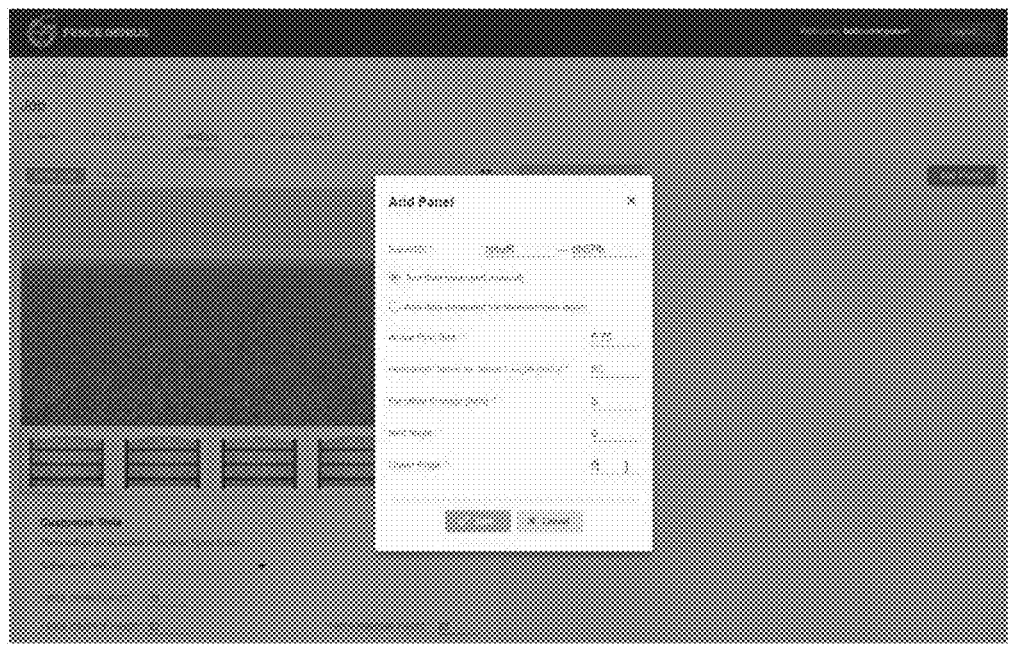
FIG. 16H shows another image of the graphical user interface that allows an operator to input manual measurements and other data regarding one or more fence panels, according to one implementation.
Figure 16I:
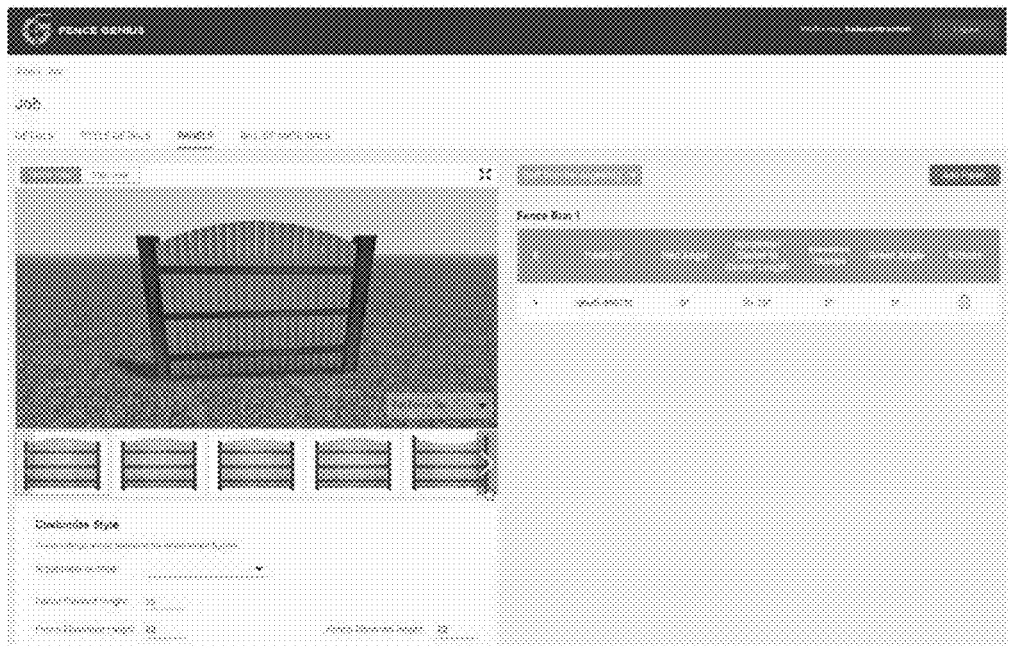
FIG. 16I shows another image of the graphical user interface that allows an operator to input manual measurements and other data regarding one or more fence panels, according to one implementation.

FIG. 16G illustrates the graphical user interface seen by an operator upon logging into the software. Upon logging in, as seen in FIG. 16G, the operator is presented with an option to add information regarding an individual fence panel. FIG. 16H illustrates the graphical user interface seen by the operator upon selecting the option to add information regarding the fence panel. As illustrated in FIG. 16H, the operator is presented with the option to input a panel ID number and manually measured information for the fence panel, including a length of the fence panel between two fence posts, a height change between the two fence posts, and angles at which the fence panel will be oriented with respect to adjacent fence panels. FIG. 16I illustrates the graphical user interface seen by the operator upon inputting such information. As illustrated in FIG. 16I, the software can display a visualization of the fence panel. FIG. 16C also illustrates that the operator is presented with an option to add information for a second fence panel.

Figure 16J:
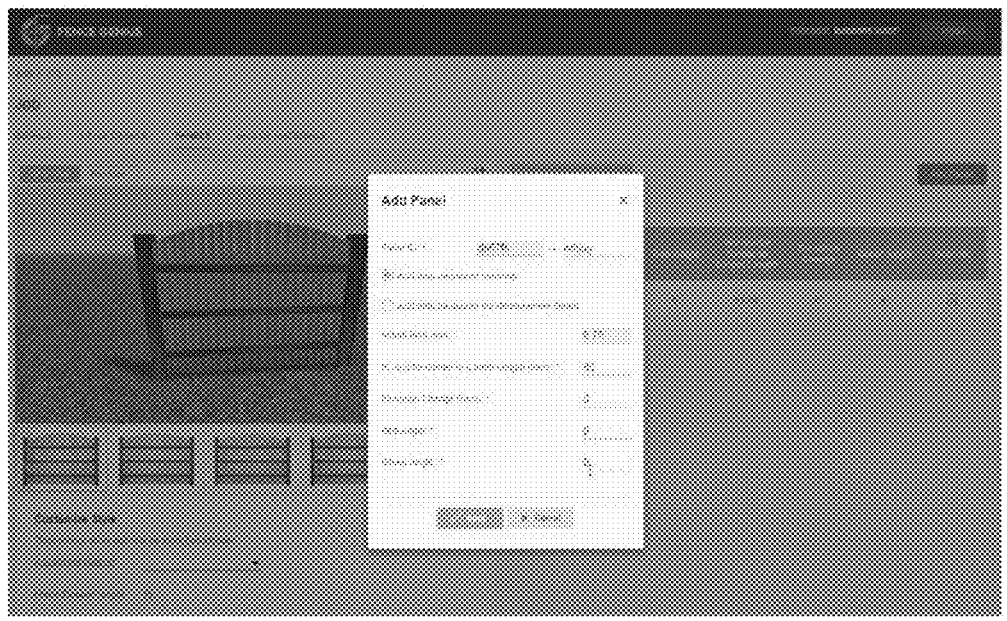
FIG. 16J shows another image of the graphical user interface that allows an operator to input manual measurements and other data regarding one or more fence panels, according to one implementation.
Figure 16K:
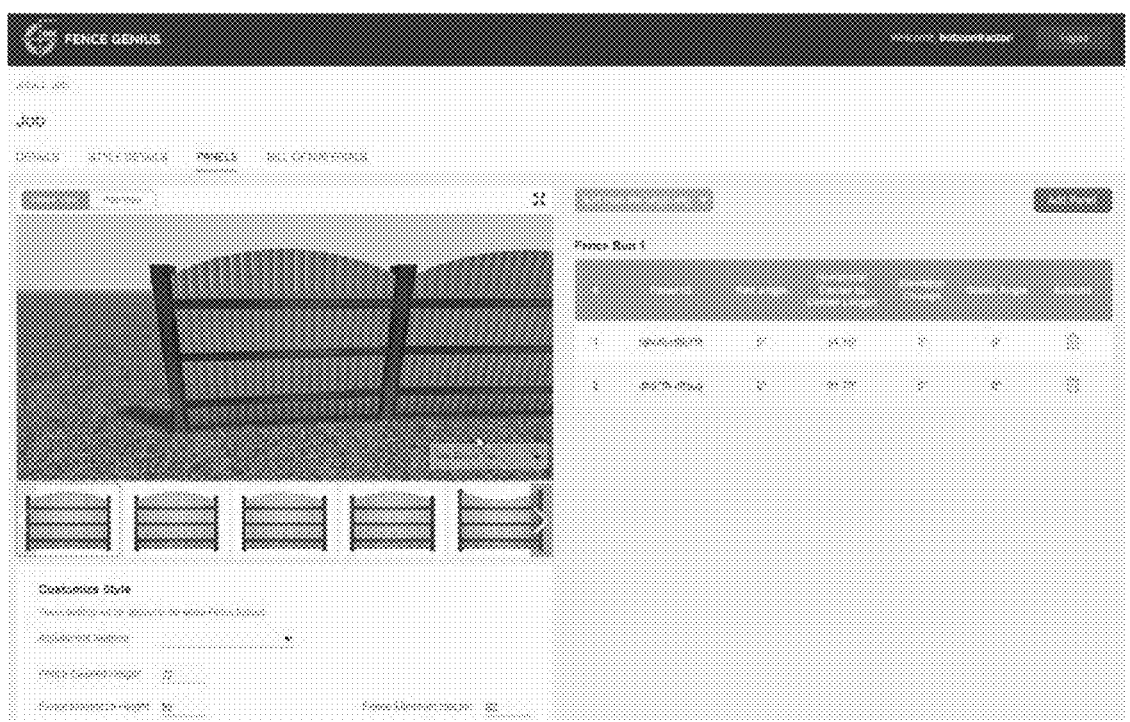
FIG. 16K shows another image of the graphical user interface that allows an operator to input manual measurements and other data regarding one or more fence panels, according to one implementation.

FIG. 16J illustrates the graphical user interface seen by the operator upon selecting the option in FIG. 16I to add information for a second fence panel. As illustrated in FIG. 16J, the operator is presented with the option to input a panel ID number and manually measured information for the second fence panel, including a length of the second fence panel between two fence posts, a height change between the two fence posts, and angles at which the second fence panel will be oriented with respect to adjacent fence panels. FIG. 16K illustrates the graphical user interface seen by the operator upon inputting such information. As illustrated in FIG. 16K, the software can display a visualization of the second fence panel adjacent to the first fence panel.

The software system and the graphical user interface can then present the operator with an option to purchase the fence panels illustrated in the visualization. The software and graphical user interface can allow an ordinary homeowner to take manual measurements of lines or areas on their property to be fenced, customize their desired fence and fence panel style(s), and place an order for the appropriate fence, fence panel(s), or fence panel components.

In some implementations, other software and other graphical user interface(s) are provided to allow an operator such as an individual customer or end consumer to shop for fence panels, to select a fence panel style, to manually measure and input measurements for one or more fence panels, and to purchase or order one or more corresponding fence panels. Such software and graphical user interface(s) can be used by an end consumer to shop for and purchase a single fence panel, or a plurality of fence panels, based on the consumer's individual needs. Such software and graphical user interface(s) can provide a "Quick Purchase" option for the consumer to purchase the fence panel(s) online.

In such implementations, the consumer can open their web browser and navigate to a webpage hosting the software and presenting the graphical user interface(s). A graphical user interface can allow the consumer to select a material for their fence panel(s) and then present the consumer with a plurality of options for fence panel styles made from the selected material. In some cases, the graphical user interface can allow the consumer to narrow down the selection of fence panel styles being presented, such as by selecting categories of fence panel styles they are interested in. For example, the graphical user interface can present the consumer with options to narrow down the styles being presented by price range, by numbers of specific components in the style, and/or by a characteristic of the fence panel style's top edge.

Figures 16L, 16M:
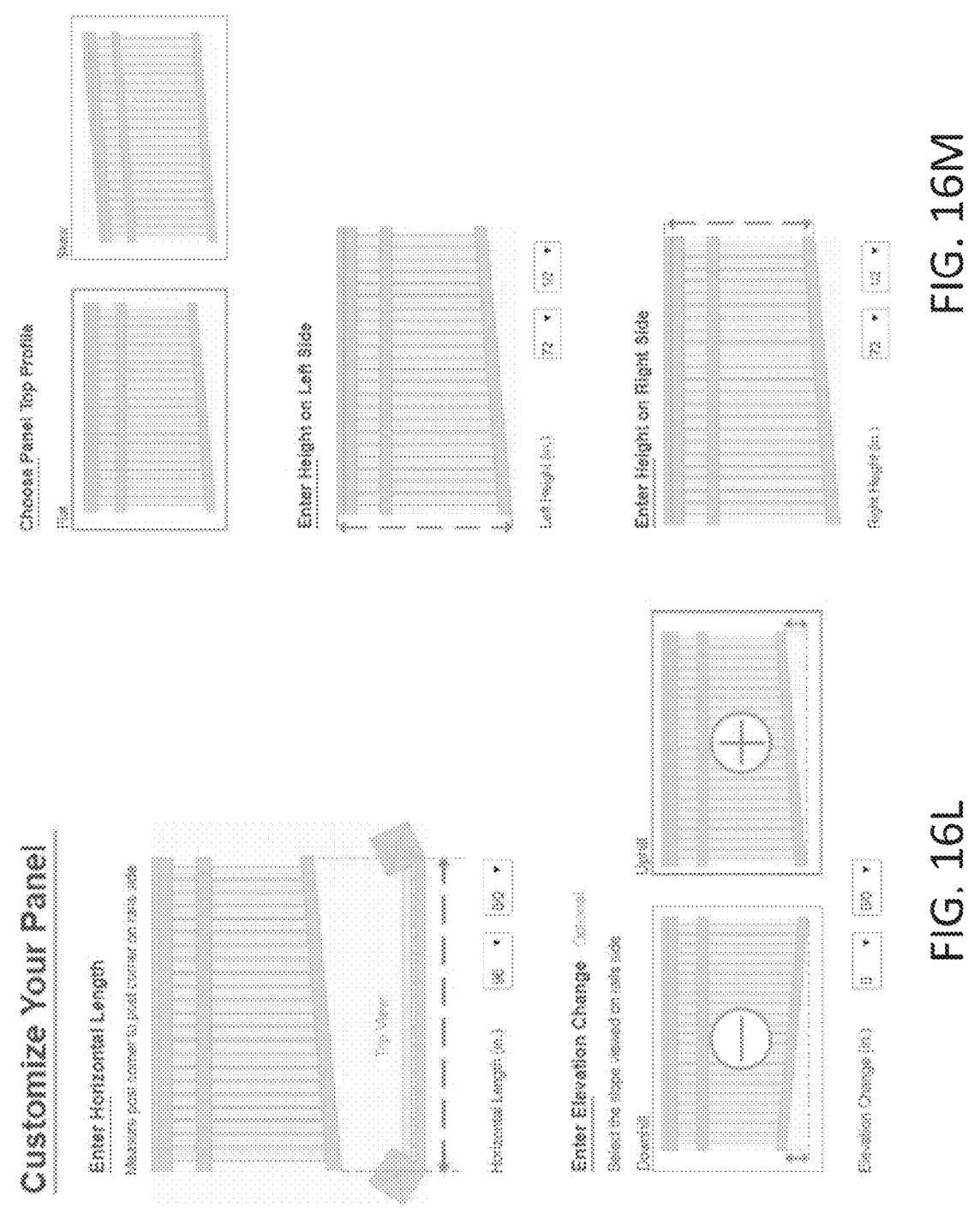
Figure 16N:
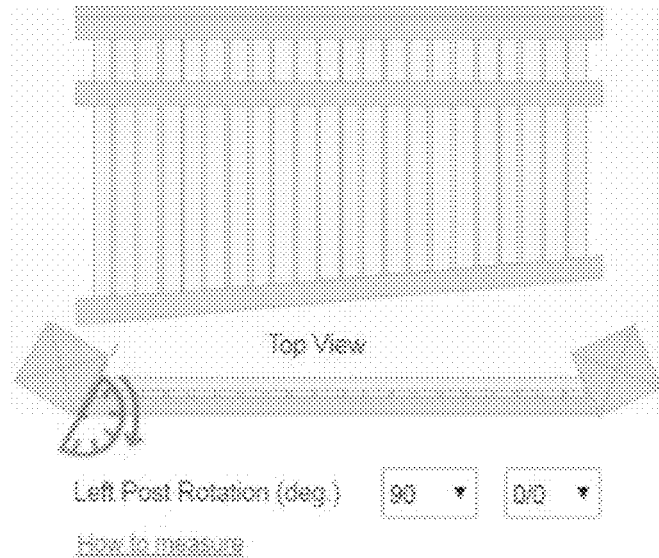
FIG. 16N shows another image of the graphical user interface of FIG. 16L that allows a consumer to select, customize, and order a fence panel online.
Figure 16N:
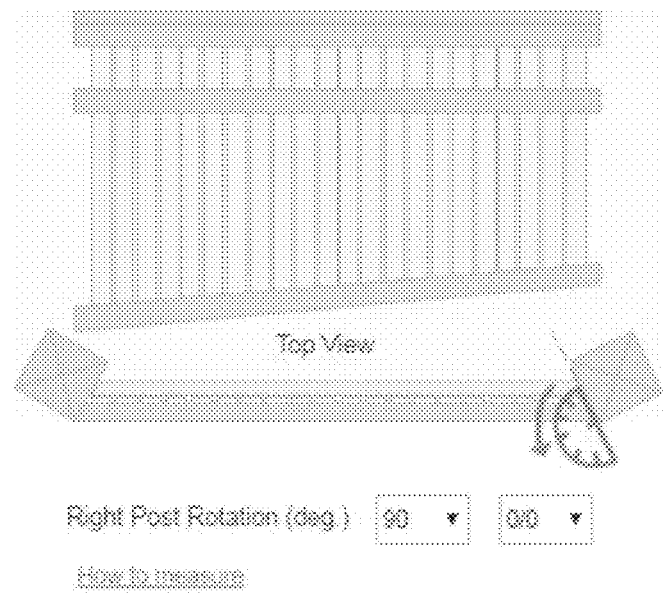

The graphical user interface can allow the consumer to select one of the fence panel styles being displayed, and to input desired characteristics of the fence panel, such as a length and/or a height of the fence panel. The graphical user interface can also allow the consumer to purchase a fence panel having the selected style and desired characteristics, and/or to further customize the fence panel. FIGS. 16L-16N illustrate portions of the graphical user interface presented to the consumer if the consumer opts to further customize their fence panel prior to purchase. As illustrated in FIG. 16L, the graphical user interface prompts the consumer to enter a horizontal length of the fence panel, as measured from a corner of a first one of the fence posts to which the fence panel will be coupled to a corner of a second one of the fence posts to which the fence panel will be coupled. As also illustrated in FIG. 16L, the graphical user interface prompts the consumer to enter a slope, or an elevation change, between the ground surface at the first and second posts to which the fence panel will be coupled.

As illustrated in FIG. 16M, the graphical user interface prompts the consumer to select a panel top profile, such as level or sloped to match the slope of the panel bottom profile, or to match the slope of the ground surface. As also illustrated in FIG. 16M, the graphical user interface prompts the consumer to enter a height or length of the left and right sides of the fence panel. As illustrated in FIG. 16N, the graphical user interface prompts the consumer to enter angles signifying the rotation of the first and second posts with respect to a longitudinal axis of the fence panel to be coupled to the fence posts (which corresponds or is parallel to an axis extending from the first post to the second post).

As the consumer inputs these measurements and makes these selections, the graphical user interface dynamically updates its rendering of the fence panel, including the individual components thereof, viewed by the consumer, in response to the inputs provided by the consumer. Once the consumer has input these additional measurements and made these additional selections, the graphical user interface allows the consumer to select whether to purchase their customized fence panel as an assembled panel, or in a kit form, such as to be assembled on site, and then purchase the fence panel.

FIGS. 17 through 29 illustrate images of a graphical user interface that allows an operator to input information and preferences regarding one or more designs or styles for one or more fence panels of a fence. The graphical user interface illustrated in FIGS. 17 through 29 is generated and powered by software running within a browser on a Windows-based computer, but comparable graphical user interfaces can be generated and powered by comparable software running on any suitable computer hardware system, such as locally and natively on the computer hardware system or within a browser running on the computer hardware system, such as on an Android-based smartphone or tablet, an iPhone or iPad, or a Windows-based or Mac desktop or laptop computer.

Figure 17:
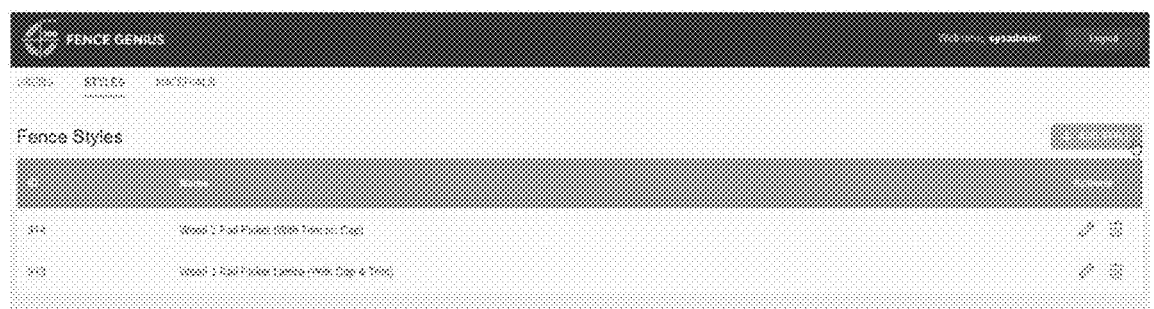
FIG. 17 shows an image of a graphical user interface that allows an operator to input information and preferences regarding one or more designs or styles for one or more fence panels of a fence, according to one implementation.
Figure 18A:
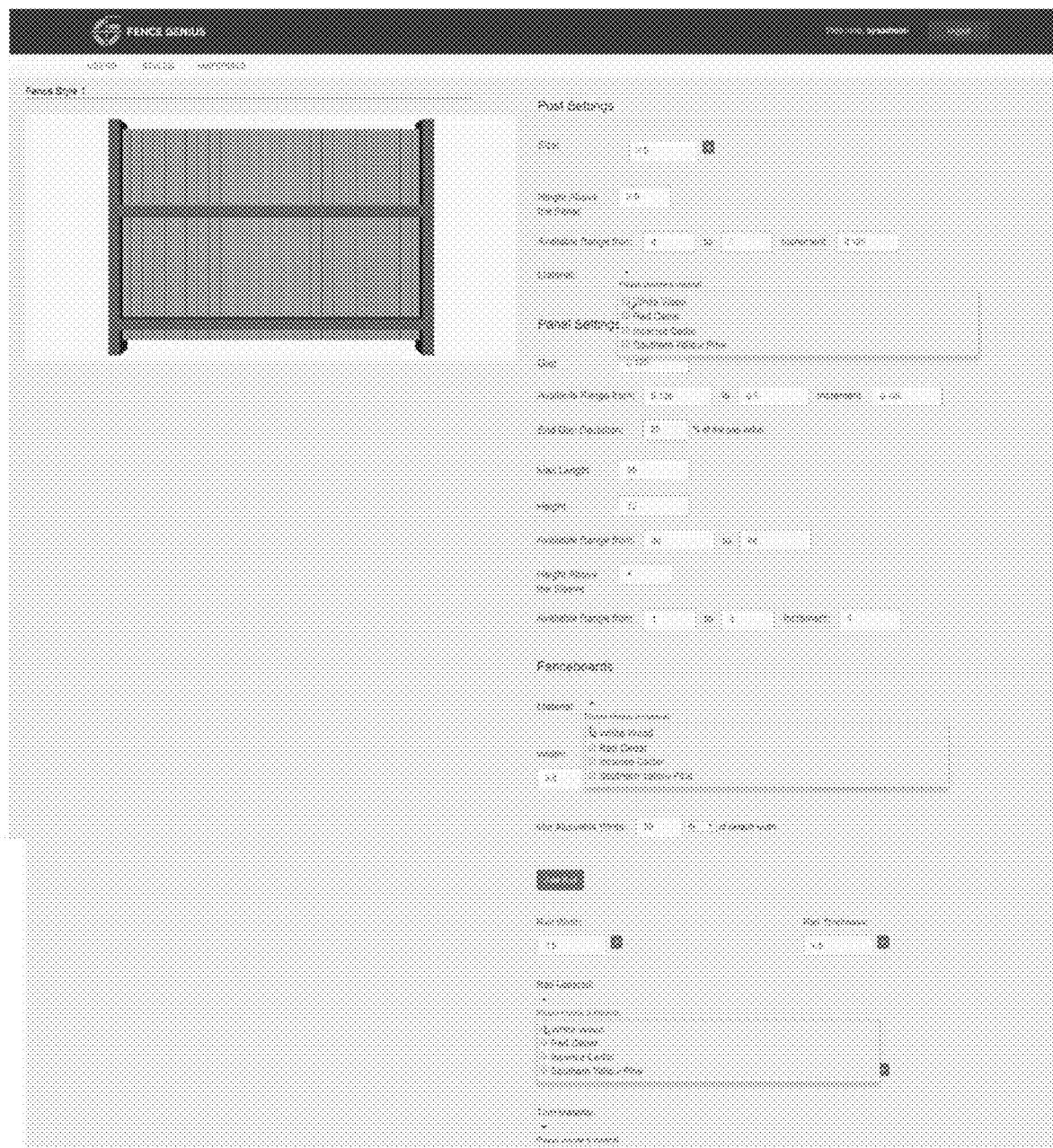
FIG. 18A shows another image of the graphical user interface that allows an operator to input information and preferences regarding one or more designs or styles for one or more fence panels of a fence, according to one implementation.
Figure 18B:
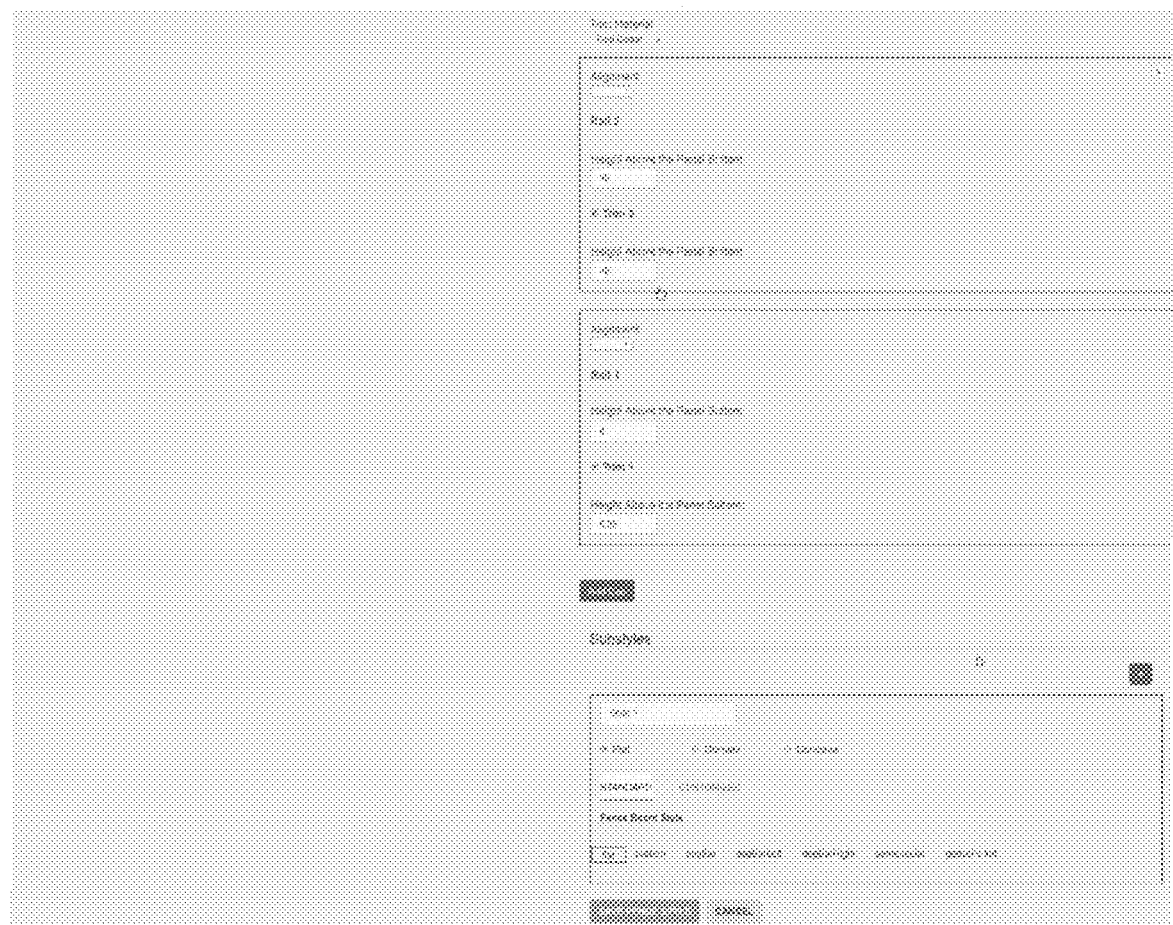
FIG. 18B shows another image of the graphical user interface that allows an operator to input information and preferences regarding one or more designs or styles for one or more fence panels of a fence, according to one implementation.

FIG. 17 illustrates the graphical user interface seen by an operator upon logging into the software. Upon logging in, as seen in FIG. 17, the operator is presented with options to either continue working within pre-existing saved fence styles, or add a new fence style. FIGS. 18A and 18B illustrate top and bottom portions, respectively, of the graphical user interface seen by the operator upon selecting the option in FIG. 17 to add a new fence style. As illustrated in FIGS. 18A and 18B, the new fence style is given a default name or title, such as "Fence Style 1" and a plurality of default characteristics such as dimensions and number of components. For example, the new fence style is given default dimensions for its fence posts, its fence boards, and its fence rails.

Working within the graphical user interface illustrated in FIGS. 18A and 18B, the user can modify the default characteristics to create a customized fence style. For example, as illustrated in FIG. 18A, the user can select or specify a size of the fence posts, which can be 3.5 inch square posts. The user can also select or specify a distance the fence posts extend above the fence panel, which can be 2.5 inches, for example. The user can also specify a style for the top ends of the fence boards and/or fence posts, such as a gothic picket shape or a dog ear shape. The user can also select or specify a width of a gap between adjacent fence boards within the fence panel, which can be 0.125 inches, for example. The user can also select or specify an overall maximum length of the fence panel, which can be 96 inches, for example, and an overall height of the fence panel, which can be 72 inches, for example. The user can also select or specify a width of the fence boards within the fence panel, which can be 3.5 inches, for example. The user can also select or specify dimensions, such as width(s), thickness(es), material(s), finish(es), and/or color(s) of trim components of the fence and/or fence panel. The user can also select or specify a material for the various components of the fence, which can be, for example, white wood, red cedar, incense cedar, or southern yellow pine for the fence posts, fence boards, fence rails, trim components, and/or trellis components. The user is also presented with options within the graphical user interface to add components such as fence rails by clicking on a button labeled "Add Rail," and to remove components such as fence rails by clicking on a button marked with an "x" within a box or area designated for entry or specification of features for the component.

The user can also be presented with options within the graphical user interface to specify fence rail alignments. For example, the user can specify that a first end of a top one of the fence rails can be located adjacent to or a first specified distance from a top end of the fence panel and that a second end of the top one of the fence rails can be located adjacent to or a second specified distance, which can be the same as the first specified distance or a distance such that the top one of the fence rails is horizontal, from the top end of the fence panel. Similarly, the user can specify that a first end of a bottom one of the fence rails can be located adjacent to or a first specified distance from a bottom end of the fence panel and that a second end of the bottom one of the fence rails can be located adjacent to or a second specified distance, which can be the same as the first specified distance or a distance such that the bottom one of the fence rails is horizontal, from the bottom end of the fence panel. In some implementations, fence rails located between the top and bottom fence rails can be positioned and aligned so that the fence rails are equidistantly spaced apart from one another. In some implementations, a middle rail can be positioned to be parallel to the top rail. In some implementations, a cap rail, which can be referred to simply as a "cap" can be positioned to extend along the top ends of the fence boards. The user can also be presented with options within the graphical user interface to specify a number, design, and location of fence rail clips to be used to couple the fence rails to fence posts, as described in U.S. patent application Ser. No. 15/173,271, filed Jun. 3, 2016, the entire contents of which are hereby incorporated herein by reference in their entirety.

As also illustrated in FIG. 18A, a visualization of the fence panel style is presented to the user within the graphical user interface as the user customizes the fence panel style. In some implementations, the visualization of the fence panel style is updated automatically, dynamically, and on the fly as the user selects or specifies the various properties of the fence panel style. In some implementations, the software powering the graphical user interface can use the techniques described herein with reference to FIGS. 3 and 4 for determining positions of and positioning fence boards within a fence panel shown in the visualization of the fence panel style. The software powering the graphical user interface can use the information input by the user within the graphical user interface illustrated in FIGS. 18A and 18B as inputs for such techniques. Further, the graphical user interface allows the user to interact directly with the visualization of the fence panel style. For example, the user can click on individual components shown in the visualization, and can drag-and-release various components shown in the visualization, such as to move the fence rails up and down within the fence panel and/or to increase or decrease the heights of the fence boards within the fence panel, such as by dragging and releasing a top end of the fence boards.

FIG. 18B illustrates that a lower end portion of the graphical user interface provides the user with the option to create multiple sub-styles within a single fence panel style file, such as by selecting or clicking on a button marked with a "+" within a region, box, or area designated for entry or specification of sub-styles. FIG. 18B also illustrates that the lower end portion of the graphical user interface also provides the user with the option to further customize the fence panel style by specifying whether the fence panel is flat, convex, or concave, as well as by specifying a style for top ends of the fence boards.

Figure 19:
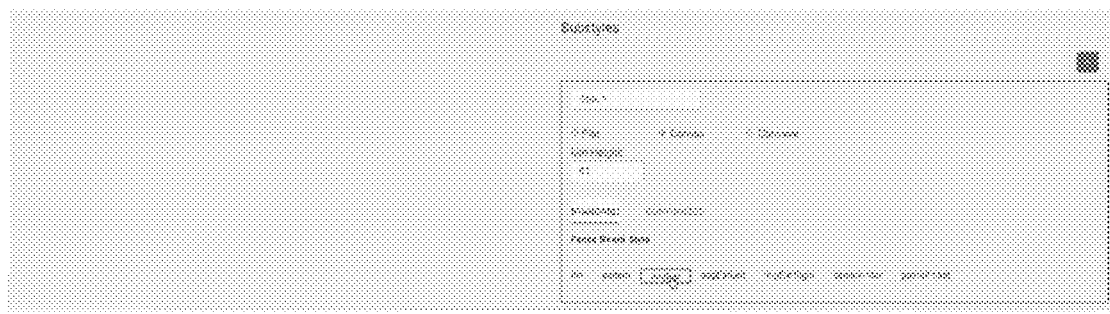
FIG. 19 shows another image of the graphical user interface that allows an operator to input information and preferences regarding one or more designs or styles for one or more fence panels of a fence, according to one implementation.
Figure 20:
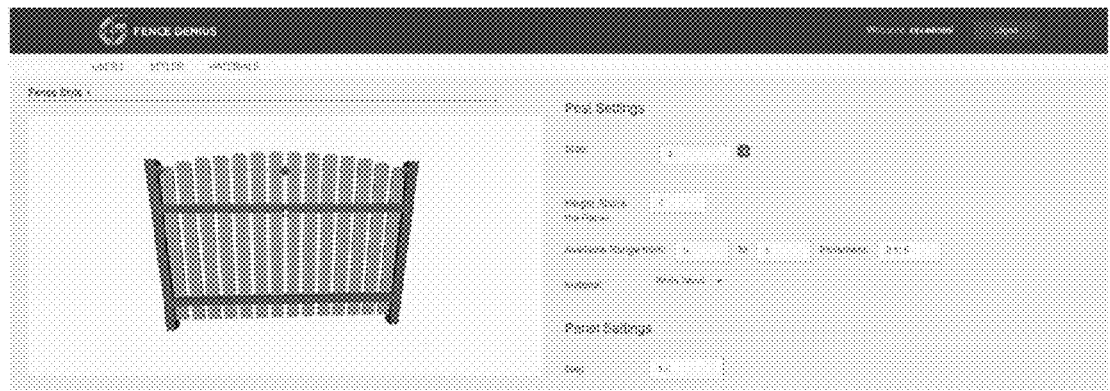
FIG. 20 shows another image of the graphical user interface that allows an operator to input information and preferences regarding one or more designs or styles for one or more fence panels of a fence, according to one implementation.

As illustrated in FIG. 19, the user can create a first sub-style by specifying that the fence panel has a convex top edge and by specifying that top ends of the fence boards have a dog-ear style. As also illustrated in FIG. 19, upon specifying that the fence panel has a convex top edge, the user can be provided with an option to select or specify a minimum height of the fence panel. FIG. 20 illustrates that the user can further customize the first sub-style by dragging and releasing a moveable element such as a line displayed within the visualization of the sub-style to indicate the degree of the convex curvature of the top edge of the fence panel.

Figure 21A:
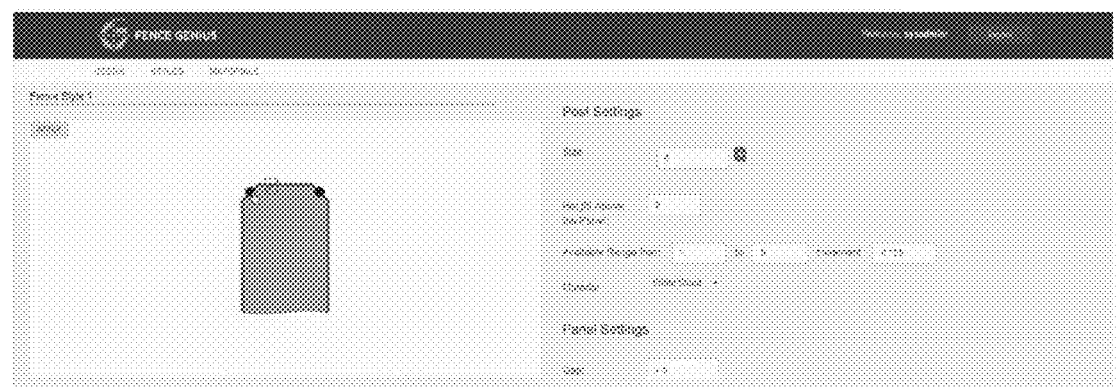
FIG. 21A shows another image of the graphical user interface that allows an operator to input information and preferences regarding one or more designs or styles for one or more fence panels of a fence, according to one implementation.
Figure 21B:
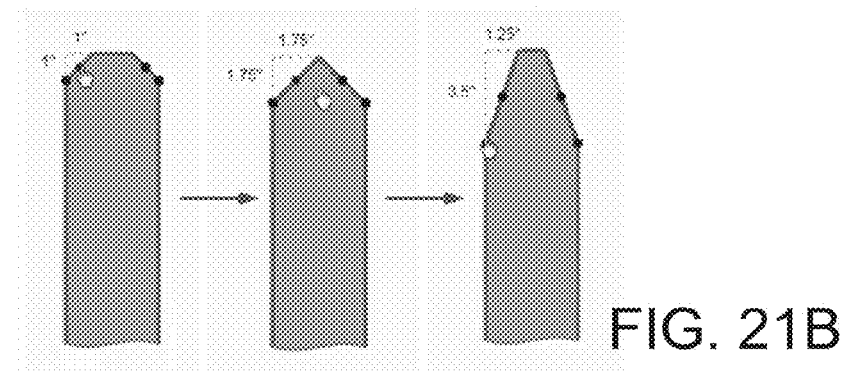
FIG. 21B shows another image of the graphical user interface that allows an operator to input information and preferences regarding one or more designs or styles for one or more fence panels of a fence, according to one implementation.

FIGS. 21A and 21B illustrate that the user can further customize the first sub-style by dragging and releasing movable elements such as lines displayed within the visualization of the sub-style or feature edges which are translatable and/or rotatable, to indicate or adjust the degree of the dog ear of the top ends of the fence boards of the fence panel. At its extremes, such customization can specify that there are no dog ears on the top ends of the fence boards, or that the dog ear features converge with one another to create pointed top ends of the fence boards. In some implementations, the user can further customize the first sub-style by interacting with the visualization to select or specify an angle of the dog ear features of the top ends of the fence boards, as illustrated in FIG. 21B, or to specify that the dog ear features be inverted to form a V-shaped feature at the top of the fence boards.

In some implementations, a user can customize the first sub-style by dragging and releasing only one movable element located at an upper corner of the fence board, to drag that corner of the fence board vertically upward or downward to create an angled top end of the fence board and to adjust the angle thereof. In some implementations, the user can double click on a representation of the center of the top end profile of the fence board, which can be a represented by a dot in the visualization, and then slide the representation horizontally within the representation, or perpendicular to a length of the fence board, to introduce, control, or modify a curvature and a bluntness or pointedness of the top end or nose of the fence board. In this manner, the nose of the fence board can be provided with a shape resembling a bullet, with the curvature of the bullet shape being controlled by sliding the representation of the center of the top end provide of the fence board.

Figure 22:
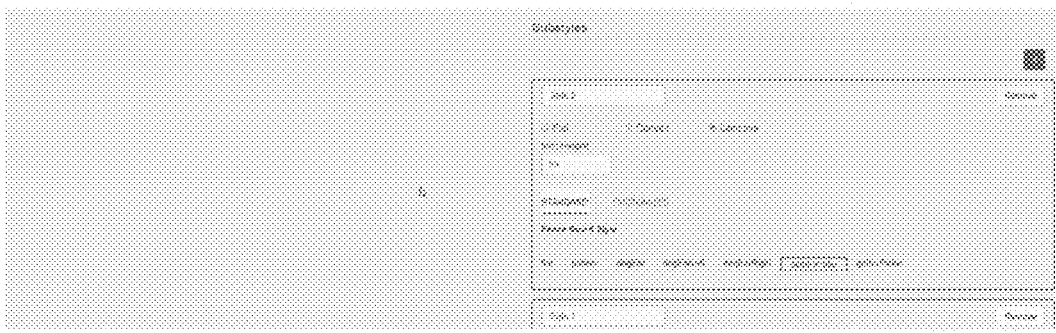
FIG. 22 shows another image of the graphical user interface that allows an operator to input information and preferences regarding one or more designs or styles for one or more fence panels of a fence, according to one implementation.
Figure 23:
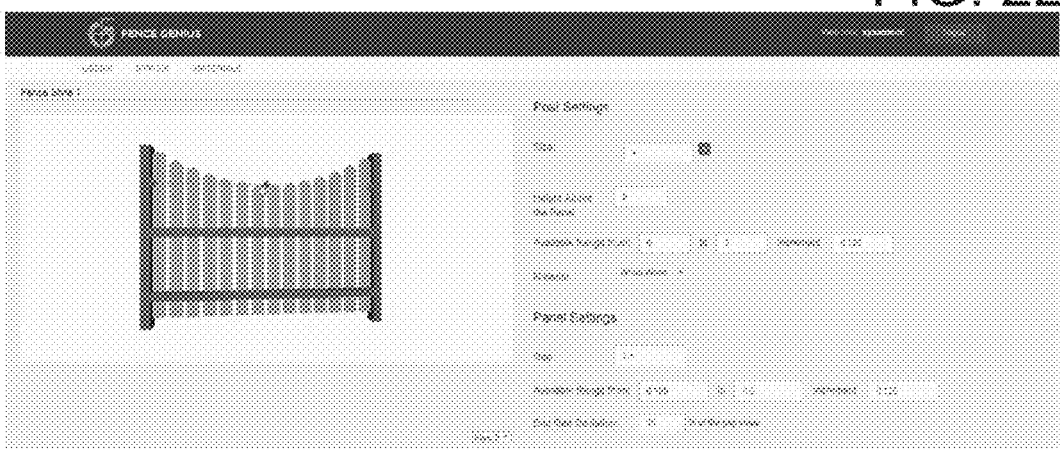
FIG. 23 shows another image of the graphical user interface that allows an operator to input information and preferences regarding one or more designs or styles for one or more fence panels of a fence, according to one implementation.

As illustrated in FIG. 22, the user can create a second sub-style and specify that for the second sub-style, the fence panel has a concave top edge and top ends of the fence boards have a semi-circular shape or style. As also illustrated in FIG. 22, upon specifying that the fence panel has a concave top edge, the user can be provided with an option to select or specify a minimum height of the fence panel. FIG. 23 illustrates that the user can further customize the second sub-style by dragging and releasing a movable element such as a line displayed within the visualization of the sub-style to indicate the degree of the concave curvature of the top edge of the fence panel. FIG. 23 also illustrates that the graphical user interface allows the user to toggle back and forth between the various sub-styles by using a drop-down menu to identify a sub-style of interest (e.g., "Style 2").

Figure 24:
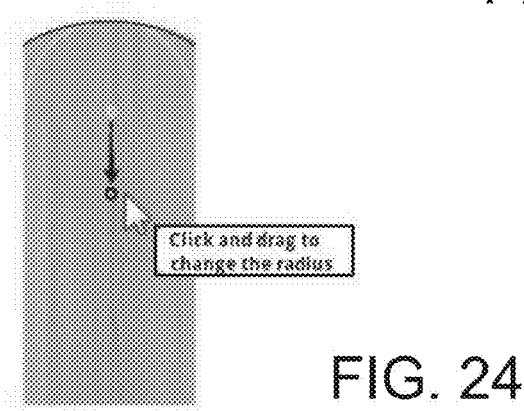
FIG. 24 shows another image of the graphical user interface that allows an operator to input information and preferences regarding one or more designs or styles for one or more fence panels of a fence, according to one implementation.

FIG. 24 illustrates that the user can further customize the second sub-style by double-clicking on a top end of one of the fence boards within the visualization, which causes the user interface to display a top end portion of the fence board. The user can then drag and drop or drag and release a point displayed within the visualization of the top end portion of the fence board, or a representation of a center of curvature of a top end profile of the fence board to indicate a degree or radius of curvature of the semi-circular curvature of the top end portion of the fence board. In some implementations, the user can double click on the representation of the center of curvature of the top end profile of the fence board, which can be a represented by a dot in the visualization, and then slide the representation horizontally within the representation, or perpendicular to a length of the fence board, to control or modify the curvature and the bluntness or pointedness of the top end or nose of the fence board. For example, at one extreme, the curvature can be controlled and modified in this manner to bring the nose of the fence board to a full half circle, while at the opposite extreme, the curvature can be controlled and modified in this manner to make the nose of the fence board nearly flat.

The user can indicate that the selected or specified radius of curvature applies only to the selected fence board, or to all fence boards within the fence panel. In some implementations, the user can further customize the second sub-style by specifying that the semi-circular curvature of the top end(s) of the fence board(s) be inverted to form a U-shaped feature, or a cove-shaped feature, at the top end(s) of the fence board(s). In some cases, a constraint can be applied to any fence board(s) with such a U-shaped or cove feature to require that the top end of the fence board(s) include flat edges at its ends, which can be referred to as "shoulders," and which can have a minimum width along the width of the fence board of at least ¼ inch, for example.

Figure 25:
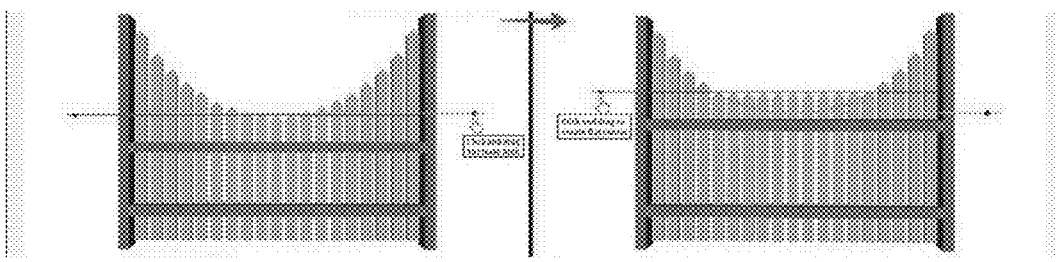
FIG. 25 shows another image of the graphical user interface that allows an operator to input information and preferences regarding one or more designs or styles for one or more fence panels of a fence, according to one implementation.

FIG. 25 illustrates that the user can further customize the second sub-style by dragging and releasing a second movable element such as a line displayed within the visualization of the sub-style to indicate that the concave shape of the top edge of the fence panel has a flat bottom profile, and to select or specify the degree to which the flat bottom profile rises above what would otherwise be the bottom of the concave curvature of the top edge of the fence panel. In some implementations, the user can further customize a sub-style having a convex top edge by dragging and releasing a second movable element such as a line displayed within the visualization of the sub-style to indicate that the convex shape of the top edge of the fence panel has flat top profiles at its ends, which can be referred to as "shoulders," and to select or specify the degree to which the flat top profiles or shoulders rise above what would otherwise be the bottom of the convex curvature of the top edge of the fence panel at its ends. In some implementations, the user can further customize a sub-style having a convex top edge by dragging and releasing a second movable element such as a line displayed within the visualization of the sub-style to indicate that the convex shape of the top edge of the fence panel has a flat top profile, and to select or specify the degree to which the flat top profile falls below what would otherwise be the top of the convex curvature of the top edge of the fence panel.

The user can create a third sub-style and specify that for the third sub-style, top ends of the fence boards have a gothic picket shape. In some implementations, the user can specify a depth of the semi-circular cutouts in the gothic picket shape of the fence boards, where the depth can range from zero to approximately half a width of the fence board. The user can then drag and drop or drag and release a point displayed within the visualization of the gothic picket shape of the fence board to increase or decrease a length of the gothic picket shape, thereby stretching or shrinking the length of the gothic picket shape.

Figure 26:
FIG. 26 shows another image of the graphical user interface that allows an operator to input information and preferences regarding one or more designs or styles for one or more fence panels of a fence, according to one implementation.
Figure 27:
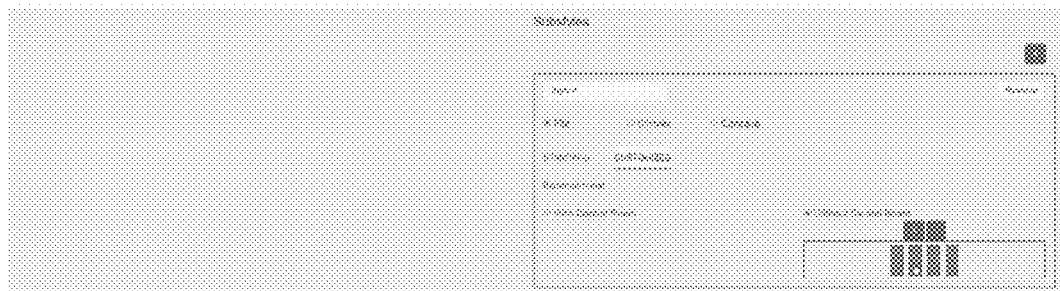
FIG. 27 shows another image of the graphical user interface that allows an operator to input information and preferences regarding one or more designs or styles for one or more fence panels of a fence, according to one implementation.

As illustrated in FIGS. 26 and 27, the user can create a fourth sub-style and specify that for the fourth sub-style, the fence panel has a flat top profile and the top ends of the fence boards will be individually customized. FIG. 26 illustrates that the user can specify that the fence panel includes an odd number of fence boards and therefore includes a center fence board, while FIG. 27 illustrates that the user can specify that the fence panel includes an even number of fence boards and therefore does not include a center fence board. FIGS. 26 and 27 also illustrate that the user can step through the fence boards by clicking on either a button marked with a "+" or a button marked with a "−" to step outwardly or inwardly, respectively, through the fence boards within the fence panel for purposes of applying desired styles or characteristics to said fence boards.

Figure 28:
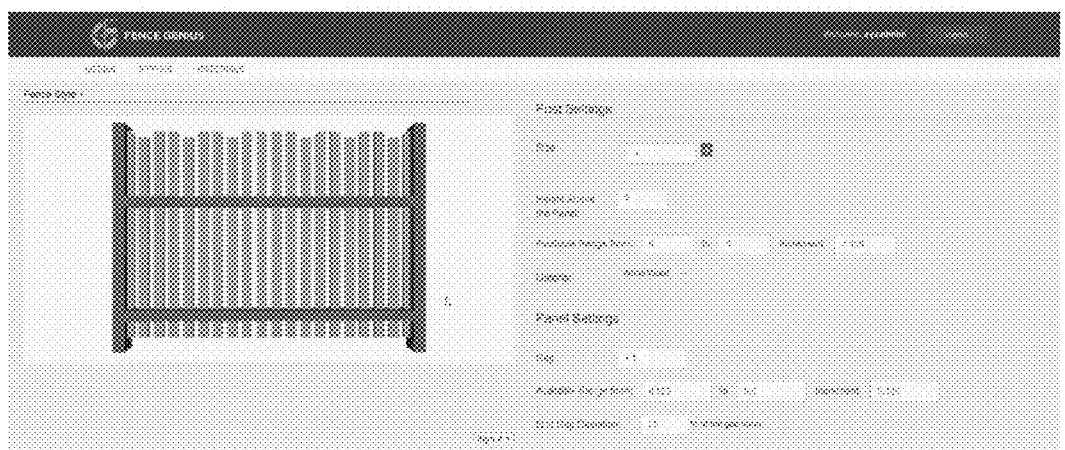
FIG. 28 shows another image of the graphical user interface that allows an operator to input information and preferences regarding one or more designs or styles for one or more fence panels of a fence, according to one implementation.

The user can then select any one or any combination of the fence boards within the fence panel to select or specify their respective properties. For example, the user can specify a distinct or different height and/or a distinct or different top end style for each of the fence boards within the fence panel. In one specific implementation, the user can specify that each of the fence boards has a randomly selected top end style (e.g., randomly selected from a group consisting of any set or subset of the various fence board top end styles described and illustrated herein). FIG. 28 illustrates that the visualization of the fence panel style can be updated to reflect such fence board customizations. FIG. 28 also illustrates that the graphical user interface allows the user to toggle back and forth between the various sub-styles by using a drop-down menu to identify a sub-style of interest (e.g., "Style 4"). In some implementations, the graphical user interface can present a representation of a first fence panel style (e.g., "Style 1") in a first, main pane, and representations of additional fence panel styles (e.g., "Style 2," "Style 3," and/or "Style 4") as other options in a second, smaller pane below the first, main pane. In such implementations, the graphical user interface can also present a plus-sign or other symbol within the second, smaller pane, which the user can select to add a new fence panel style.

In some implementations, the software and the graphical user interface allow the user to click on two adjacent or neighboring fence posts to specify that a lattice or trellis is to be added to the top of the fence panel located between and supported by the fence posts. Specifying that a trellis is to be added above the fence panel can cause the software to re-design the fence such that the fence posts supporting the panel are taller than they otherwise would have been. In some implementations, the visualization of the fence panel within the graphical user interface is updated to show the trellis, the user can click on the trellis shown in the visualization to update a style of the trellis, and the user can drag-and-drop or drag-and-release the trellis shown in the visualization, such as to move the trellis up and down with respect to the fence panel.

Figure 29:
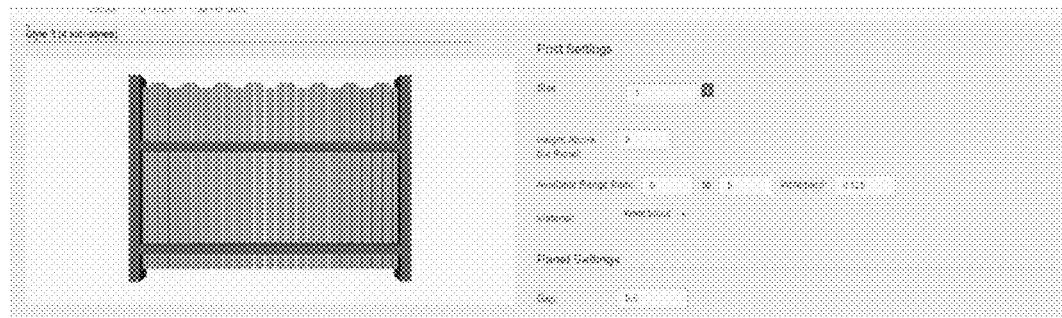
FIG. 29 shows another image of the graphical user interface that allows an operator to input information and preferences regarding one or more designs or styles for one or more fence panels of a fence, according to one implementation.
Figure 29A:
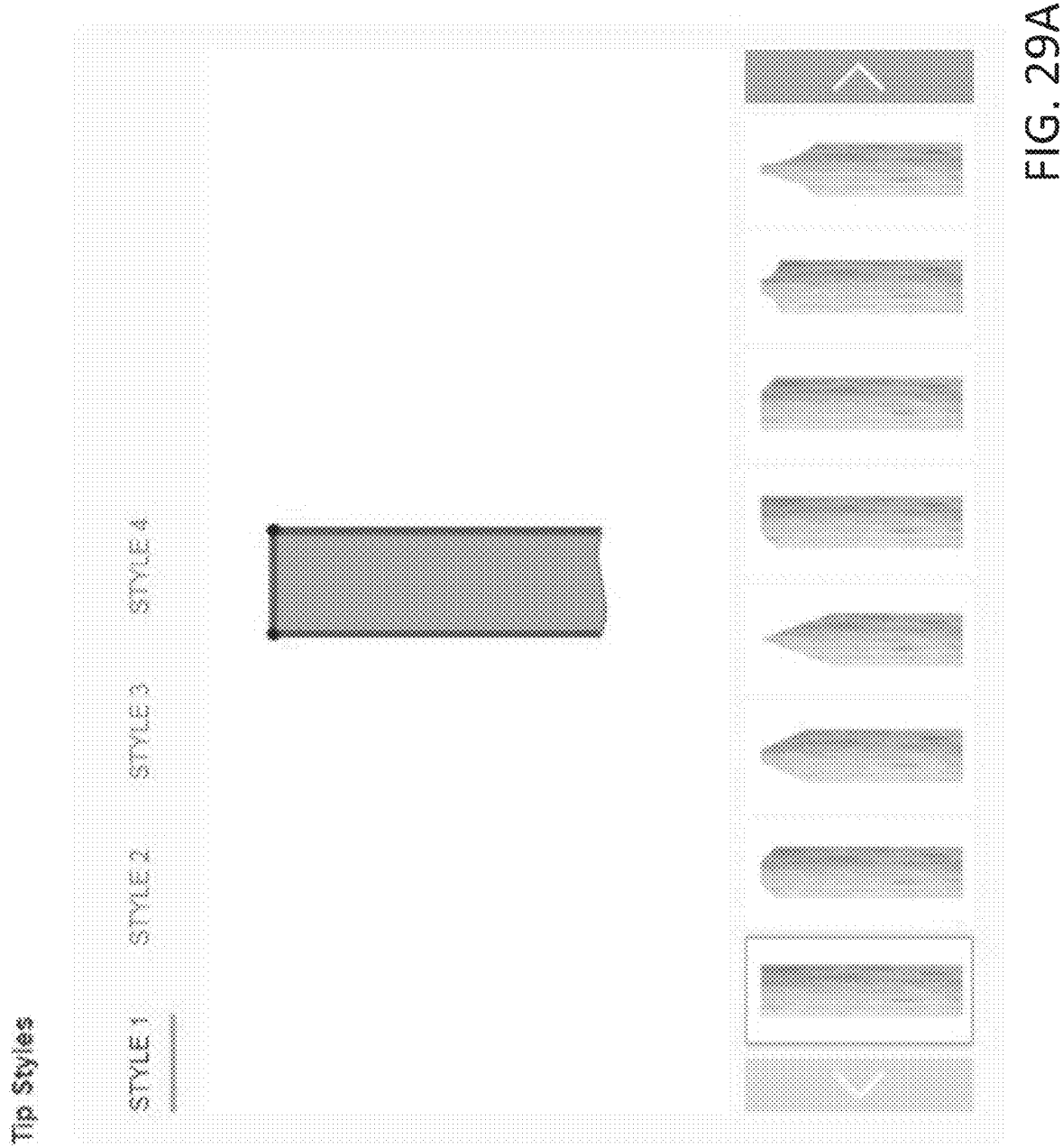
FIG. 29A shows an image of a graphical user interface that allows an operator to view, select, and customize fence panel board tips.
Figure 29B:
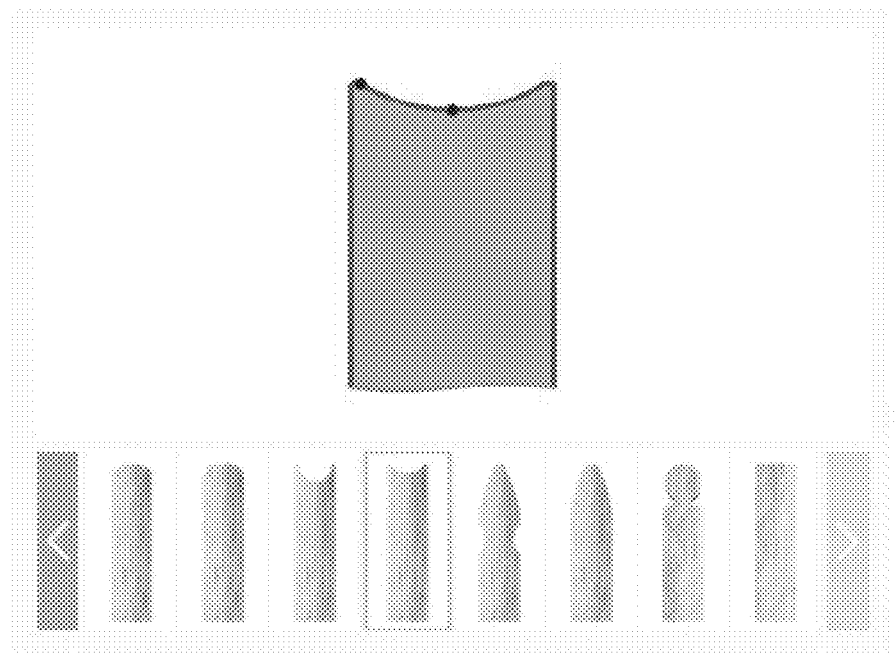
FIG. 29B shows another image of the graphical user interface of FIG. 29A that allows an operator to view, select, and customize fence panel board tips.
Figure 29C:
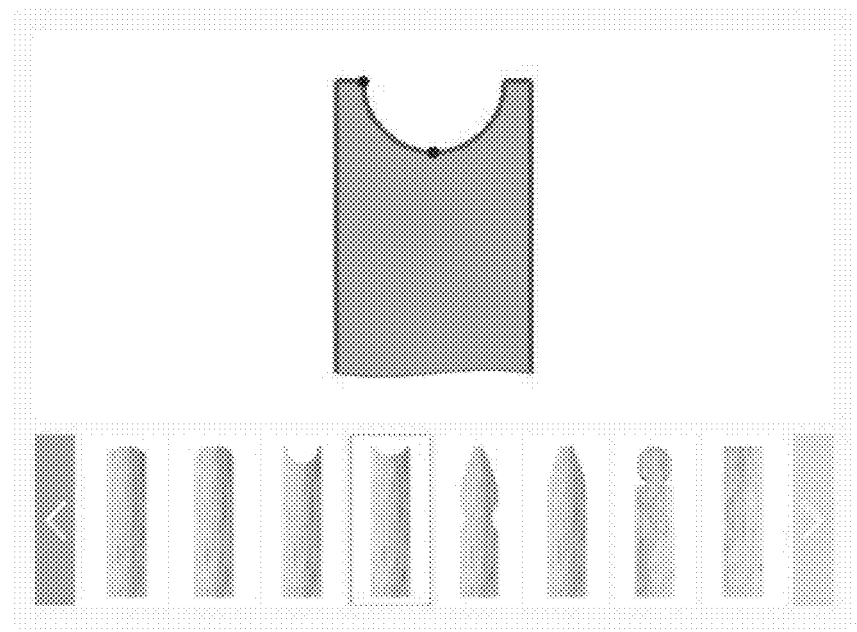
FIG. 29C shows another image of the graphical user interface of FIG. 29A that allows an operator to view, select, and customize fence panel board tips.
Figure 29D:
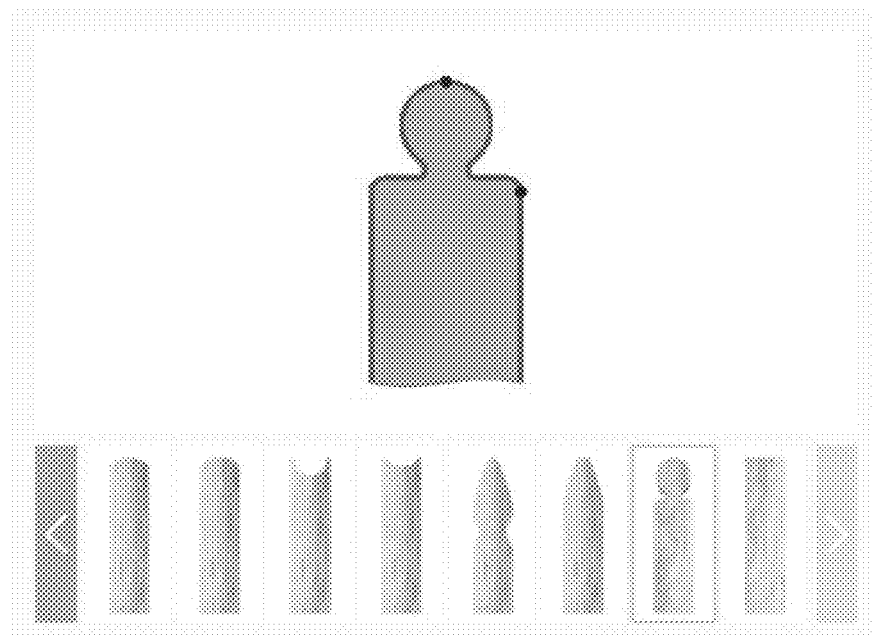
FIG. 29D shows another image of the graphical user interface of FIG. 29A that allows an operator to view, select, and customize fence panel board tips.
Figure 29E:
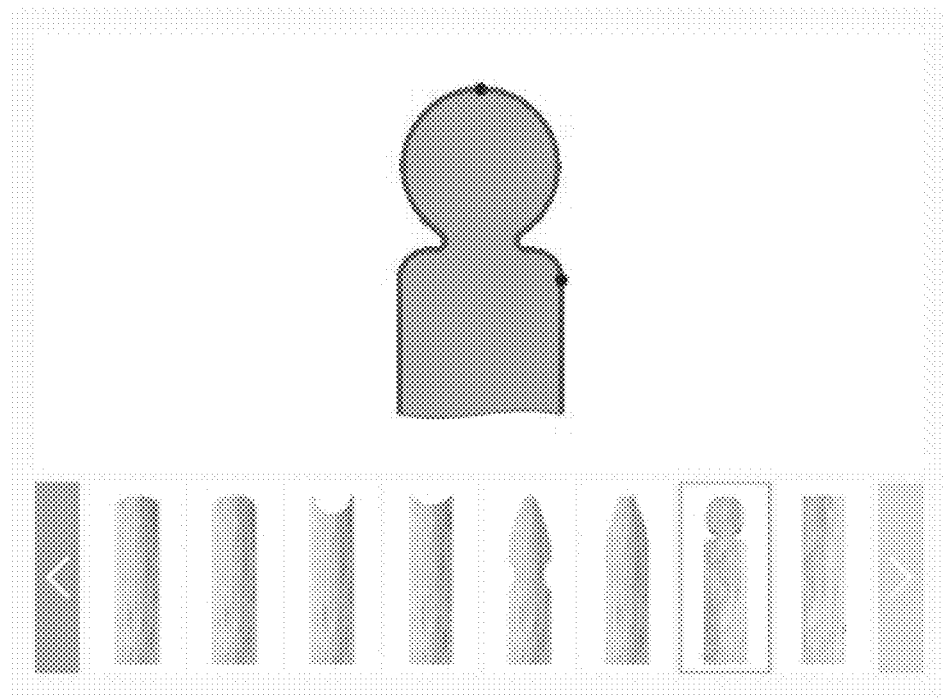
FIG. 29E shows another image of the graphical user interface of FIG. 29A that allows an operator to view, select, and customize fence panel board tips.
Figure 29F:
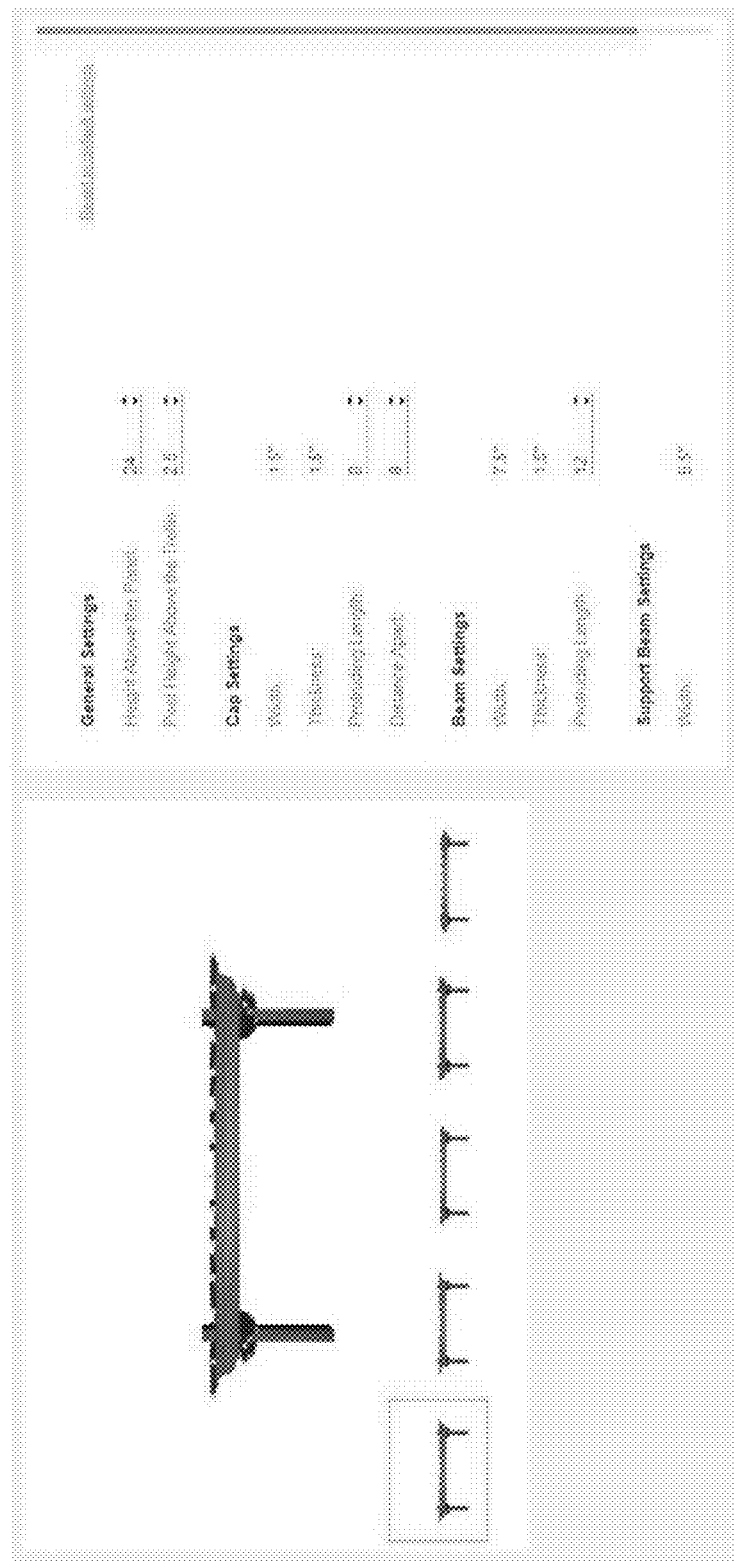
FIG. 29F shows an image of a graphical user interface that allows an operator to view, select, and customize a fence trellis.
Figure 29G:
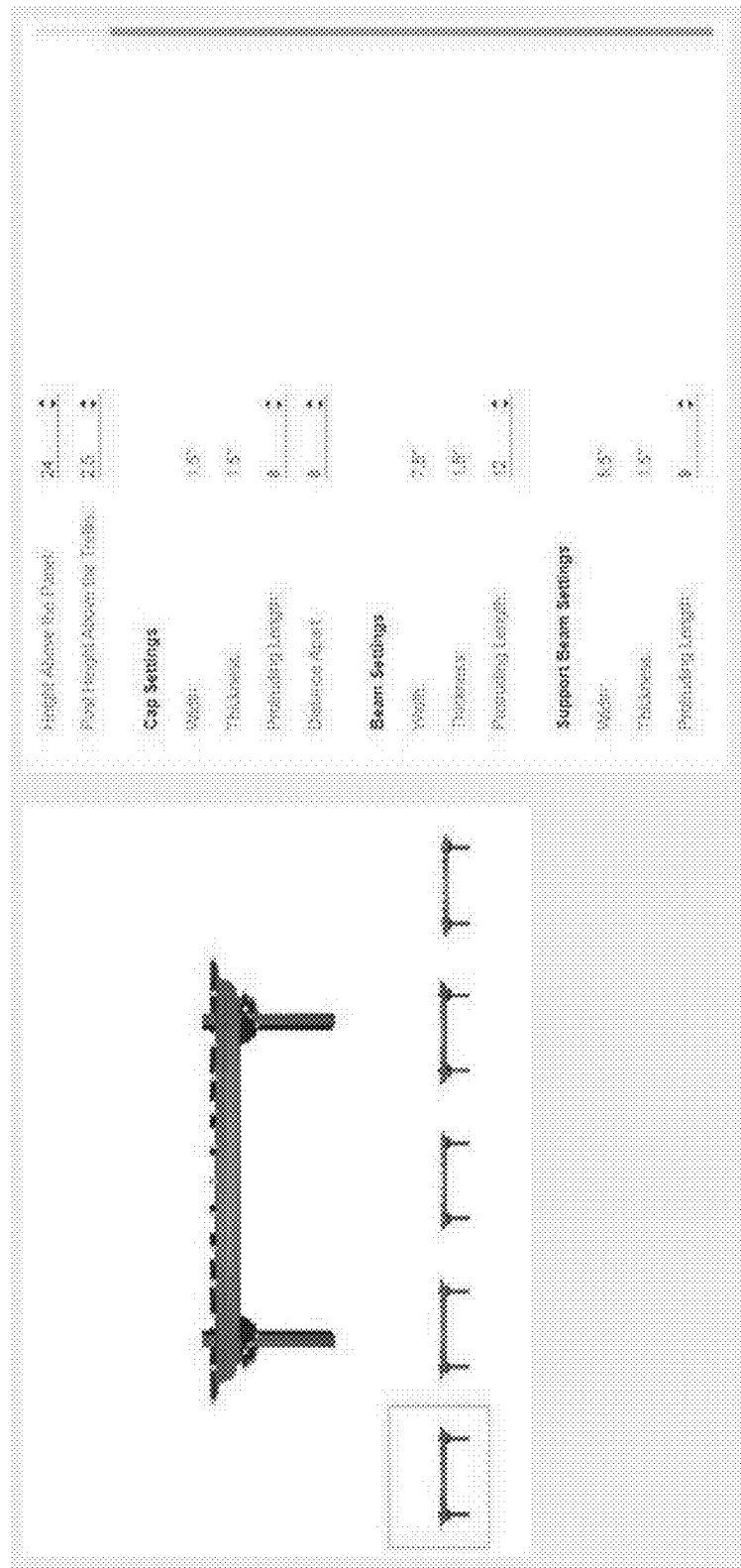
FIG. 29G shows another image of the graphical user interface of FIG. 29F that allows an operator to view, select, and customize a fence panel trellis.

For example, FIGS. 29F and 29G illustrate that the graphical user interface can allow the user to specify the height that the trellis extends above the rest of the panel, a height that the fence posts extend above the rest of the trellis, features and dimensions of cap components at the top of the trellis, features and dimensions of main beam components, on which the cap components are supported, and features and dimensions of support beam components, on which the main beam components are supported, and which are themselves supported on the fence posts.

In some implementations, the software and the graphical user interface allow the user to specify other features of the fence panel styles, such as other aesthetic features of the fence panel styles. For example, the software can allow the user to specify that a fence panel style represents a "marble fence" in which marbles or other glass elements are to be incorporated into the fence panels, such as into the fence panel boards, at pre-determined and/or randomized locations within the components of the fence panels. As another example, the software can allow the user to specify that the fence panel style includes randomized distressing patterns in any one or more of its components, such as the fence rails or the fence boards. As another example, the software can allow the user to specify that geometric shapes, such as triangular, sideways V-shapes, half-heart shapes, or extended insets parallel to a length of the fence boards, are to be cut, such as by a router, out of side edges of the fence boards. As another example, the software can allow the user to specify that geometric shapes, such as a diamond shape, are to be cut, such as by a router, a laser engraving system, or a sand blaster, into a major face of the fence boards, such as within their upper end portions or tips.

FIG. 29 illustrates that the graphical user interface allows the user to rename the style they have been working on and specifying, such as from the default name of "Fence Style 1" to a new name of "Style 3 (4 sub-styles)". Once the user has completed working on and specifying the details of the various sub-styles, the user can click on a button labelled "Save Fence Style" at the bottom of the graphical user interface (see FIG. 18B) to save the information in a database for later retrieval and use. The user can then click on a button labelled "Logout" at the top of the graphical user interface (see FIGS. 17, 18A, 20, 21, 23, and 28) to log out of the software and the graphical user interface.

FIGS. 29A-29E illustrate that the graphical user interface can allow the user to view a variety of fence board tip styles, as well as to select and customize the fence board tip styles. For example, FIG. 29A illustrates that the graphical user interface can present at least four distinct sets of fence board tip styles, labelled in the drawing as "STYLE 1," "STYLE 2," "STYLE 3," and "STYLE 4." When the user clicks on one of such sets of fence board tip styles, FIG. 29A also illustrates that the graphical user interface can present a variety of individual tip styles, such as in a row extending across the bottom of the pane within which the styles are being presented.

The user can select one of the individual styles, such as by clicking on it, to further customize the style. For example, once the user has clicked on an individual style, such as a style with a flat top end or tip, as illustrated in FIG. 29A, the user can further customize the tip style by dragging and releasing movable elements, which can also be referred to as "handles," such as lines displayed within the visualization of the sub-style or feature edges which are translatable and/or rotatable, to indicate or adjust the degree of a dog ear of the top ends of the fence boards of the fence panel, as described above with respect to FIGS. 21A and 21B.

FIGS. 29B and 29C further illustrate that the graphical user interface can allow the user to further customize a concave fence board tip style, such as by dragging and releasing a first handle at the bottom and center of the concave shape of the fence tip to change or customize a curvature of its concave shape, as well as by dragging and releasing a second handle at an intersection of a shoulder of the fence board tip with the concave shape of the fence board tip to change or customize the size of the fence board tip shoulder(s).

FIGS. 29D and 29E further illustrate that the graphical user interface can allow the user to further customize a ball-shaped fence board tip style, such as by dragging and releasing a first handle at the top and center of the fence tip to change or customize a diameter of a circular shape at the end of the fence board tip, as well as by dragging and releasing a second handle at an intersection of a bottom end of the fence board tip with the rest of the fence board to change or customize the size and/or curvature of the fence board tip's shoulder(s).

Foregoing implementations have related to interactive systems and methods for designing and constructing fence panels, including methods which enable users to design custom fence panels and be presented with dynamic visual representations of such custom fence panels. Subsequent implementations relate to interactive systems and methods for designing and constructing fences, such as from such fence panels, including methods which enable users to design custom fences and be presented with dynamic visual representations of such custom fences.

FIGS. 30 through 39 illustrate images of a graphical user interface that allows an operator to input information and preferences regarding a fence including one or more fence runs and one or more fence panels having one or more designs or styles. The graphical user interface illustrated in FIGS. 30 through 39 is generated and powered by software running within a browser on a Windows-based computer, but comparable graphical user interfaces can be generated and powered by comparable software running on any suitable computer hardware system, such as locally and natively on the computer hardware system or within a browser running on the computer hardware system, such as on an Android-based smartphone or tablet, an iPhone or iPad, or a Windows-based or Mac desktop or laptop computer.

Figure 30:
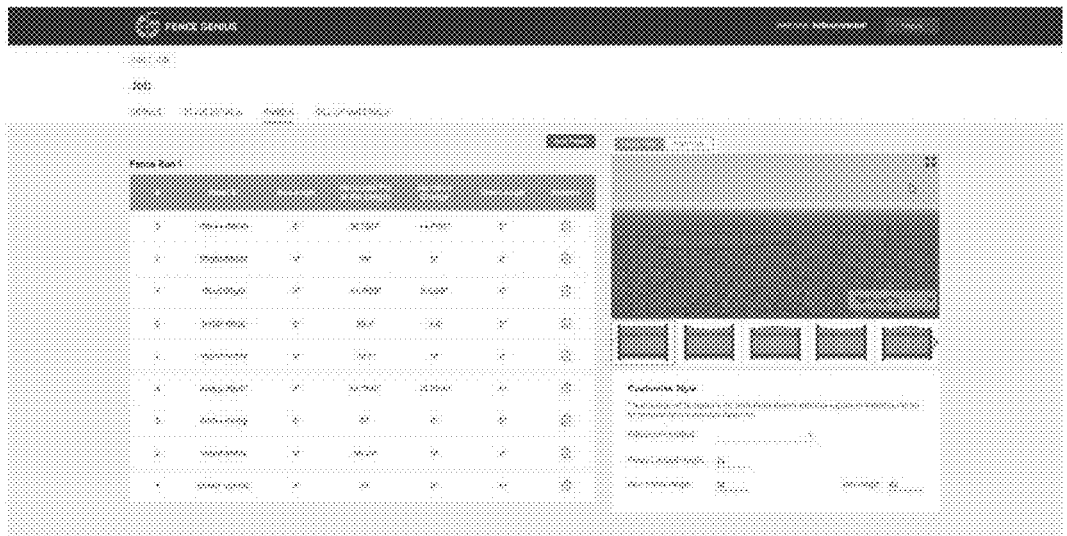
FIG. 30 shows an image of a graphical user interface that allows an operator to input information and preferences regarding a fence including one or more fence runs and one or more fence panels having one or more designs or styles, according to one implementation.

FIG. 30 illustrates the graphical user interface seen by an operator upon logging into the software, identifying a job or a fence including one or more fence runs and one or more fence panels for which they will be entering information, and identifying one or more styles to be applied to the fence runs or fence panels within the fence. In some implementations, the fence for which the user will be entering information includes the fence runs and fence panels described above with regard to FIGS. 5 through 16, while in other implementations, the fence for which the user will be entering information includes any number or fence runs and any number of fence panels identified and defined or specified by information similar to that described above with regard to FIGS. 5 through 16. Similarly, in some implementations, the styles to be applied to the fence runs or fence panels within the fence include the fence panel styles described above with regard to FIGS. 17 through 29, while in other implementations, the styles include any styles identified and defined or specified by information similar to that described above with regard to FIGS. 17 through 29.

As illustrated in FIG. 30, the graphical user interface includes a list of fence runs within the fence for which the user will be entering information (in the illustrated example, there is just one single fence run), as well as an identification of each fence panel within each of the listed fence runs (in the illustrated example, there are nine fence panels). The graphical user interface provides identifying or specifying information for each of the fence panels, including a Panel ID and geometric information regarding each of the fence panels. As also illustrated in FIG. 30, the graphical user interface presents a visualization of the fence, including each of its fence runs and each of its fence panels. FIG. 30 also illustrates that the graphical user interface presents the user with an option to view the visualization at a larger scale.

Figure 31:
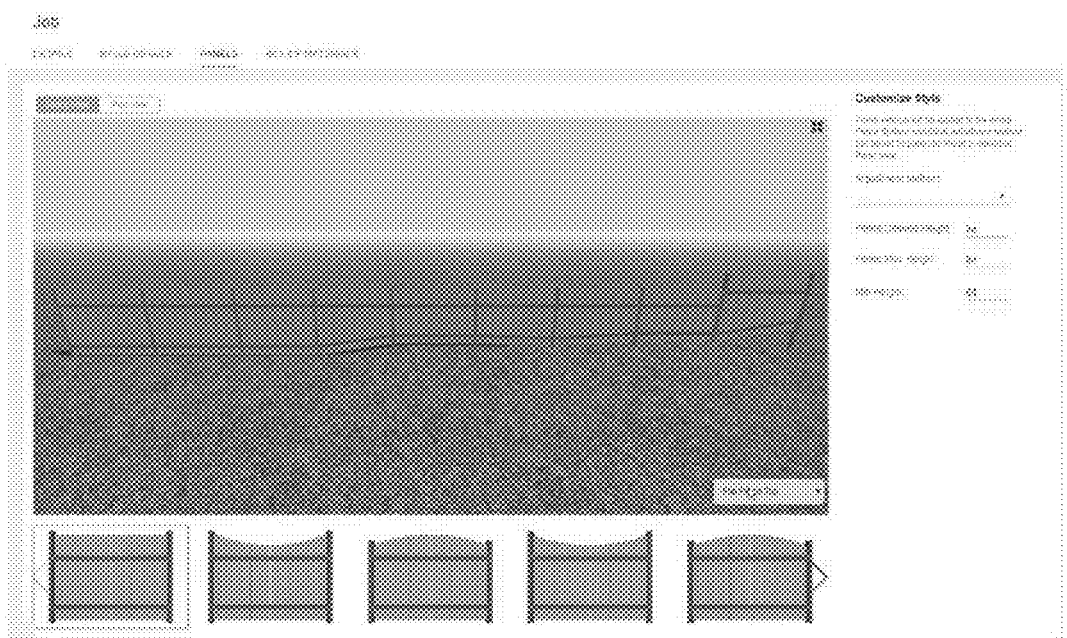
FIG. 31 shows another image of the graphical user interface that allows an operator to input information and preferences regarding a fence including one or more fence runs and one or more fence panels having one or more designs or styles, according to one implementation.

FIG. 31 illustrates the graphical user interface after the user has selected the option to view the visualization at a larger scale. As shown in FIG. 31, the fence can be designed and the visualization can be created to illustrate the fence with a flat but staggered overall top edge. FIG. 31 also illustrates that the graphical user interface can present the user with a pull-down menu to select a style for the overall top edge of the fence. One of the options in the pull-down menu can be to design the fence and create the visualization to illustrate the fence with a smoothed overall top edge.

Figure 32:
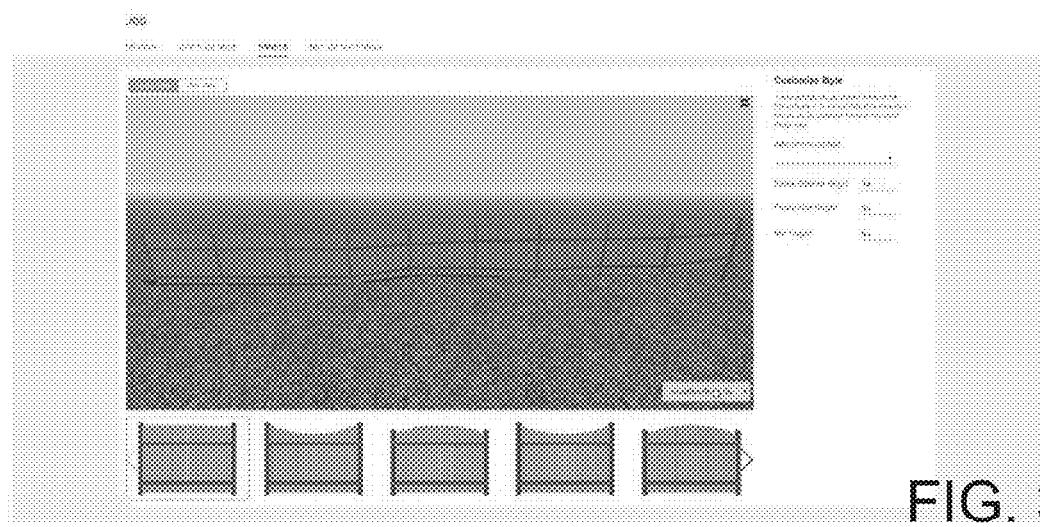
FIG. 32 shows another image of the graphical user interface that allows an operator to input information and preferences regarding a fence including one or more fence runs and one or more fence panels having one or more designs or styles, according to one implementation.

FIG. 32 illustrates the graphical user interface after the user has selected the option in the pull-down menu to design the fence and create the visualization to illustrate the fence with a smoothed top edge, and the user has input specifications for a degree to which the overall top edge of the fence is to be smoothed, such as in the form of a number between 1 and 100. As shown in FIG. 32, having a smoothed overall top edge can mean that the fence no longer has a top edge that is flat and no longer has a top edge that is staggered. Rather, the fence has a top edge that is relatively smooth from a first end of the fence to a second end of the fence opposite the first end. The relatively smooth top edge of the fence can be achieved by reducing the height of fence posts that otherwise extend above a straight, best-fit line extending through the tops of each of the fence posts, increasing the height of fence posts that otherwise extend below the straight, best-fit line extending through the tops of the fence posts, and re-designing the fence panels and components thereof to compensate for such adjustments to the heights of the fence posts.

In some implementations, the degree to which the heights of fence posts are increased and/or decreased in response to such specifications can increase as the number specifying the degree to which the overall top edge of the fence is to be smoothed increases, but the degree to which the heights of fence posts are increased and/or decreased in response to such specifications can increase more slowly, and non-linearly, as the number specifying the degree to which the overall top edge of the fence is to be smoothed increases. In some implementations, such adjustments, increases in heights, decreases in heights, and re-designing can be constrained or limited by maximum and/or minimum fence height limits specified by the user, as described elsewhere herein. In addition, in some implementations, one or more of the fence posts may be set to or locked at a desired height while the remaining fence posts may be dynamically modified.

Figure 32A:
FIG. 32A shows another image of the graphical user interface that allows an operator to input information and preferences regarding a fence including one or more fence runs and one or more fence panels having one or more designs or styles, according to one implementation.

FIG. 32A illustrates a graphical user interface presenting what may be referred to as a "show fence top lines" mode. Such a graphical user interface can be shown to the user after the user has entered or input a desired fence height dimension, a maximum fence height dimension, and a minimum fence height dimension, and after the user has indicated that the fence is to be designed with a smoothed top edge and input the specifications for the degree to which the overall top edge of the fence is to be smoothed. As illustrated in FIG. 32A, the graphical user interface can present a visualization of the fence designed with the smoothed top edge. As also illustrated in FIG. 32A, the graphical user interface can present three lines superimposed on such a visualization, where the three lines illustrate the height the fence would have along the length of the fence if the fence had the maximum fence height along the entire length of the fence, the desired fence height along the entire length of the fence, and the minimum fence height along the entire length of the fence. Thus, the "show fence top lines" mode illustrates that the software designs the fence to generally follow the desired height, but may be constrained to a degree by the maximum and minimum fence heights when the ground surface is not level.

In some embodiments, the graphical user interface can provide a second sliding scale to allow the user to specify a degree to which individual fence panels have staggered top edges. For example, if the user slides a slider of the second sliding scale within the graphical user interface to a first end of the scale, then the fence panels can be designed with flat top edges, as long as the height of the top edges of the fence panels are between the maximum and minimum fence height dimensions. If the user slides the slider away from the first end of the scale and toward a second, opposite end of the scale, then the fence panels can be designed to have staggered top edges, with the number of staggers in the top edge increasing as the slider approaches the second end of the scale. In such cases, the staggered top edges of the fence panels can be designed to conform more closely to the desired fence panel height than otherwise. In some embodiments, the graphical user interface can provide an option for the user to specify "sticky" fence posts, which the user desires to keep at either the maximum fence height dimension, the desired fence height dimension, or the minimum fence height dimension.

Figure 33:
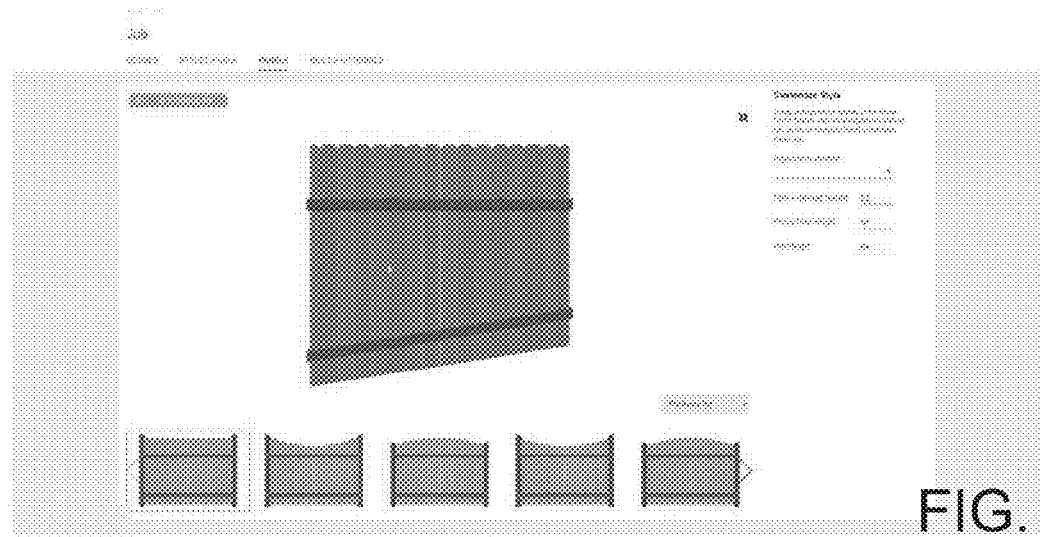
FIG. 33 shows another image of the graphical user interface that allows an operator to input information and preferences regarding a fence including one or more fence runs and one or more fence panels having one or more designs or styles, according to one implementation.
Figure 34:
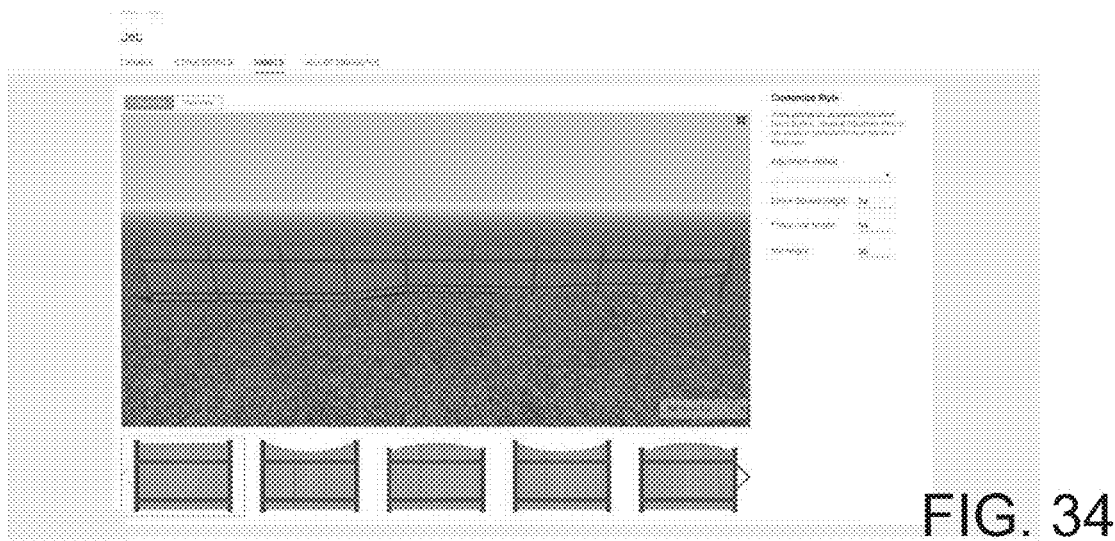
FIG. 34 shows another image of the graphical user interface that allows an operator to input information and preferences regarding a fence including one or more fence runs and one or more fence panels having one or more designs or styles, according to one implementation.

Within the graphical user interface as illustrated in FIG. 31, the user can hover over one of the fence panels within the visualization of the fence to highlight that fence panel and be shown additional information regarding that fence panel. The user can also click on one of the fence panels within the visualization of the fence to be shown the fence panel at a larger scale. FIG. 33 illustrates the graphical user interface after the user has selected the option to view one of the fence panels within the visualization of the fence at a larger scale. FIG. 31 also illustrates that the graphical user interface allows the user to adjust or select or specify a desired fence height (e.g., 74 inches), a maximum fence height limit (e.g., 84 inches), and a minimum fence height limit (e.g., 64 inches). FIG. 34 illustrates the graphical user interface after the user has decreased the minimum fence height limit (e.g., from 64 inches to 30 inches). As illustrated in FIG. 34, by decreasing the minimum fence height limit, the user can decrease the number of staggered discontinuities in the flat top edge of the fence.

FIG. 31 also illustrates that the graphical user interface presents the user with a variety of options for fence panel styles to be applied to the fence, its fence runs, or its fence panels. Such styles can be selected or specified by the user for application to one or more of the individual fence panels, one or more individual fence runs, or an entire fence. In some implementations, the user can apply a single fence panel style to an entire fence. In other implementations, the user can apply a first fence panel style to an entirety of a first fence run, and a different, second fence panel style to an entirety of a second fence run. In some implementations, the user can apply unique fence panel styles to every fence panel in a fence. In some implementations, the user can apply two different fence panel styles to the fence panels in a fence, with the two fence panel styles alternating with one another along the length of the fence. In some implementations, the user can apply three different fence panel styles to the fence panels in a fence, with the three fence panel styles alternating with one another along the length of the fence. In some implementations, the user can invert, reverse, or create a mirror image of a fence panel style before applying it to a fence panel of a fence.

Figure 35:
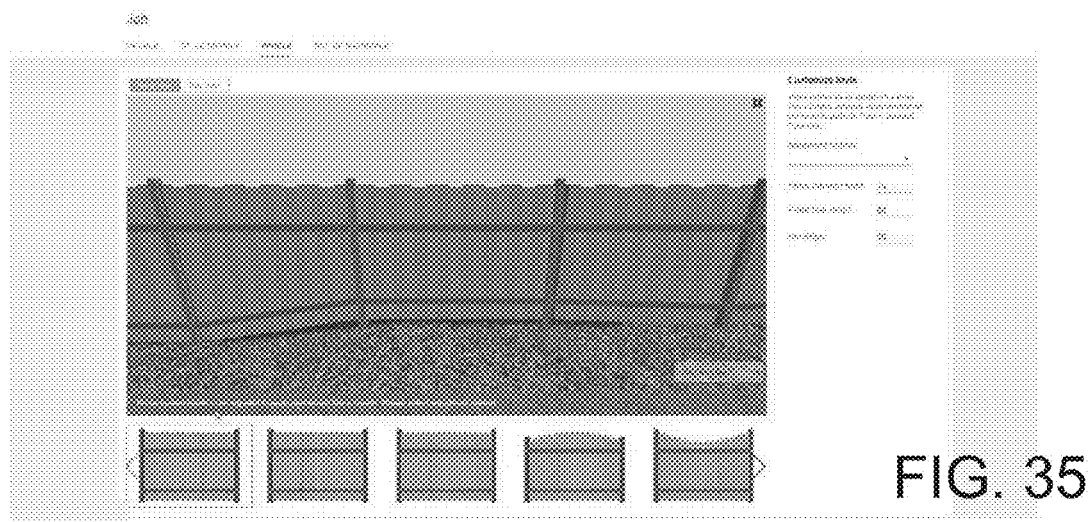
FIG. 35 shows another image of the graphical user interface that allows an operator to input information and preferences regarding a fence including one or more fence runs and one or more fence panels having one or more designs or styles, according to one implementation.

The user can also click on one of the options for fence panel styles to be applied to the fence to be presented with a new graphical user interface, which can be similar to that illustrated in and described with respect to FIGS. 17 through 29, to revise, change, or update any of the details of any of the options for fence panel styles. FIG. 35 illustrates the graphical user interface after the user has selected the option to apply a different one of the fence panel styles to the fence in the visualization. As illustrated in FIG. 35, once the user has selected the option to apply a different fence panel style to the fence in the visualization, the software re-models the fence and re-creates the visualization to display the fence in the selected or specified fence panel style. Such re-modeling and re-creation can include any of the techniques described above with regard to FIGS. 3 and 4.

Figure 36:
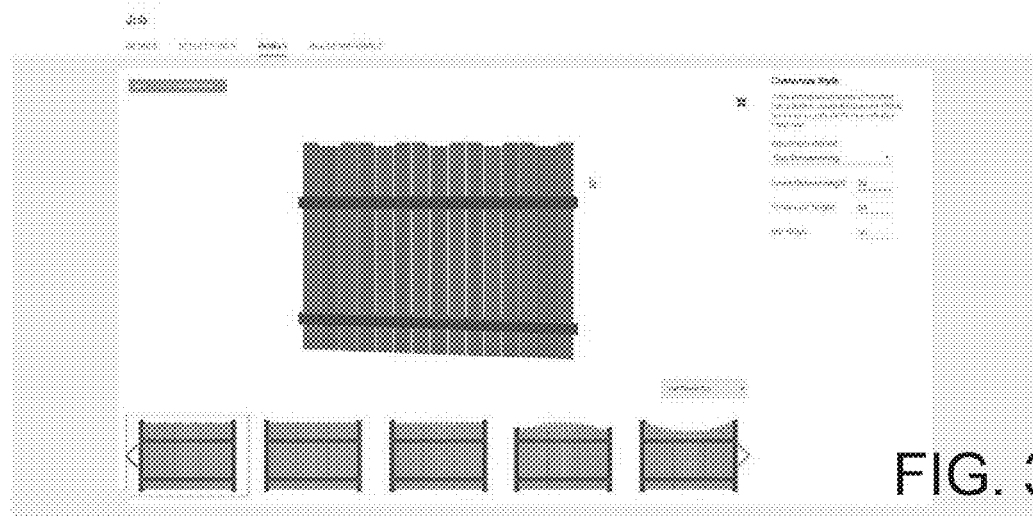
FIG. 36 shows another image of the graphical user interface that allows an operator to input information and preferences regarding a fence including one or more fence runs and one or more fence panels having one or more designs or styles, according to one implementation.
Figure 37:
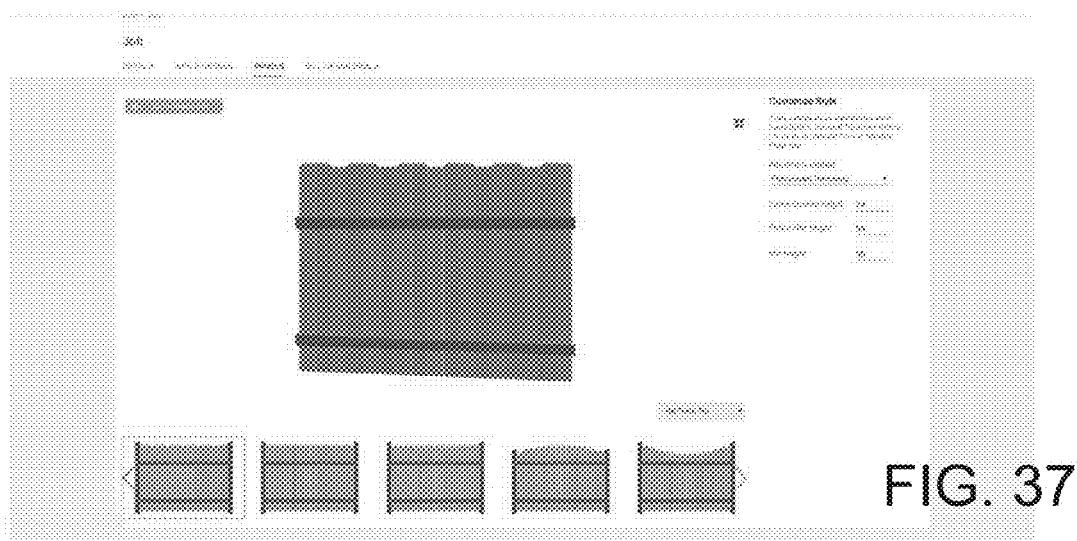
FIG. 37 shows another image of the graphical user interface that allows an operator to input information and preferences regarding a fence including one or more fence runs and one or more fence panels having one or more designs or styles, according to one implementation.

FIG. 35 also illustrates that in some cases, when a new fence panel style is specified for a fence, one or more limits or conditions for the design of the fence and its fence panels may initially be violated such that the fence and its fence panels require further re-modeling. Such limits or conditions can include those described above with respect to FIGS. 3 and 4. In such a case, the user is alerted to the violation of the limit or condition and is prompted or provided the option to select or specify a technique by which the fence and its fence panels will be further re-modeled. Such techniques can include those described above with respect to FIGS. 3 and 4. As examples, FIG. 36 illustrates that the user may select a "Gap Compensating" "Adjustment Method" and FIG. 37 illustrates that the user may select a "Fenceboard Narrowing" "Adjustment Method." Once the user has selected a technique, the software re-models the fence and re-creates the visualization to display the fence in the selected or specified fence panel style. Thus, the systems described herein can present the fence and its components in a "what you see is what you get" manner.

The graphical user interface as illustrated in FIGS. 30-37 may allow a user to edit any of the features of the fence runs, fence panels, and fence components illustrated therein, including the measurements of the fence run and fence panels taken in the manner described herein with respect to FIGS. 5-16.

Figure 38:
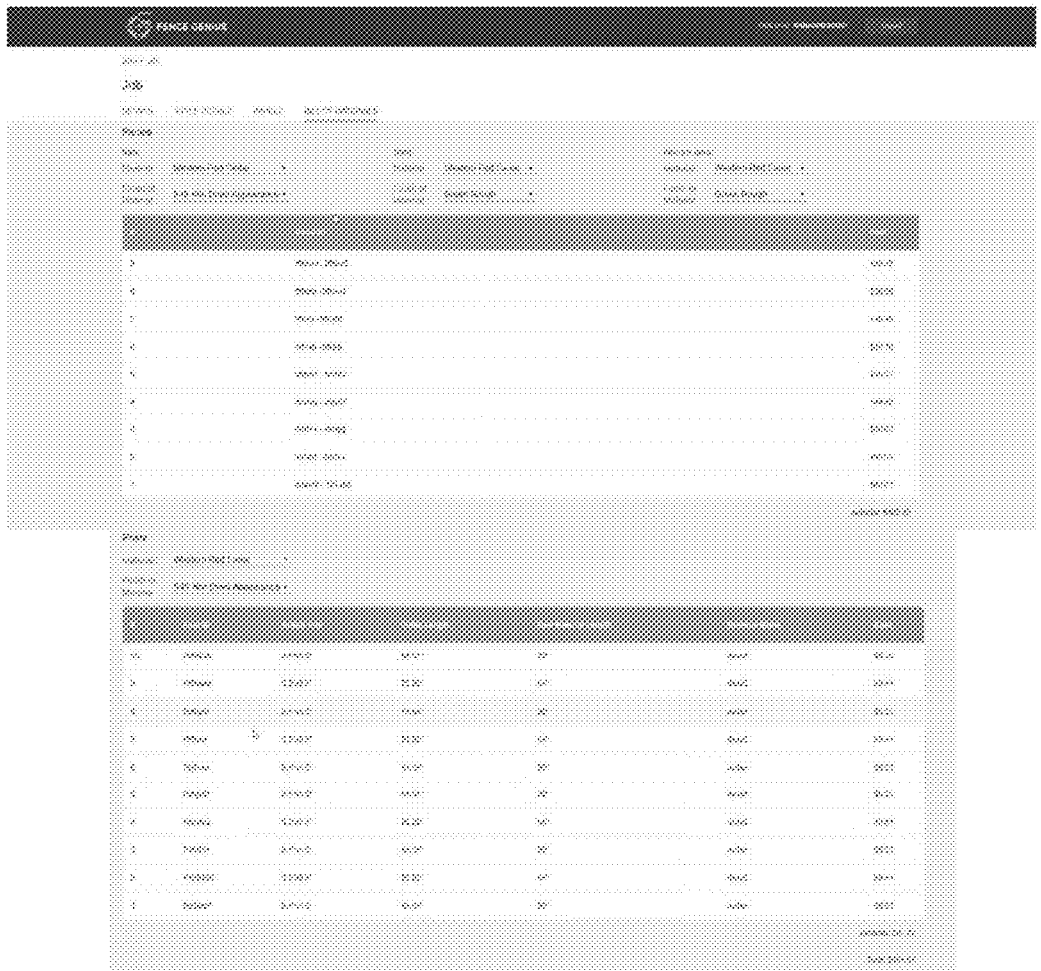
FIG. 38 shows another image of the graphical user interface that allows an operator to input information and preferences regarding a fence including one or more fence runs and one or more fence panels having one or more designs or styles, according to one implementation.

FIGS. 30 and 31 also illustrate that the graphical user interface also presents the user with an option to view a bill of materials including cost estimate information for the fence. FIG. 38 illustrates the graphical user interface after the user has selected the option to view the bill of materials for the fence. As illustrated in FIG. 38, once the user has selected the option to view the bill of materials, the graphical user interface presents a bill of materials including an identification of each of the fence panels and each of the fence posts to be used in the fence. The bill of materials also identifies the type of material (e.g., western red cedar, inland red cedar, incense cedar, southern yellow pine, and/or stained white wood) and finish (e.g., S4S kiln dried appearance, S4S green appearance, green rough, and/or S4S pressure treated appearance) of each component used in the fence panels, and of each of the fence posts. The bill of materials also includes information regarding each of the fence posts, including its overall dimensions and size, which in some implementations can be presented as a cubic size or volume. In some implementations, the information available to the user in the bill or materials can be limited depending on the identity of the user. For example, and end user or customer may be presented with less information than a retailer or contractor.

The bill of materials also includes a cost estimate for each of the fence panels, a first sub-total of a cost for all of the fence panels, a cost estimate for each of the fence posts, a second sub-total of a cost for all of the fence posts, and a total cost estimate for all of the fence panels and all of the fence posts (i.e., for the entire fence). The bill of materials also allows the user to select, specify, or update, such as within a pull-down menu, the type or finish of material to be used for any of the components within the fence. Upon specifying a new or different material for one or more of the components of the fence, the software re-calculates the estimated costs of the fence posts and fence panels and displays the updated cost estimates. In some implementations, the options provided for the type and finish of the materials to be selected by the user can be based on those actually presently available in the commercial market.

Figure 39:
FIG. 39 shows another image of the graphical user interface that allows an operator to input information and preferences regarding a fence including one or more fence runs and one or more fence panels having one or more designs or styles, according to one implementation.

The graphical user interface allows the user to click on or hover over any of the fence panels or fence posts identified in the bill of materials to view additional information regarding the components of the fence. FIG. 39 illustrates the graphical user interface after the user has clicked on the identification of one of the fence panels within the bill of materials illustrated in FIG. 38. As illustrated in FIG. 39, the graphical user interface provides an identification of each component included in the selected fence panel, as well as dimension and cost estimate information for each of the components. Once a user has completed reviewing the bill of materials and inputting information regarding the fence, the user can log out of the software and the graphical user interface.

Figures 40, 41:
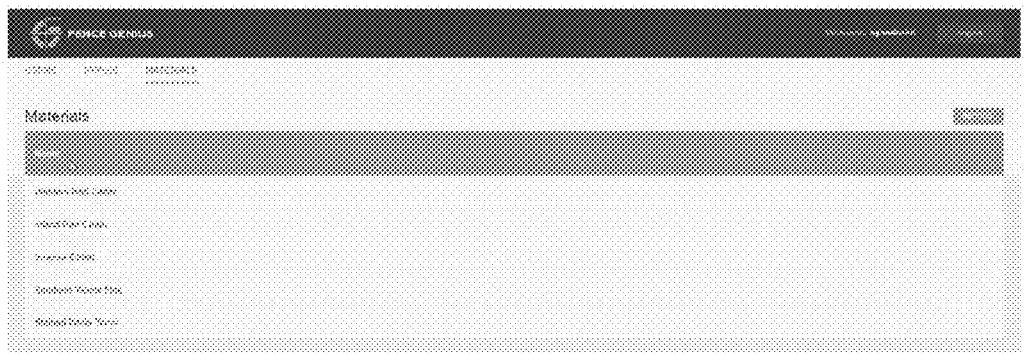
FIG. 40 shows an image of a graphical user interface that allows an operator to input information regarding fence panel material costs to aid in the creation of a bill of materials, according to one implementation.
FIG. 41 shows another image of the graphical user interface that allows an operator to input information regarding fence panel material costs to aid in the creation of a bill of materials, according to one implementation.

FIGS. 40 and 41 illustrate images of a graphical user interface that allows an operator to input information regarding fence panel material costs to aid in the creation of a bill of materials as described above and to allow the user to monitor or review the information. The graphical user interface illustrated in FIGS. 40 and 41 is generated and powered by software running within a browser on a Windows-based computer, but comparable graphical user interfaces can be generated and powered by comparable software running on any suitable computer hardware system, such as locally and natively on the computer hardware system or within a browser running on the computer hardware system, such as on an Android-based smartphone or tablet, an iPhone or iPad, or a Windows-based or Mac desktop or laptop computer.

FIG. 40 illustrates the graphical user interface seen by an operator upon logging into the software. As illustrated in FIG. 40, the graphical user interface includes a list of materials that can be used to manufacture the components of a fence. The graphical user interface allows the user to click on one of the materials presented in the list to view additional information, including cost information, for fence components made of that material. FIG. 41 illustrates the graphical user interface after the user has clicked on one of the materials presented in the list (western red cedar). As illustrated in FIG. 41, the graphical user interface presents a list of components made of the material and having one of a plurality of finishes (e.g., S4S kiln dried appearance). The list of components includes an identification of each component, dimensions of each component, and cost estimate information for each component.

The cost estimate information shown in the graphical user interface can be stored and imported into the software for display in the graphical user interface from a database or an excel spreadsheet saved on the computer running the software and the graphical user interface. For example, FIG. 40 illustrates that the graphical user interface presents the user with the option to "Import" data. Upon selecting such an option, the graphical user interface can prompt the user or provide the option to navigate to a file on the computer that stores the information. Once the user has imported or reviewed such data within the graphical user interface, the user can log out of the software and the graphical user interface.

In some implementations, administrative software and associated graphical user interfaces can be provided to allow an operator or administrator of the consumer-facing software and graphical user interfaces to modify those systems. For example, such administrative software and associated graphical user interfaces can allow the administrator to provide default and/or limit (such as maximum and/or minimum) values for all measurements and other data input into the other software and associated graphical user interfaces.

Any of the software features or modules described herein can be linked to or integrated with other software packages and systems, such as to handle, manage, or perform administrative functions such as tracking the identities of fence panel styles and materials. For example, in some implementations, the software described herein can be integrated with CAD software packages such as AutoCAD, SolidWorks, with BIM software packages such as ArchiCAD, Trimble VICO office, or other construction business management software, such as CONSTRUCTOR software.

Once a fence or one or more fence panels have been designed, such as by the software described herein based on the specifications provided by a user or operator of the software as described herein, the software can present to the user or operator, such as through one or more of the graphical user interfaces discussed herein, an option to purchase the fence or the one or more fence panels. In some cases, the user or operator can purchase such items for new construction of a fence, while in other cases, the user or operator can purchase such items as replacements for worn or damaged components of an existing fence. Once an order has been placed by the user or operator, the components of the fence or the fence panels can be fabricated according to their designs and specifications, the components can be assembled to create the fence panels, and the fence panels can be coupled to fence posts to build the fence. In some implementations, the components of the fence or fence panels can be fabricated and/or assembled by automated fabrication and assembly systems and techniques.

In some implementations, each component of a fence or one or more fence panels (e.g., fence posts, fence rails, and/or fence boards) can be individually machined, can have holes pre-drilled, and can have layout markings marked by automated fabrication systems and techniques. A plurality of such components representing the components of a complete portion of a fence or of one or more complete fence panels can then be collected together into a kit of fence components and packaged for transportation to a job site by automated packaging systems and techniques. Such kits and their components and assembly can include any of the features described in U.S. Pat. Nos. 9,506,270 and/or 9,932,753, which are hereby incorporated herein by reference in their entireties. Each kit of fence components can be unique and can have a different set of components than each of the other kits. Each kit can be customized for a specific user, a specific job, or a specific fence, such as based on environmental information including topography, slope, and/or property line information for the location of the fence, and/or aesthetic and fence style preferences. Some automated systems for fabricating and/or assembling fence components that may be used in such implementations are described in U.S. Pat. No. 9,945,149, which is hereby incorporated herein by reference in its entirety.

In some implementations, an automated fence component fabrication system, which can be referred to as a "rail, cap, and trim machining system," can include a plurality of distinct processing stations for performing one or more fabrication aspects. In one station within the rail, cap, and trim machining system, the station has features configured to receive a piece of raw material to be converted into a component of a fence such as a fence board, a fence rail, or a trim element from a magazine of such materials, and to cut the material to a specified length, including by cutting compound angles at one or more ends of the material. In another station within the rail, cap, and trim machining system, which can be downstream of the aforementioned station and configured to receive the component from the aforementioned station, the station has features configured to cut holes, pockets, recesses, or indentations into the components. Such holes, pockets, recesses, or indentations may or may not extend all the way through the components from one side to another, opposite side. In some implementations, this can include cutting cavities having any of the features described in U.S. patent application publication no. 2017/0350157, which is hereby incorporated herein by reference in its entirety, such as for the cavities 212 formed in an end portion 210 of a rail 206 as described therein.

In another station within the rail, cap, and trim machining system, which can be downstream of the aforementioned stations, the station has features configured to pre-drill or punch holes, such as ¼ inch deep, into the component. In some instances, this station can be used to pre-drill or punch a pattern of holes in one or more fence rails of a fence panel and to pre-drill or punch a pattern of holes in one or more fence boards of the fence panel, so that final assembly of the fence panel can proceed in part by aligning the holes pre-drilled or punched in the fence rails with the holes pre-drilled or punched in the fence boards, and then nailing or screwing or otherwise fastening the fence rails and the fence boards together with each nail or screw or other fastener passing through a respective pre-drilled or punched hole in the fence rails and a respective pre-drilled or punched hole in the fence boards.

In yet another station within the rail, cap, and trim machining system, which can be downstream of the aforementioned stations, the station has features, such as a laser printer, inkjet printer, or other type of printer or printing device, configured to print markings onto the component. Such markings can include a unique identifier for the specific component. Such markings can also include an identification of a position the component is intended to fill in the completed fence. For example, a marking "C" on a fence board can indicate that that fence board is intended to fill a center position within a fence panel, while a marking "L1" on a fence board can indicate that the fence board is intended to be located one position to the left of the center fence board and a marking "R3" on a fence board can indicate that the fence board is intended to be located 3 positions to the right of the center fence board.

Such markings can also include layout reference markings. For example, a fence rail can be provided with markings indicating the edges of fence boards intended to be coupled to the fence rail, and a fence board can be provided with markings indicating the edges of fence rails intended to be coupled to the fence board. Once the fence component has been processed within each of the stations of the system, the component can be ejected out of the system for packaging within a kit of fence or fence panel components.

In some implementations, a fence component can be processed within the aforementioned stations sequentially. In some implementations, while one component is being processed in each of the stations, another component, passing through the system behind or upstream of the other component, can be processed in a station immediately upstream, or one station upstream, or within two stations upstream of the other component, or three stations upstream of the other component.

While each of the stations are described herein as distinct, separate, and sequential stations, in other implementations, a plurality of the stations described herein can be combined into a single station such that, for example, the system has features configured to pre-drill holes in and print markings on the component at the same time. The stations may also be sub-stations within a single machine assembly. Moreover, any of the fabrication or machining aspects discussed in connection with the stations can be combined in any suitable manner in one or more stations to fabricate the fence components disclosed herein.

In some implementations, an automated fence component fabrication system, which can be referred to as a "fence board machining system," can include a plurality of distinct processing stations for performing one or more fabrication aspects. In one station within the fence board machining system, the station has features configured to receive a piece of raw material to be converted into a fence board, such as from a magazine of such materials, and to cut the material to a specified width of a fence board. In some implementations, the station can include a linear molder. In another station within the fence board machining system, which can be downstream of the aforementioned station and configured to receive the fence board from the aforementioned, the station has features configured to cut both a bottom end and a top end of the fence board to desired shapes, as well as to pre-drill or punch holes into the fence board.

In some implementations, cutting the bottom end of the fence board to a desired shape can include cutting the bottom end to match a slope of a ground surface at a location where the fence board will be installed, and can include cutting compound angles at the bottom end of the fence board. In some implementations, cutting the top end of the fence board to a desired shape can include cutting the top end of the fence board with a CNC router to have a dog ear, half-arch, gothic picket, or other desired shape, and can include cutting compound angles at the top end of the fence board. In some implementations, pre-drilling or punching holes into the fence board includes pre-drilling or punching a pair of holes into the fence board for each intersection, joint, or connection the fence board is expected to have with a fence rail.

Pre-drilling or punching holes into the fence board can include drilling or punching the pairs of holes into the fence board from a center of the fence board outward. The two pre-drilled or punched holes within each pair of pre-drilled or punched holes can be spaced apart from each other by 5.5 inches. The two pre-drilled or punched holes within each pair of pre-drilled or punched holes can be arranged within the fence board such that a line extending from a center of one of the holes to a center of the other of the holes is oriented at a 45 degree angle to level when the fence board is installed in its final position and orientation within a completed fence. The pre-drilled or punched holes can be drilled or punched such that they alternate back and forth between one side (e.g., a left side) of the fence board and an opposite side (e.g., a right side) of the fence board as they extend from one end of the fence board (e.g., a bottom end) to an opposite end of the fence board (e.g., a top end). The pre-drilled or punched holes can be drilled or punched according to any desired pattern, such as based on aesthetics or a specified style for the fence board or a fence panel or fence into which the fence board is to be incorporated.

In another station within the fence board machining system, which can be located within or provide a cleaner environment than the aforementioned stations of the fence board machining system, and which can be downstream of the aforementioned stations, the station has features, such as a laser printer, inkjet printer, or other type of printer or printing device, configured to print markings onto the fence board. Such markings can include a unique identifier for the specific fence board, or a unique identifier for a fence panel and/or a fence into which the fence board is to be incorporated. Such markings can also include an identification of a position the fence board is intended to fill in the completed fence. For example, a marking "C" on a fence board can indicate that that fence board is intended to fill a center position within a fence panel, while a marking "L1" on a fence board can indicate that the fence board is intended to be located one position to the left of the center fence board and a marking "R3" on a fence board can indicate that the fence board is intended to be located 3 positions to the right of the center fence board. Such markings can be marked on the fence board at a location that will be covered by another component, such as a fence rail, a fence post, or a piece of fence trim, of the completed fence panel or fence into which the fence board is to be incorporated. Such markings can also include layout reference markings. For example, a fence board can be provided with markings indicating the edges of fence rails intended to be coupled to the fence board.

In yet another station within the fence board machining system, which can be downstream of the aforementioned stations, the station has features configured to finish, such as by sanding, the cut ends, surfaces, or edges of the fence board. The station also has features configured to stain the fence board, such as with a semi-transparent or a transparent stain such that any markings marked on the fence board remain visible through the stain, or with a solid, opaque stain such that any markings marked on the fence board are no longer visible or must be temporarily covered during the staining process. The station also has features configured to provide other aesthetic features to the fence board, such as pre-distressing or other desired visual appearances. In some implementations, a laser printer can be used to engrave markings sufficiently deep and/or sufficiently wide that they remain visible to the naked eye after such a staining, painting, or other finishing process.

Once the fence board has been processed within each of the stations of the system, the fence board can be ejected out of the system for packaging within a kit of fence or fence panel components. In some implementations, a first fence board can be processed within the aforementioned stations sequentially. In some implementations, while one fence board is being processed in each of the stations, another fence board, passing through the system behind or upstream of the other board, can be processed in a station immediately upstream, or one station upstream, or within two stations upstream of the other fence board, or three stations upstream of the other fence board. While each of the stations are described herein as distinct, separate, and sequential stations, in other implementations, a plurality of the stations described herein can be combined into a single station such that, for example, their respective operations can take place at the same time. The stations may also be sub-stations within a single machine assembly. Moreover, any of the fabrication or machining aspects discussed in connection with the stations can be combined in any suitable manner in one or more stations to fabricate the fence components disclosed herein.

The automated fence component fabrication systems can each have overall dimensions or sizes configured to allow one of each of the automated fence component fabrication systems to fit within a standard two car garage.

Interactive systems and methods are provided for designing and constructing fences or other structures supported by posts, including methods which enable users to design custom fence panels and be presented with dynamic visual representations of such custom fence panels and related bill of material information. Implementations also include various functionality for ensuring that each fence panel of a fence has uniformly spaced fence boards of a common width with no partial width boards required to laterally fill the fence panel. Such systems and methods can assist in designing and fabricating more aesthetic fence panels, fence runs, and fences, and can assist in improving the efficiency of designing and fabricating fence panels, fence runs, and fences.

While the features described herein have been described primarily within the context of fencing systems, any of the features described herein can be used with or applied to other systems such as handrails, guardrails, rails generally, signposts, or any other upstanding structure supported by posts. For example, aspects of the systems and methods described herein may be particularly well suited for designing and constructing municipal/city sidewalk handrails.

Figure 42:
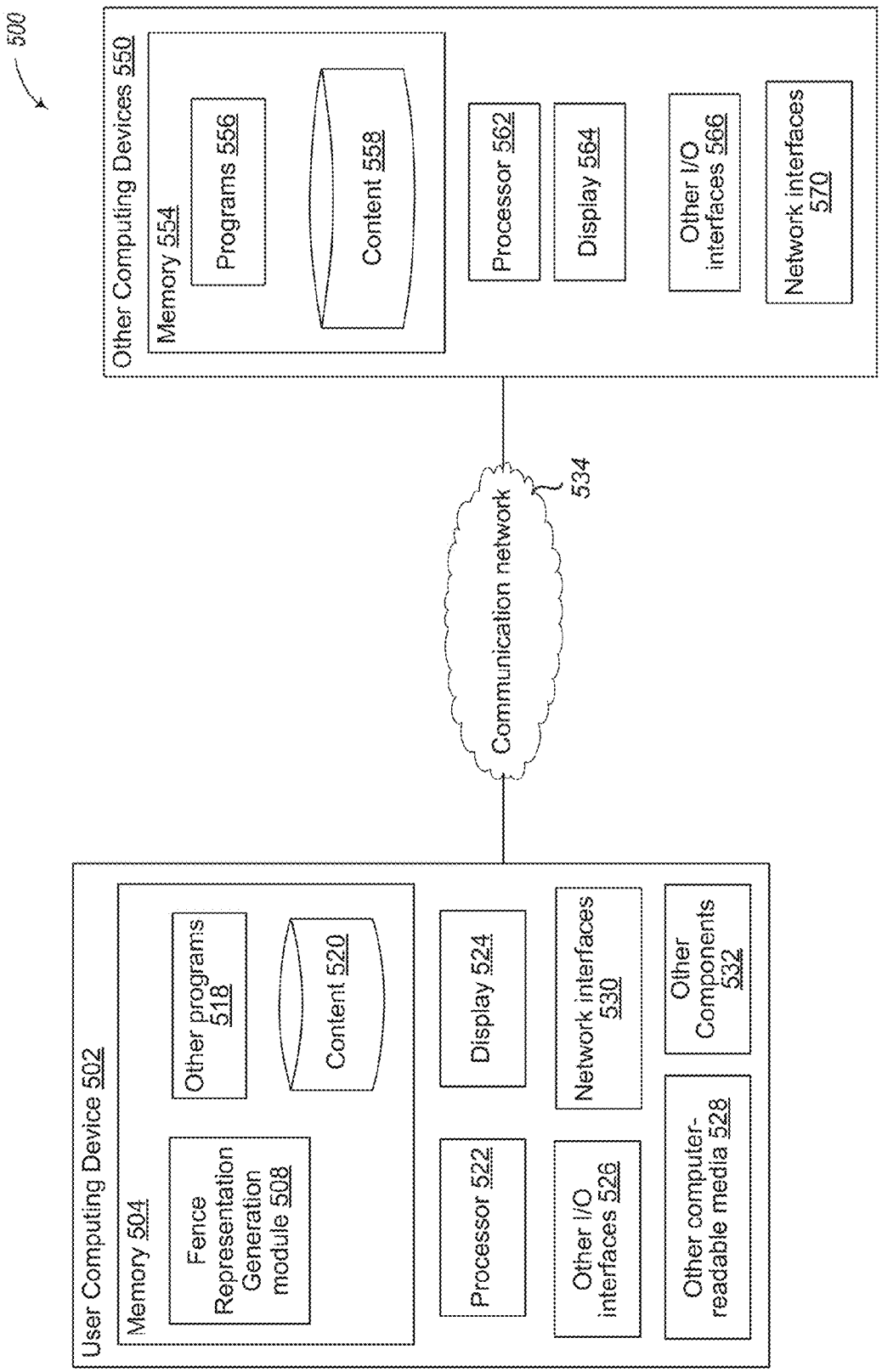
FIG. 42 shows a system diagram that describes one implementation of computing systems for performing the implementations described herein.

FIG. 42 shows a system diagram that describes one implementation of computing systems for performing the implementations described herein. System 500 includes user computing device 502, and optionally one or more other computing devices 550. Implementations described herein may be executed by the user computing device 502, or they may be executed by the other computing devices 550 such that a user of the user computing device 502 accesses the functionality provided by the other computing devices 550.

User computing device 502 is a computing device that can perform functionality described herein for generating and presenting representations of fence panels to a user and providing user interfaces that enable the user to dynamically select or modify one or more fence panel characteristics. One or more special-purpose computing systems may be used to implement the user computing device 502. Accordingly, various implementations described herein may be implemented in software, hardware, firmware, or in some combination thereof. The user computing device 502 includes memory 504, one or more processors 522, display 524, input/output (I/O) interfaces 526, other computer-readable media 528, network interface 530, and other components 532.

Processor 522 includes one or more processing devices that execute computer instructions to perform actions, including at least some implementations described herein. In various implementations, the processor 522 may include one or more central processing units (CPUs), programmable logic, or other processing circuitry.

Memory 504 may include one or more various types of non-volatile and/or volatile storage technologies. Examples of memory 504 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 504 may be utilized to store information, including computer-readable instructions that are utilized by processor 522 to perform actions, including at least some implementations described herein.

Memory 504 may have stored thereon various modules, such as fence representation generation module 508. The fence representation generation module 508 provides functionality to generate and update fence panel representations and to present one or more user interfaces to the user with the fence panel representations and one or more elements for the user to adjust one or more fence panel characteristics.

Memory 504 may also store other programs 518 and other content 520. Other programs 518 may include operating systems, user applications, or other computer programs. Content 520 may include visual information regarding one or more fence panels, boards, rails, materials, colors, etc., as described herein.

Display 524 is a display device capable of rendering fence panel representations and user interfaces to a user. In various implementations, the fence panel representation generated by the fence representation generation module 508 is presented to the user via the display 524. In some implementations, the display 524 may include a touch screen in which the user can interact and input changes to one or more fence panel characteristics. The display 524 may be a liquid crystal display, light emitting diode, or other type of display device, and may include a touch sensitive screen capable of receiving inputs from a user's hand, stylus, or other object.

I/O interfaces 526 may include interfaces for various other input or output devices, such as audio interfaces, other video interfaces, tactile interface devices, USB interfaces, physical buttons, keyboards, or the like.

Other computer-readable media 528 may include other types of stationary or removable computer-readable media, such as removable flash drives, external hard drives, or the like.

Network interfaces 530 are configured to communicate with other computing devices, such as the other computing devices 550, via a communication network 534. Network interfaces 530 include transmitters and receivers (not illustrated) to send and receive data to and from other computing devices. In some implementations, the user computing device 502 may also be in communication with other devices (not illustrated), such as an electronic fence installation device (e.g., a computing device that determines a distance between posts, an elevation change between posts, a centerline angle between the posts, etc.), via network interfaces 520 or other I/O interfaces 526.

The communication network 534 is configured to couple various computing devices to transmit data from one or more devices to one or more other devices. Communication network 534 includes various wired or wireless networks that may be employed using various forms of communication technologies and topologies, such as, but not limited to, cellular networks, mesh networks, or the like.

The other computing devices 550 are computing devices that are remote from the user computing device 502, and in some implementations, can perform functionality described herein for generating and providing representations of fence panels to a user to enable the user to interact with one or more user interfaces to dynamically select or modify one or more fence panel characteristics. The other computing devices 550 may include a remote server, another user computing device, or some other computing device. In this way, a user of the user computing device 502 can access or utilize the other computing devices 550 to obtain the benefits described herein.

One or more special-purpose computing systems may be used to implement the other computing devices 550. Accordingly, various implementations described herein may be implemented in software, hardware, firmware, or in some combination thereof.

The other computing devices 550 include memory 554, one or more processors 562, display 564, I/O interfaces 566, and network interface 570, which may be similar to or incorporate implementations of memory 504, processor 522, display 564, I/O interfaces 526 and network interface 570 of user computing device 502, respectively. Thus, processor 562 includes one or more processing devices that execute computer instructions to perform actions, including at least some implementations described herein. In various implementations, the processor 522 may include one or more central processing units (CPUs), programmable logic, or other processing circuitry. Memory 554 may include one or more various types of non-volatile and/or volatile storage technologies. Memory 554 may be utilized to store information, including computer-readable instructions that are utilized by processor 562 to perform actions, including at least some implementations described herein. Memory 554 may also store programs 556 and content 558. The programs 556 may include a fence representation generation module, not illustrated, similar to fence representation generation module 508 that generates and updates fence panel representations and presents one or more user interfaces to the user with the fence panel representations and one or more elements for a user of the user computing device 502 to adjust one or more fence panel characteristics.

Figure 43:
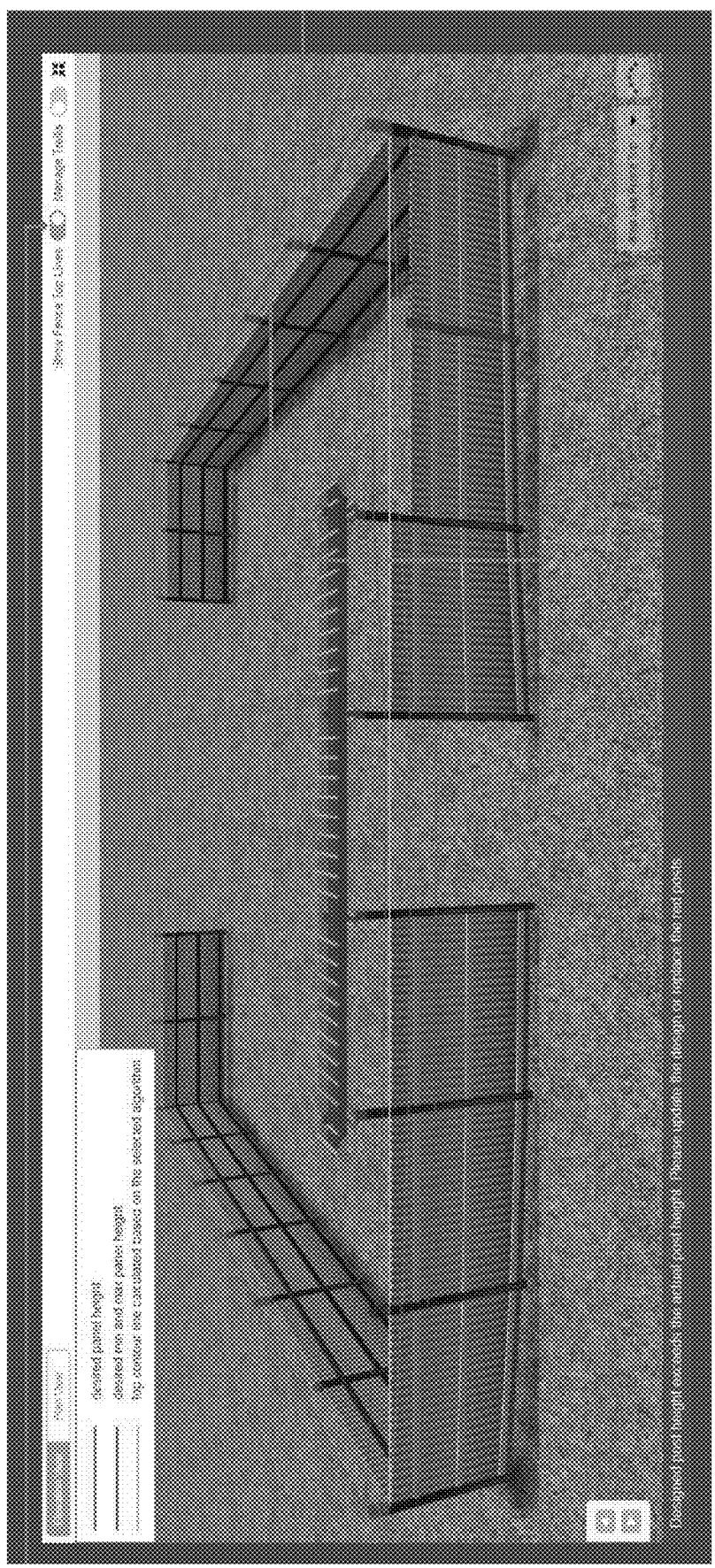
FIG. 43 shows a portion of a graphical user interface for designing and displaying a fence, fence runs, fence panels, and components of a fence based on actual measured fence post heights.

FIG. 43 illustrates a graphical user interface seen by an operator upon completion, by a computer system, of a design of at least portions of a fence based on parameters previously specified by the operator (e.g., such as that the fence will have a step-like top profile). Upon completion of the design of the portions of the fence, as seen in FIG. 43, the operator is presented with a visualization of the portions of the fence and an option, at a top right portion of the graphical user interface, to "Show Fence Top Lines." Upon the operator selecting the option to show fence top lines in the graphical user interface, the graphical user interface is modified to overlay a set of lines (which may be solid, dashed, dotted, dashed-dotted, or any other type of lines) or other visual indicators or targets on top of the visualization of the portions of the fence, and to present a key or a legend in a top left portion of the graphical user interface.

The key may explain that red lines indicate the locations of minimum and maximum panel heights, which may have been previously specified by the operator, such as in accordance with the description of features elsewhere herein. The key may also explain that green lines indicate desired or target panel heights, which may have been previously specified by the operator, such as in accordance with the description of features elsewhere herein. The key may also explain that yellow lines indicate panel heights of the portions of the fence as designed by the computer system in accordance with the inputs and algorithms specified by the operator, such as in accordance with the description of features elsewhere herein.

The visualization provided in the graphical user interface of FIG. 43 of the portions of the fence as designed by the computer system may be useful to the operator at least because it allows the operator to readily assess upper and lower bounds of the top edge of the fence and compare the desired fence panel heights to such bounds as well as to the fence panel heights specified by the computer system. The visualization also allows the operator to locate problematic areas of the design, such as fence posts having actual measured heights that constrain the rest of the design. For example, the visualization provided in the graphical user interface of FIG. 43 has highlighted one fence post in red because it has been determined that that fence post is too short to allow the fence to be built as designed by the computer system and as presented in the visualization. That is, the designed fence panel at that location is taller than the actual fence post at that location. Thus, based on a review of the graphical user interface of FIG. 43 and the visualization presented therein, the operator may change the parameters of the design of the portions of the fence or may replace fence posts in the field (e.g., replace a relatively short fence post with a taller fence post).

Figure 44:
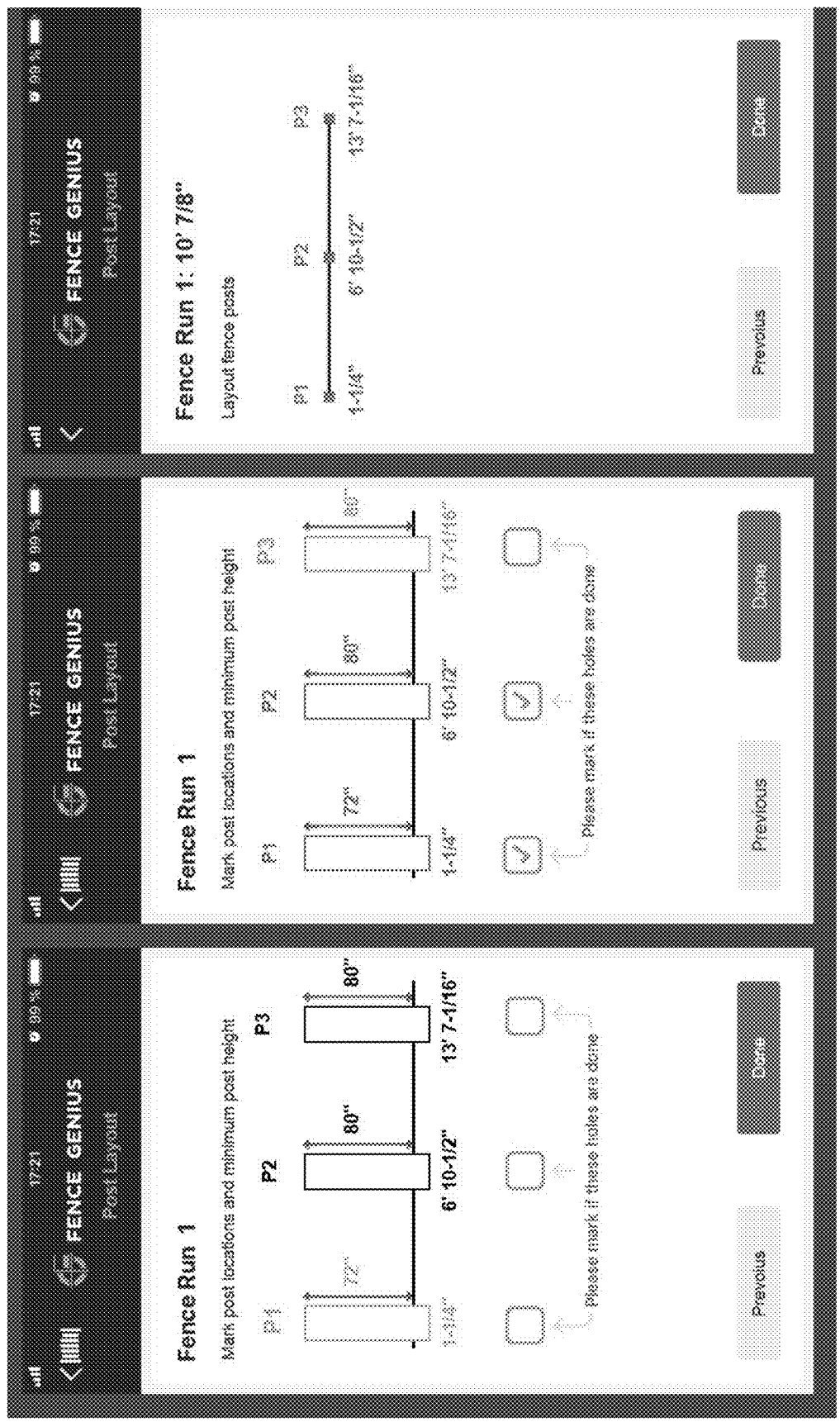
FIG. 44 shows a portion of another graphical user interface for use in building a fence based on calculated fence post layouts.

FIG. 44 illustrates a graphical user interface seen by an operator upon completion, by a computer system, of a design of at least a fence run of a fence based on parameters previously specified by the operator, and upon initiation, by the operator, of installation of a series of fence posts in the fence run. Upon completion of the design of the fence run and initiation of installation of the fence posts, the operator can use the graphical user interface of FIG. 44 as an aid in installing the fence posts. In particular, FIG. 44 illustrates three distinct panels of the graphical user interface, and the operator can begin installing the fence posts by referring to the information presented in the first panel.

For example, the first panel of the graphical user interface of FIG. 44 illustrates a layout for a set of fence posts, which includes at least three fence posts. The first panel of the graphical user interface of FIG. 44 specifies that a first fence post in the fence run is to be located 1¼ inches, in a specified direction, from a property line, a property corner, or another well-defined, established, known geographical location, and is to have a post height of at least 72 inches above ground level. The first panel of the graphical user interface of FIG. 44 also specifies that a second fence post in the fence run is to be located 6 feet, 10½ inches, in a specified direction (which may be the same as for the first fence post), from the property line, property corner, or other well-defined, established, known geographical location, and is to have a post height of at least 80 inches above ground level. The first panel of the graphical user interface of FIG. 44 also specifies that a third fence post in the fence run is to be located 13 feet, 7¹/₁₆ inches, in a specified direction (which may be the same as for the first and second fence posts), from the property line, property corner, or other well-defined, established, known geographical location, and is to have a post height of at least 80 inches above ground level.

The first panel of the graphical user interface of FIG. 44 prompts the operator to mark, such as in chalk or spray paint, such dimensions for each of the fence posts on the ground near the location of each respective fence post. In other implementations, the first panel of the graphical user interface of FIG. 44 may prompt the operator to actually install each of the specified fence posts such that the installed fence posts are arranged to have the specified dimensions for each of the fence posts. In either case, the specified heights are minimum heights and fence posts of any height exceeding the specified minimum heights may be used. The first panel of the graphical user interface of FIG. 44 also prompts the operator to check a box in the graphical user interface when such tasks are completed for each of the fence posts.

The second panel of the graphical user interface of FIG. 44 is the same as the first panel thereof except that the operator has checked two of the boxes indicating that the dimensions for a respective two of the fence posts have been marked on the ground, or that such fence posts have been installed, and the graphical user interface of FIG. 44 has illustrated those fence posts in green to indicate that the tasks for those fence posts have been completed. The third panel of the graphical user interface of FIG. 44 illustrates the graphical user interface once the operator has checked all available boxes, indicating that the tasks have been completed for each of the fence posts.

Figure 45B:
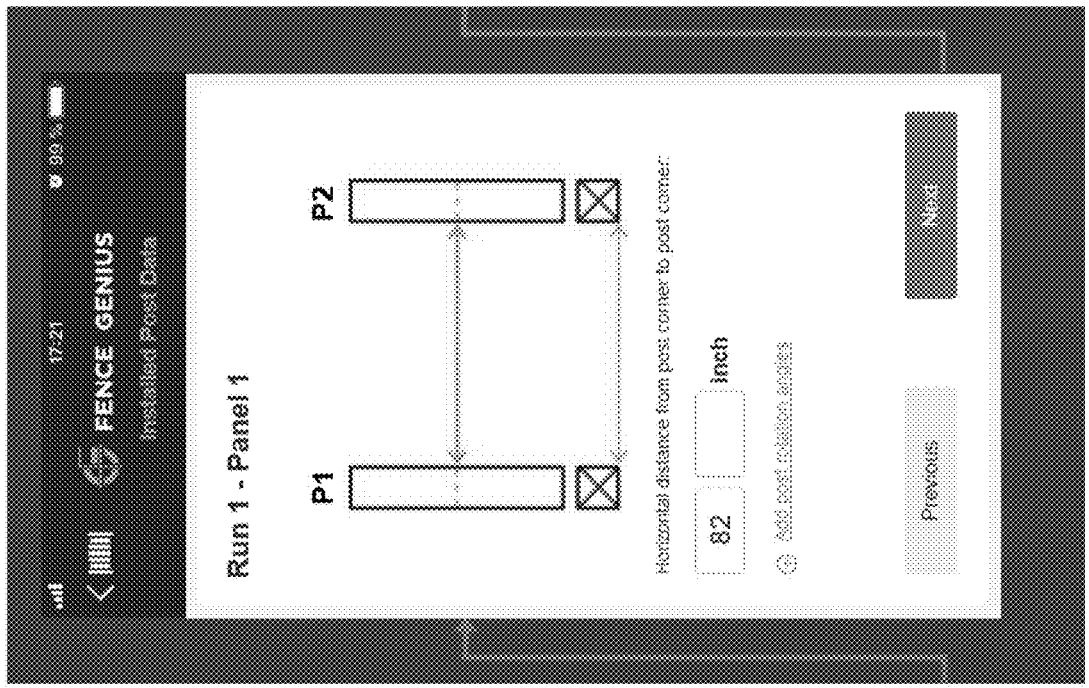
FIG. 45B shows another portion of the graphical user interface for inputting data regarding heights of fence posts.
Figure 45A:
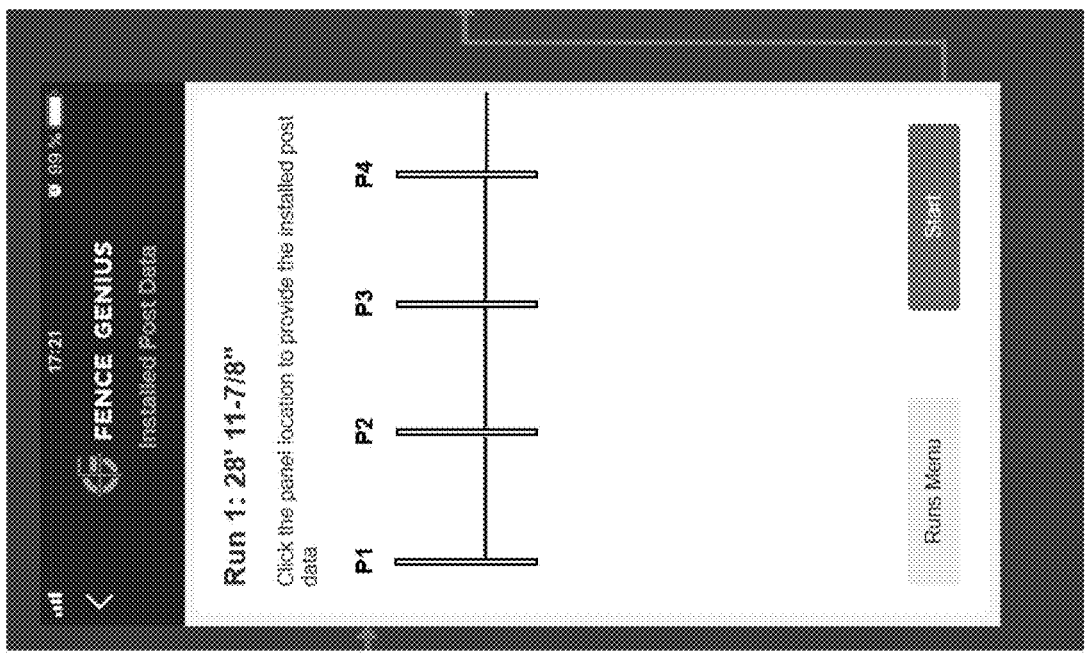
FIG. 45A shows a portion of another graphical user interface for inputting data regarding heights of fence posts.

FIGS. 45A-45K illustrate portions of another graphical user interface for inputting data regarding heights of installed fence posts. As seen in FIG. 45A, the operator is presented with an interface that allows the operator to select from a plurality of locations for fence panels within a fence run, and then press "start." FIG. 45B illustrates the graphical user interface seen by the operator upon selecting a first fence panel location, which is between a first installed fence post P1 and a second installed fence post P2, and then pressing start. As illustrated in FIG. 45B, the graphical user interface next prompts the operator to input a horizontal distance between a corner of the first installed fence post and a corner of the second installed fence post, and then press "next." Each of such corners may be a corner on an inside-facing face of the respective fence post at a corner thereof closest to the other fence post in the measurement.

Figure 45D:
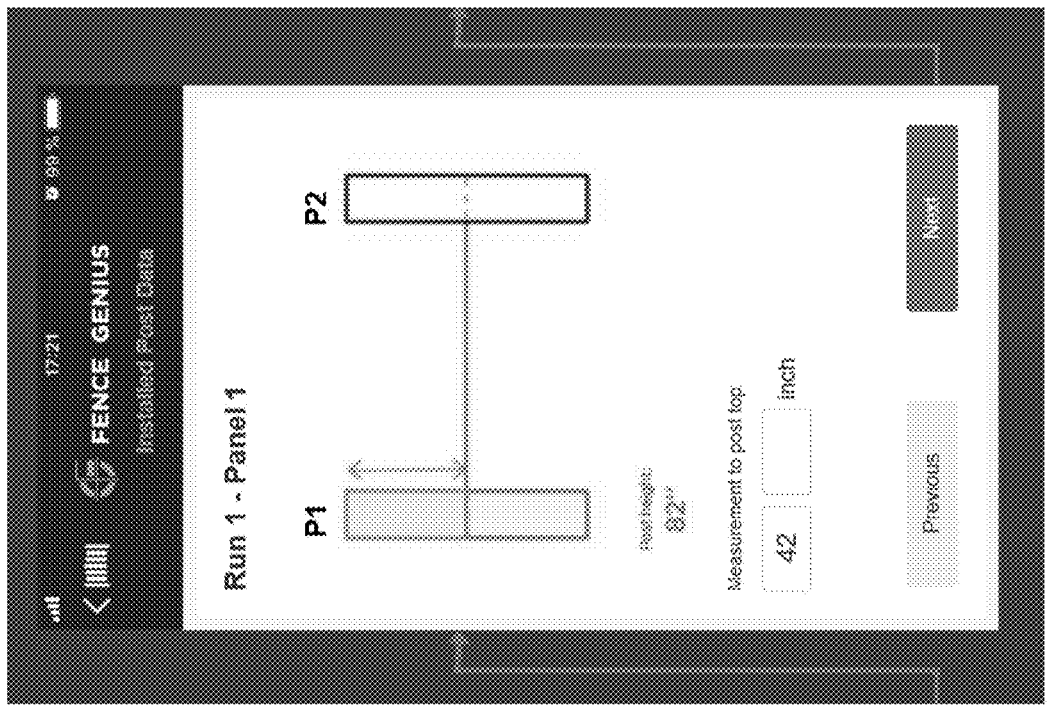
FIG. 45D shows another portion of the graphical user interface for inputting data regarding heights of fence posts.
Figure 45C:
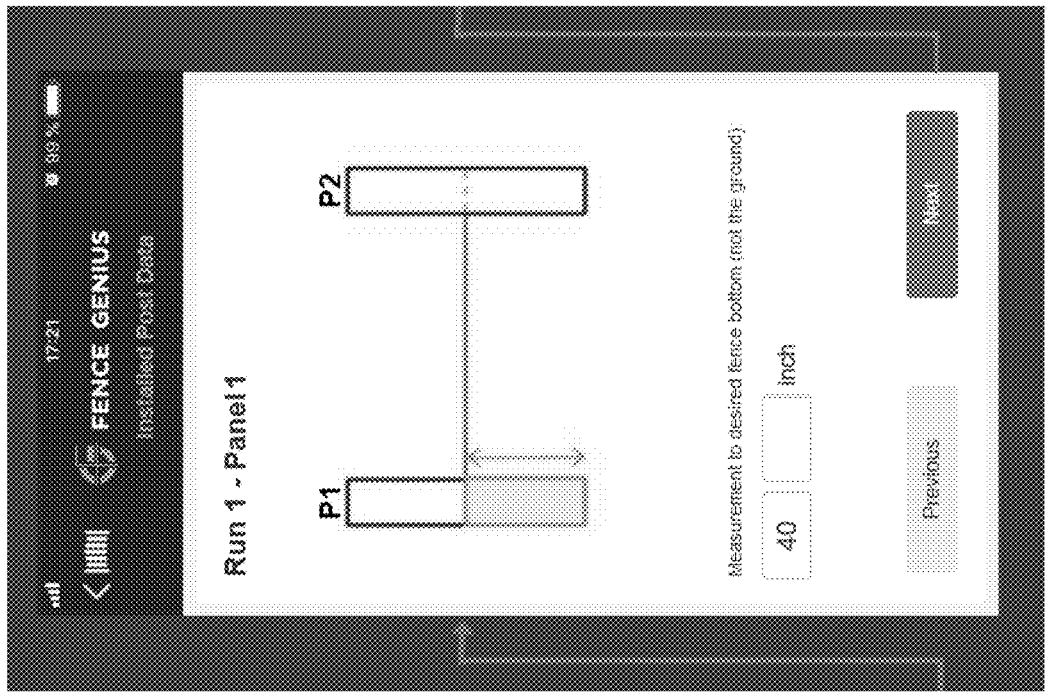
FIG. 45C shows another portion of the graphical user interface for inputting data regarding heights of fence posts.

FIG. 45C illustrates the graphical user interface seen by the operator upon inputting the horizontal distance and then pressing next. As illustrated in FIG. 45C, the graphical user interface next prompts the operator to use a first horizontal element, such as a rigid structural component such as a wooden 2×4 with a level coupled thereto, so that it extends horizontally from the first installed fence post to the second installed fence post, or to otherwise establish a level horizontal line or plane extending from the first installed fence post to the second installed fence post, such as with a laser level, and/or marking such with removable marks or tack pins on the installed fence posts, and to input a measurement of a vertical height from the first horizontal element to a desired bottom of the fence panels at the location of or adjacent to the first installed fence post, and then press "next." FIG. 45D illustrates the graphical user interface seen by the operator upon inputting the measured vertical height and then pressing next. As illustrated in FIG. 45D, the graphical user interface next prompts the operator to input a measurement of a vertical height from the first horizontal element to a top of the first installed fence post, and then press "next."

Figure 45F:
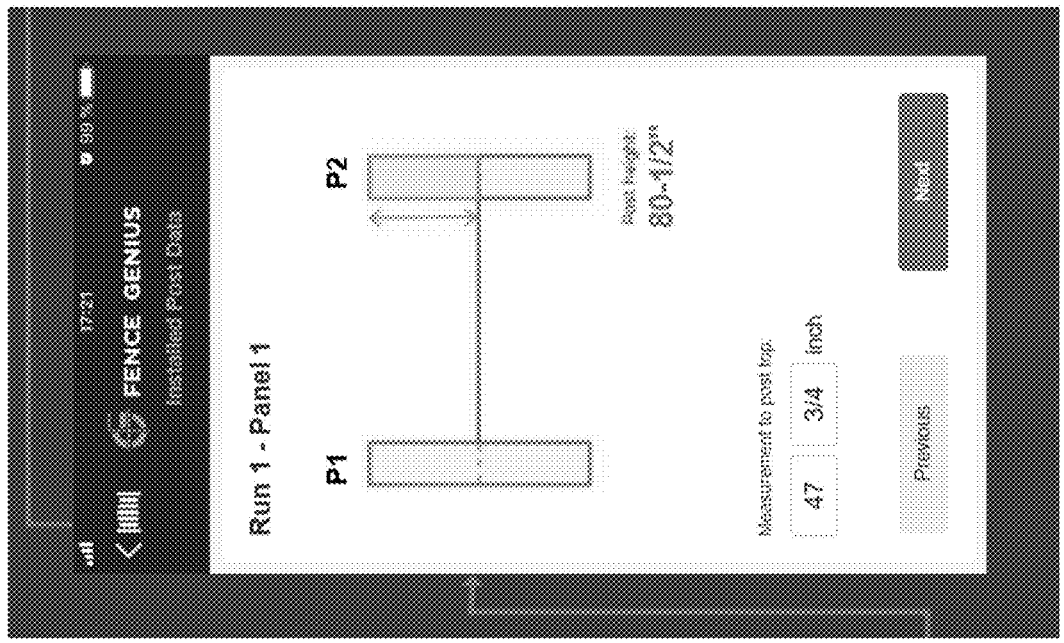
FIG. 45F shows another portion of the graphical user interface for inputting data regarding heights of fence posts.
Figure 45E:
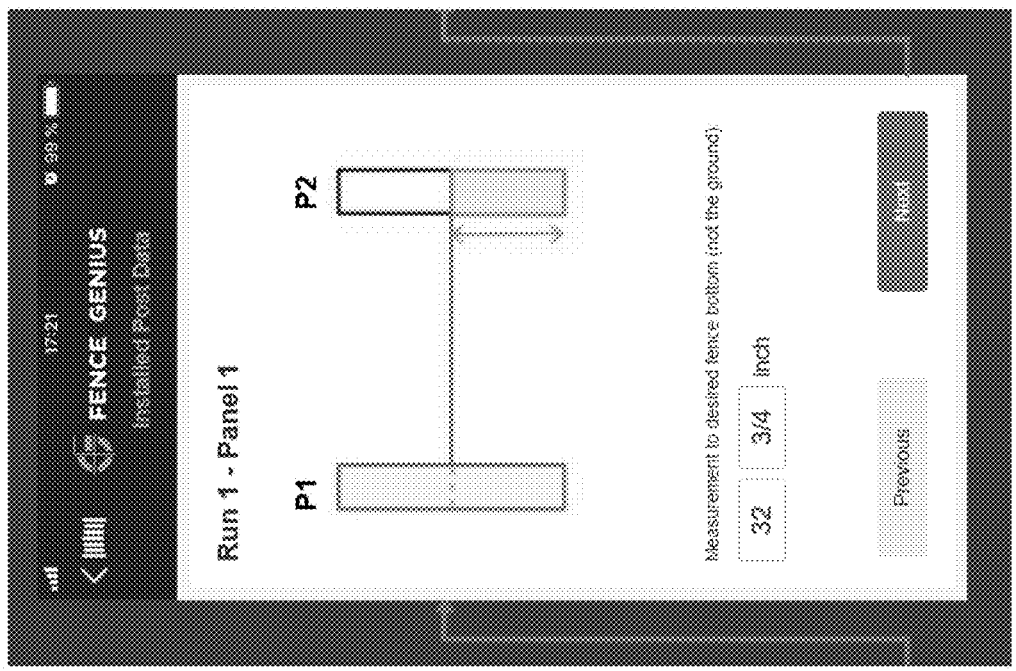
FIG. 45E shows another portion of the graphical user interface for inputting data regarding heights of fence posts.

FIG. 45E illustrates the graphical user interface seen by the operator upon inputting the measured vertical height and then pressing next. As illustrated in FIG. 45E, the graphical user interface next prompts the operator to input a measurement of a vertical height from the first horizontal element to a desired bottom of the fence panels at the location of or adjacent to the second installed fence post, and then press "next." FIG. 45F illustrates the graphical user interface seen by the operator upon inputting the measured vertical height and then pressing next. As illustrated in FIG. 45F, the graphical user interface next prompts the operator to input a measurement of a vertical height from the first horizontal element to a top of the second installed fence post, and then press "next."

Figure 45H:
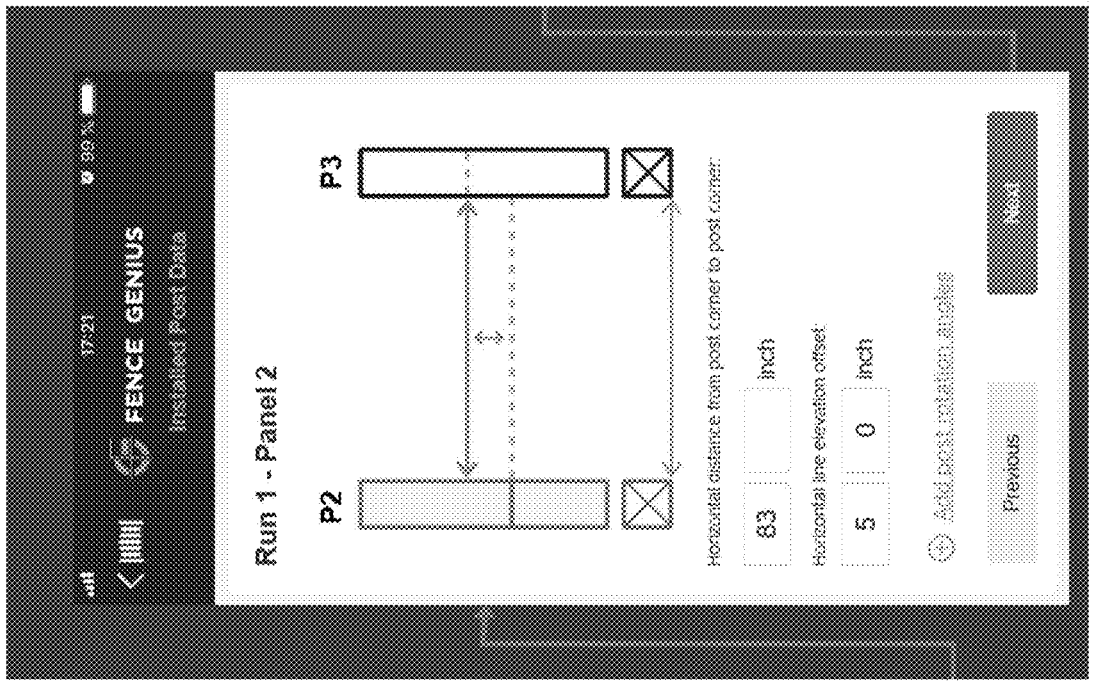
FIG. 45H shows another portion of the graphical user interface for inputting data regarding heights of fence posts.
Figure 45G:
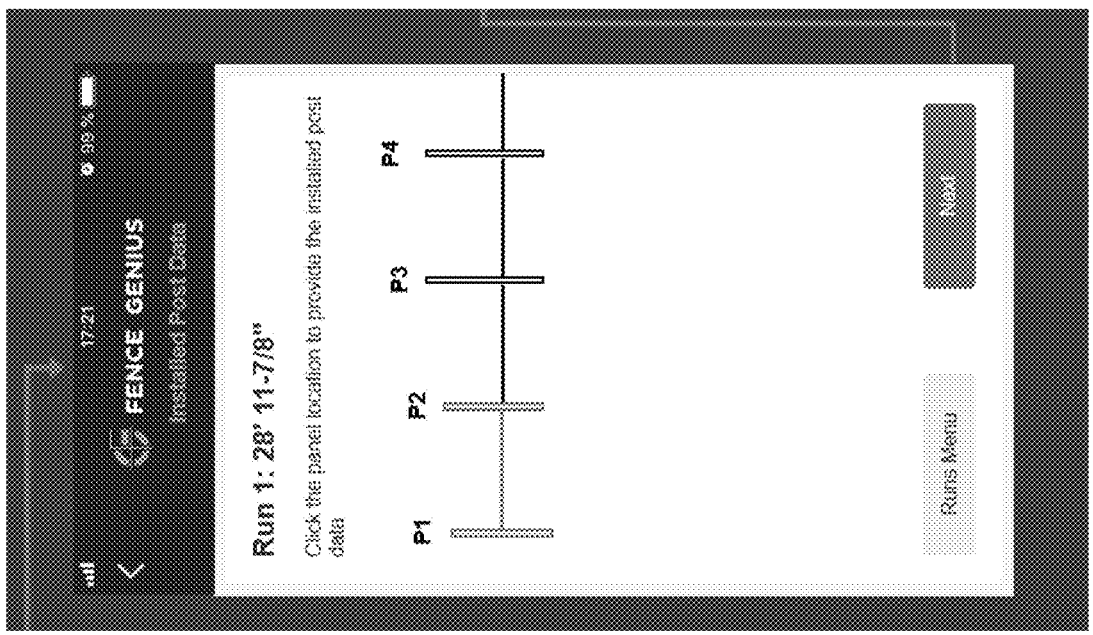
FIG. 45G shows another portion of the graphical user interface for inputting data regarding heights of fence posts.

FIG. 45G illustrates the graphical user interface seen by the operator upon inputting the measured vertical height and then pressing next. As illustrated in FIG. 45G, the graphical user interface next prompts the operator to select from a plurality of locations for fence panels within a fence run, and then press "next," with the first installed fence post, the first fence panel, and the second installed fence post illustrated in green to indicate that measurements have already been input for those components. FIG. 45H illustrates the graphical user interface seen by the operator upon selecting a second fence panel location, which is between the second installed fence post P2 and a third installed fence post P3, and then pressing next. As illustrated in FIG. 45H, the graphical user interface next prompts the operator to input a horizontal distance between a corner of the second installed fence post and a corner of the third installed fence post (each of such corners may be a corner on an inside-facing face of the respective fence post at a corner thereof closest to the other fence post in the measurement), as well as to install a second horizontal element, such as a rigid structural component such as a wooden 2×4 with a level coupled thereto, so that it extends horizontally from the second installed fence post to the third installed fence post, or to otherwise establish a level horizontal line or plane extending from the second installed fence post to the third installed fence post, such as with a laser level, and/or marking such with removable marks or tack pins on the installed fence posts, and to input a measurement of an offset between the height of the first horizontal element and the second horizontal element, which may be zero, and then press "next."

Figure 45J:
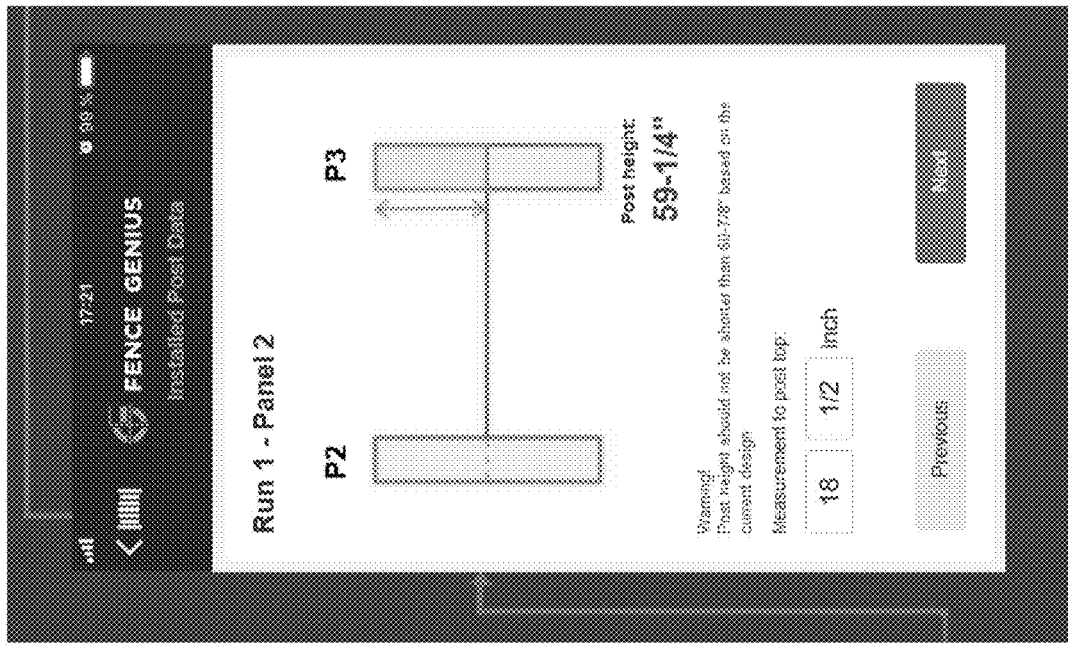
FIG. 45J shows another portion of the graphical user interface for inputting data regarding heights of fence posts.
Figure 45I:
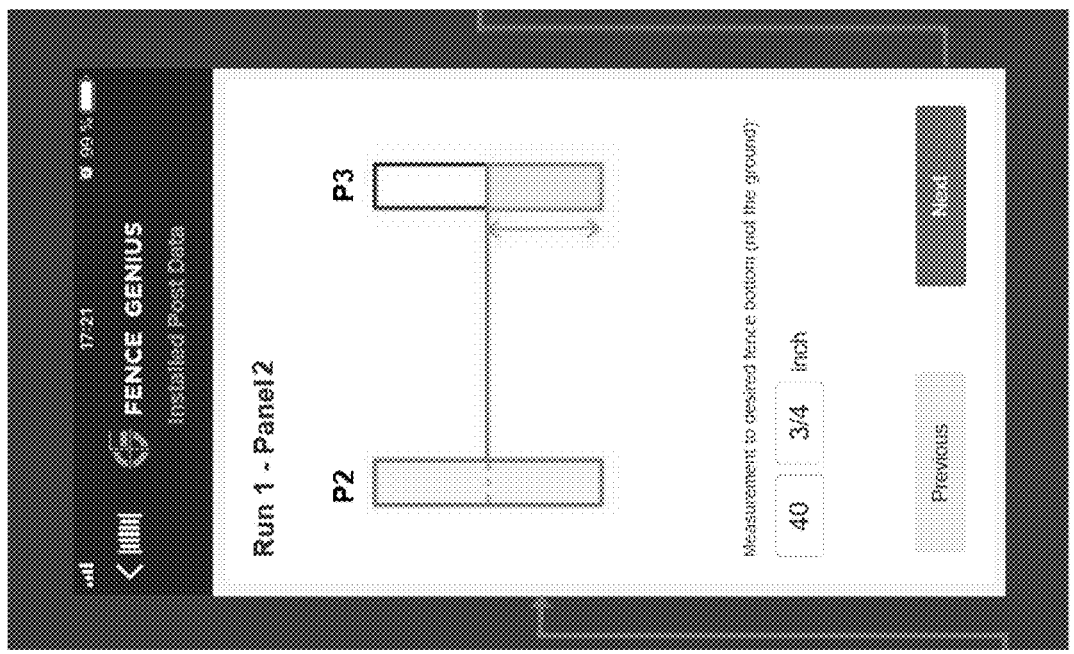
FIG. 45I shows another portion of the graphical user interface for inputting data regarding heights of fence posts.

FIG. 45I illustrates the graphical user interface seen by the operator upon inputting the horizontal distance and the offset and then pressing next. As illustrated in FIG. 45I, the graphical user interface next prompts the operator to input a measurement of a vertical height from the second horizontal element to a desired bottom of the fence panels at the location of or adjacent to the third installed fence post, and then press "next." FIG. 45J illustrates the graphical user interface seen by the operator upon inputting the measured vertical height and then pressing next. As illustrated in FIG. 45J, the graphical user interface next prompts the operator to input a measurement of a vertical height from the second horizontal element to a top of the third installed fence post, and then press "next."

Figure 45K:
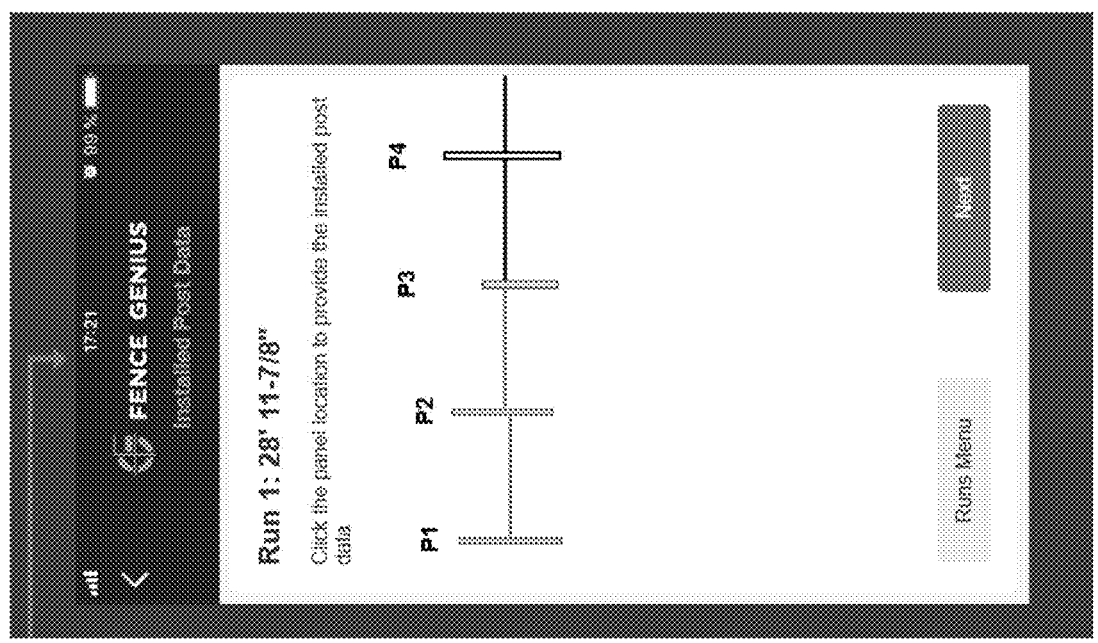
FIG. 45K shows another portion of the graphical user interface for inputting data regarding heights of fence posts.

FIG. 45K illustrates the graphical user interface seen by the operator upon inputting the measured vertical height and then pressing next. As illustrated in FIG. 45K, the graphical user interface next prompts the operator to select from a plurality of locations for fence panels within a fence run, and then press "next," with the first installed fence post, the first fence panel, the second installed fence post, the second fence panel, and the third installed fence post illustrated in green to indicate that measurements have already been input for those components. The relative relationships of the posts and horizontal reference lines are visually displayed to allow the operator to perform a quick overview check. These portions of the graphical user interface and the methods described herein can be repeated until this data has been collected for all installed fence posts in the fence run. If, during this data collection process, it is determined, such as by a computer system, that one or more of the measurements of the installed fence posts indicate that one or more of the installed fence posts are not tall enough to support fence panels as they have been designed, then the computer system may present an alert of this fact in the graphical user interface to the operator, such as by illustrating a respective fence post in the graphical user interface in the color red.

Figure 46B:
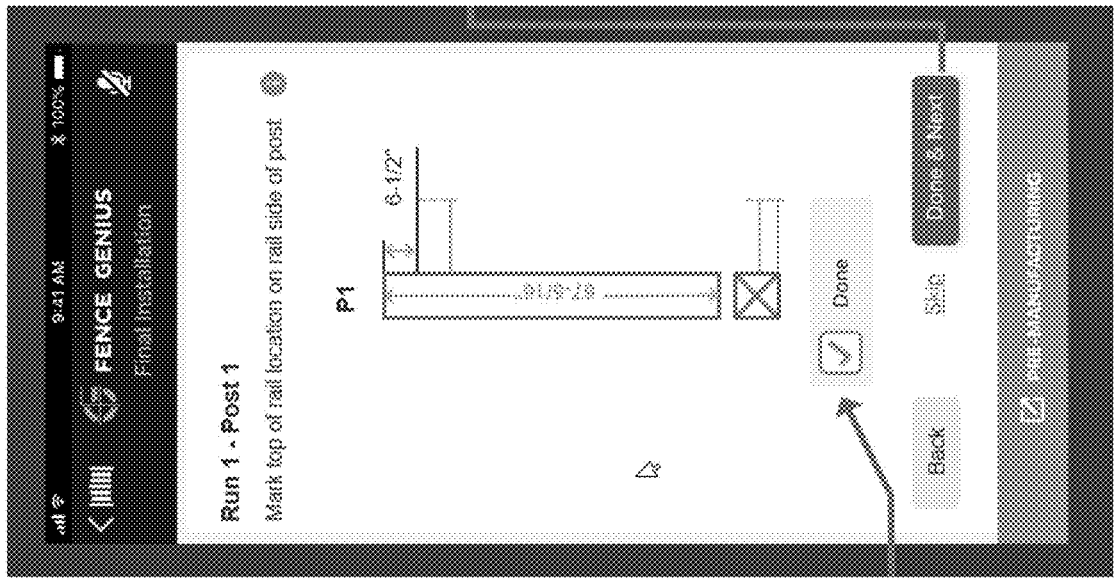
FIG. 46B shows another portion of the graphical user interface for use in building a fence based on calculated fence post measurements.
Figure 46A:
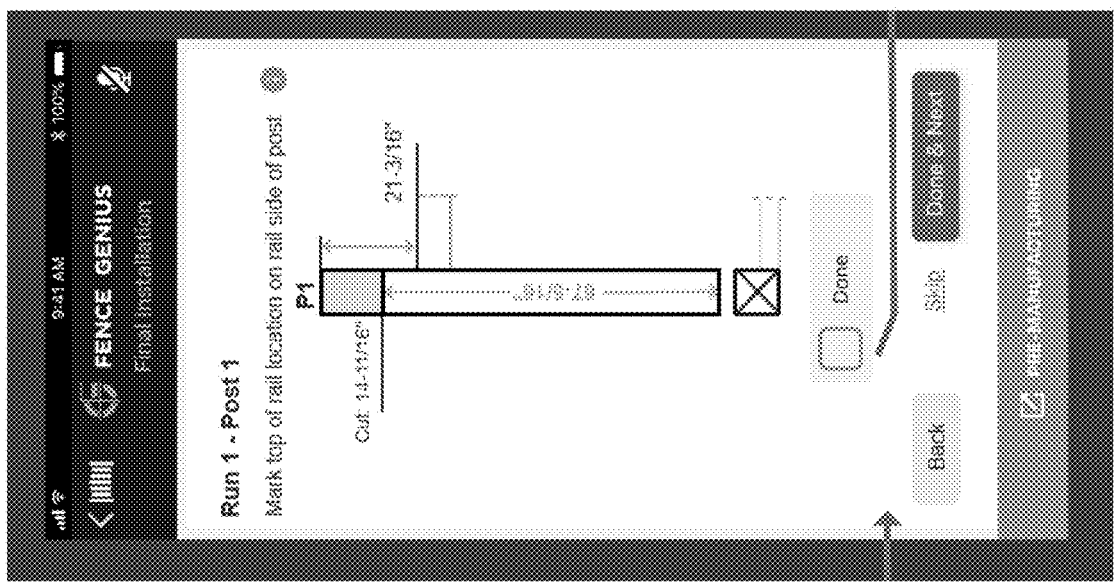
FIG. 46A shows a portion of another graphical user interface for use in building a fence based on calculated fence post measurements.

FIGS. 46A-46D show portions of another graphical user interface for providing instructions regarding installation of pre-assembled fence panels on fence posts, and in particular, instructions regarding marking of fence posts with rail heights and cut-off locations. As illustrated in FIG. 46A, the graphical user interface presents a diagram of a first installed fence post P1, which has an overall actual height of 82 inches and a designed height of 67$\frac{5}{16}$ inches, such that a cut-off location is 14$\frac{11}{16}$ inches from the top of the installed post. Thus, when presented with this diagram, the operator can be prompted to mark the cut-off location for the post at 14$\frac{11}{16}$ inches from the top of the post. The diagram includes a measurement of a height between the top of the installed fence post and a top edge of an uppermost rail designed to be coupled to the installed fence post, which in the illustrated example is 21 $\frac{3}{16}$ inches. Thus, when presented with the diagram, the operator can be prompted to mark the height of the top edge of the uppermost rail designed to be coupled to the installed fence post, such as on a side of the fence post to which the rail is designed to be coupled. The graphical user interface also prompts the operator to check a box to indicate that such marking has been completed, and/or press "Done & Next."

FIG. 46B illustrates the graphical user interface seen by the operator upon checking the box to indicate that the marking has been completed for the first fence post. As illustrated in FIG. 46B, the graphical user interface updates the diagram of the first fence post to remove the top of the fence post at the cut-off location and indicate a height between the designed top of the first fence post and the top edge of the uppermost rail designed to be coupled to the installed fence post, which in the illustrated example is 6½ inches. The graphical user interface continues to prompt the operator to press "Done & Next."

Figure 46D:
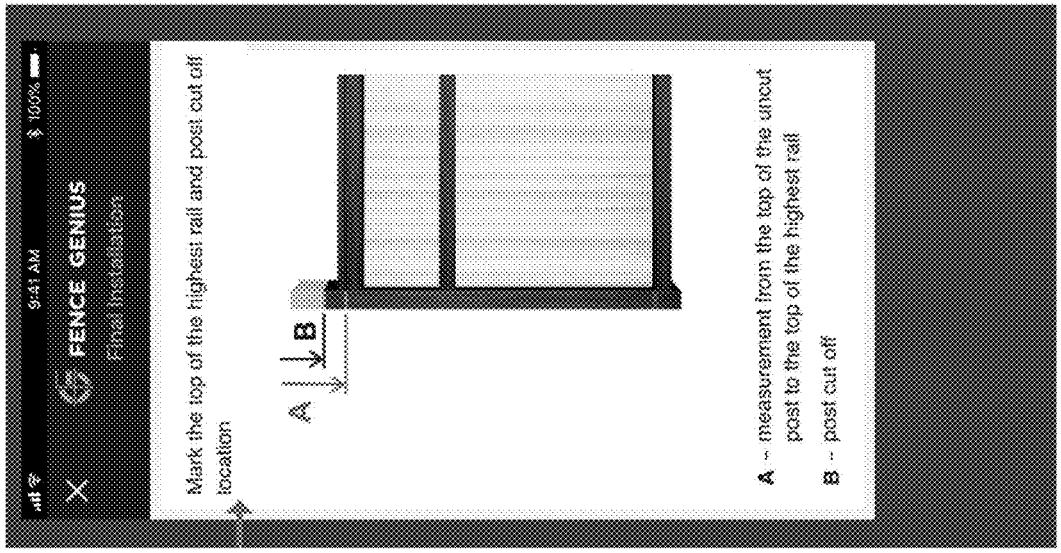
FIG. 46D shows another portion of the graphical user interface for use in building a fence based on calculated fence post measurements.
Figure 46C:
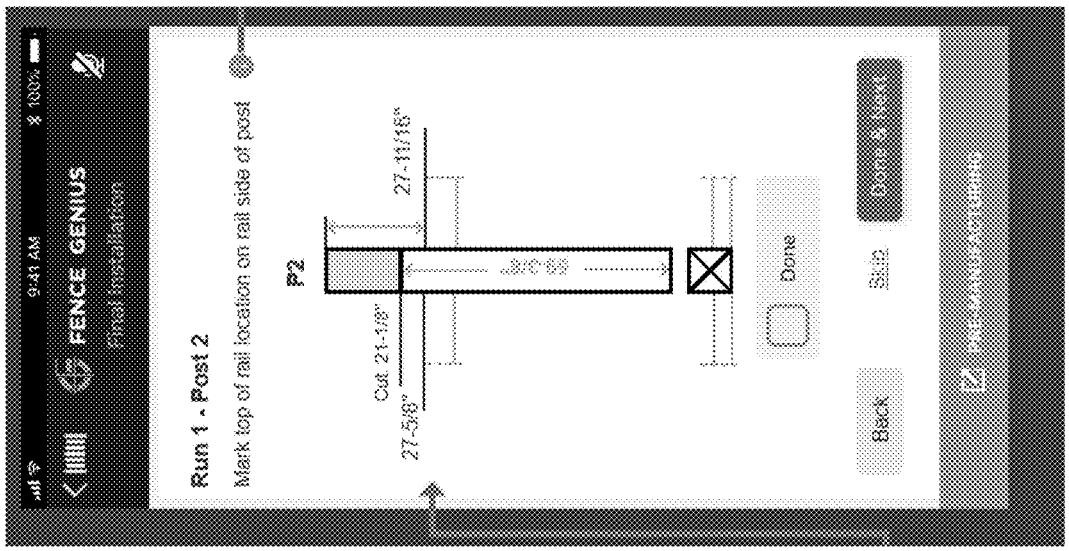
FIG. 46C shows another portion of the graphical user interface for use in building a fence based on calculated fence post measurements.

FIG. 46C illustrates the graphical user interface seen by the operator upon pressing Done & Next. As illustrated in FIG. 46C, the graphical user interface presents a diagram of a second installed fence post P2, which has an overall actual height of 80½ inches and a designed height of 59⅜ inches, such that a cut-off location is 21⅛ inches from the top of the installed post. Thus, when presented with this diagram, the operator can be prompted to mark the cut-off location for the post at 21⅛ inches from the top of the post. The diagram includes a measurement of a height between the top of the installed fence post and a top edge of a first uppermost rail designed to be coupled to a first side of the installed fence post, which in the illustrated example is 27¹¹⁄₁₆ inches, as well as a measurement of a height between the top of the installed fence post and a top edge of a second uppermost rail designed to be coupled to a second side of the installed fence post, which in the illustrated example is 27⅝ inches. Thus, when presented with the diagram, the operator can be prompted to mark the heights of the top edges of the two uppermost rails designed to be coupled to either side of the installed fence post, on the respective sides of the fence post to which the rails are designed to be coupled. The graphical user interface also prompts the operator to check a box to indicate that such marking has been completed, and/or press "Done & Next."

The graphical user interface may update the diagram of the second fence post to remove the top of the fence post at the cut-off location and/or indicate heights between the designed top of the second fence post and the top edges of the uppermost rails designed to be coupled to the installed fence post. The graphical user interface continues to prompt the operator to press "Done & Next." The graphical user interface may also provide an option or a prompt for the user to obtain additional information regarding these measurements and markings. FIG. 46D illustrates the graphical user interface seen by the operator upon pressing an icon to obtain such additional information. The description of FIGS. 46A-46D focused on the installation of complete fence panels on the installed fence posts, but the same or similar techniques could be used if the operator is installing fence panels from kits of fence panel components instead of in the form of completed fence panels.

These portions of the graphical user interface and the methods described herein can be repeated until all installed fence posts in the fence run have been marked in accordance with the description herein. Such techniques allow the locations of the tops of the installed fence posts and the heights of the top edges of the uppermost rails to be coupled to the installed fence posts to be determined by a computer, such as algorithmically in accordance with parameters and algorithms specified by the operator, which can result in a more aesthetically pleasing fence than otherwise. While the features described herein have made reference to a top edge of an uppermost rail designed to be coupled to the installed fence post, such features may be used in alternative embodiments with any desired surface of any fence component designed to be coupled to the fence posts.

Any of the features described herein can be performed using computer systems activated by and interacted with via voice control and audio outputs rather than by direct physical interaction with a computer input device and/or visual output provided by a computer system.

Features and aspects of the various embodiments and implementations described above can be combined to provide further embodiments. All of the U.S. patents, U.S. patent application publications and U.S. patent applications referred to in this specification and/or listed in the Application Data Sheet, including but not limited to U.S. provisional patent application Nos. 62/642,328, filed Mar. 13, 2018, 62/726,908, filed Sep. 4, 2018, 62/816,825, filed Mar. 11, 2019, 62/875,874, filed Jul. 18, 2019, and 63/052,853, filed Jul. 16, 2020, are hereby incorporated herein by reference in their entireties. Aspects of the embodiments and implementations can be modified, if necessary to employ concepts of the various patents, applications and publications to provide yet further embodiments and implementations.

These and other changes can be made to the embodiments in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A computing device, comprising:
   a memory configured to store computer instructions; and
   at least one processor configured to execute the computer instructions to:
   generate a visual representation of a plurality of fence posts in a fence run, the plurality of fence posts including at least a first fence post and a second fence post, the visual representation providing a first minimum height for the first fence post, a first distance from a reference location to the first fence post, a second minimum height for the second fence post, and a second distance from the reference location to the second fence post;
   display the visual representation to a user;
   display a graphical user interface to the user for receiving information associated with the first fence post and the second fence post; and
   receive, from the user via the graphical user interface, at least a first input that signifies that the first minimum height and the first distance have been marked at a location at which the first fence post is to be installed and at least a second input that signifies that the second minimum height and the second distance have been marked at a location at which the second fence post is to be installed.

2. The computing device of claim 1, wherein the at least one processor is further configured to execute the computer instructions to:
   modify the visual representation of the plurality of fence posts in the fence run based on the input received from the user; and
   display the modified visual representation of the plurality of fence posts in the fence run to the user.

3. A computing device, comprising:
   a memory configured to store computer instructions; and
   at least one processor configured to execute the computer instructions to:
   generate a visual representation of a fence post in a fence run, the visual representation providing a designed height of the fence post and a difference between the designed height of the fence post and a measured height of the fence post;
   display the visual representation to a user;
   display a graphical user interface to the user for receiving information associated with the fence post; and
   receive, from the user via the graphical user interface, at least a first input that signifies that the difference between the designed height of the fence post and the measured height of the fence post has been marked on the fence post.

4. The computing device of claim 3, wherein the at least one processor is further configured to execute the computer instructions to:

modify the visual representation of the fence post in the fence run based on the input received from the user; and display the modified visual representation of the fence post in the fence run to the user.

5. The computing device of claim 3 wherein the processor is further configured to execute the computer instructions to:

generate the visual representation of the fence post in the fence run, the visual representation providing a difference between a designed height of an edge of a fence component designed to be coupled to the fence post and the measured height of the fence post; and receive, from the user via the graphical user interface, at least a second input that signifies that the difference between the designed height of the edge of the fence component and the measured height of the fence post has been marked on the fence post.

6. The computing device of claim 5 wherein the edge of the fence component is a top edge of a fence rail designed to be coupled to the fence post.

7. The computing device of claim 6 wherein the fence rail is a first fence rail and the processor is further configured to execute the computer instructions to:

generate the visual representation of the fence post in the fence run, the visual representation providing a difference between a designed height of a top edge of a second fence rail designed to be coupled to the fence post and the measured height of the fence post; and receive, from the user via the graphical user interface, at least a third input that signifies that the difference between the designed height of the top edge of the second fence rail and the measured height of the fence post has been marked on the fence post.

* * * * *